(12) United States Patent
Ding et al.

(10) Patent No.: US 12,219,243 B2
(45) Date of Patent: Feb. 4, 2025

(54) SHOOTING PREVIEW INTERFACE FOR ELECTRONIC DEVICE WITH MULTIPLE CAMERA

(71) Applicant: HUAWEI TECHNOLOGIES CO., LTD., Guangdong (CN)

(72) Inventors: Chenchen Ding, Shenzhen (CN); Qingliang Wu, Saint Petersburg (RU); Xiaobo Yu, Shanghai (CN); Yanming Zhu, Shanghai (CN); Yayun Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 17/913,081

(22) PCT Filed: Mar. 17, 2021

(86) PCT No.: PCT/CN2021/081391
§ 371 (c)(1),
(2) Date: Sep. 20, 2022

(87) PCT Pub. No.: WO2021/185296
PCT Pub. Date: Sep. 23, 2021

(65) Prior Publication Data
US 2023/0224575 A1    Jul. 13, 2023

(30) Foreign Application Priority Data

Mar. 20, 2020  (CN) .......................... 202010203377.2
May 21, 2020  (CN) .......................... 202010433774.9

(51) Int. Cl.
*H04N 23/60* (2023.01)
*H04N 23/63* (2023.01)
(Continued)

(52) U.S. Cl.
CPC ........... *H04N 23/64* (2023.01); *H04N 23/635* (2023.01); *H04N 23/671* (2023.01); *H04N 23/90* (2023.01)

(58) Field of Classification Search
CPC .... H04N 23/64; H04N 23/635; H04N 23/671; H04N 23/90; H04N 23/45; H04N 23/633
See application file for complete search history.

(56) References Cited

U.S. PATENT DOCUMENTS

| | | | |
|---|---|---|---|
| 9,225,947 B2 | 12/2015 | Lee et al. | |
| 2013/0293746 A1* | 11/2013 | Iki | H04N 5/772 348/239 |

(Continued)

FOREIGN PATENT DOCUMENTS

| | | |
|---|---|---|
| CN | 103870138 A | 6/2014 |
| CN | 104243801 A | 12/2014 |

(Continued)

OTHER PUBLICATIONS

Office Action in Chinese Appln. No. 202010433774.9, dated Apr. 22, 2022, 33 pages (with English translation).

(Continued)

*Primary Examiner* — Christopher K Peterson
(74) *Attorney, Agent, or Firm* — Fish & Richardson P.C.

(57) ABSTRACT

A shooting method includes: displaying, on the display, a shooting preview interface collected by a first camera; displaying, on the shooting preview interface, a first image composition and a second image composition that respectively correspond to a first subject and a second subject, where the first subject is different from the second subject; displaying a guide mark on the shooting preview interface, to guide a user to operate the electronic device, so that a framing range of the second camera and the first image composition meet a matching condition; and in response to meeting the matching condition, displaying a first recom- (Continued)

mended image including the first subject on the display, where the first recommended image is collected by a second camera, wherein an angle of view of the first camera is greater than an angle of view of the second camera.

19 Claims, 44 Drawing Sheets

(51) Int. Cl.
  *H04N 23/67* (2023.01)
  *H04N 23/90* (2023.01)

(56) References Cited

U.S. PATENT DOCUMENTS

| | | | | |
|---|---|---|---|---|
| 2019/0174056 | A1* | 6/2019 | Jung | .................... H04N 23/71 |
| 2020/0177802 | A1 | 6/2020 | Jung et al. | |
| 2020/0186710 | A1* | 6/2020 | Sheikh | ................ H04N 23/667 |
| 2020/0364914 | A1* | 11/2020 | Mech | ...................... G06T 7/33 |
| 2021/0168300 | A1 | 6/2021 | Wang et al. | |

FOREIGN PATENT DOCUMENTS

| | | |
|---|---|---|
| CN | 107682622 A | 2/2018 |
| CN | 108989665 A | 12/2018 |
| CN | 109196852 A | 1/2019 |
| CN | 109218609 A | 1/2019 |
| CN | 109474786 A | 3/2019 |
| CN | 110248081 A | 9/2019 |
| CN | 110430359 A | 11/2019 |
| CN | 110445978 A | 11/2019 |
| CN | 111277760 A | 6/2020 |
| CN | 111770273 A | 10/2020 |
| CN | 112437172 A | 3/2021 |
| JP | 3863327 B2 | 12/2006 |
| JP | 2018137717 A | 8/2018 |

OTHER PUBLICATIONS

Partial Supplementary European Search Report in European AppIn No. 21770432.9, dated Apr. 14, 2023, 16 pages.
International Search Report and Written Opinion in International AppIn. No. PCT/CN2021/081391, mailed on Jun. 2, 2021, 18 pages (with English translation).

* cited by examiner

SHOOTING PREVIEW INTERFACE FOR ELECTRONIC DEVICE WITH MULTIPLE CAMERA

CROSS-REFERENCE TO RELATED APPLICATIONS

This application is a National Stage of International Application No. PCT/CN2021/081391, filed on Mar. 17, 2021, which claims priority to Chinese Patent Application No. 202010203377.2, filed on Mar. 20, 2020, and Chinese Patent Application No. 202010433774.9, filed on May 21, 2020. All of the aforementioned applications are hereby incorporated by reference in their entireties.

TECHNICAL FIELD

This application relates to the field of electronic device technologies, and in particular, to a shooting method and a device.

BACKGROUND

With the development of electronic technologies, more cameras are integrated in an electronic device. The plurality of cameras may include cameras with a plurality of focal lengths, for example, may include a short-focus wide-angle camera (also referred to as a wide-angle camera below), a medium-focus camera, and a long-focus camera. For another example, the plurality of cameras may further include a depth-sensing camera, for example, a time of flight (time of flight, ToF) camera. The camera with different focal lengths may correspond to different framing ranges and different zoom ratios, to enrich shooting scenes of the electronic device.

A mobile phone camera integrated with a plurality of cameras has become one of daily necessary tools for users to record and share life. A component capability of the mobile phone camera is increasingly professional, but operations are increasingly complex. A common user wants to obtain a professional shooting effect with simple operations. However, in a same shooting scene, different image composition techniques have a great impact on a final shooting effect. However, to learn of professional image composition knowledge, a large amount of learning and practice costs are required, and it is difficult for the common user to master the knowledge.

An existing shooting image composition suggestion function is to identify, based on a framing range in a shooting process, a single shot subject for image composition recommendation. However, the conventional technology has the following disadvantages: (1) Recommendation is performed only for a single shot subject, and the user has no other choice. (2) An identified subject may not be the subject that the user wants to shoot, and a recommendation effect is not as expected by the user.

SUMMARY

Embodiments of the present invention provide a shooting method and a device. Based on multi-camera framing and artificial intelligence (AI) automatic recommendation, a plurality of shooting image composition candidates are provided for a user. A common user can obtain a professional image composition effect and complete shooting only by moving a camera preview center.

According to a first aspect of embodiments of the present invention, a shooting method is provided, and is applied to an electronic device having a display. The method includes:

displaying a shooting preview interface on the display, where the shooting preview interface is collected by a first camera of the electronic device:

displaying a first image composition and a second image composition on the shooting preview interface, where the first image composition corresponds to a first subject, the second image composition corresponds to a second subject, and the first subject is different from the second subject:

displaying a first guide mark on the shooting preview interface, where the first guide mark is used to guide a user to operate the electronic device, so that a framing range of a second camera of the electronic device and the first image composition meet a first matching condition, where an angle of view of the first camera is greater than an angle of view of the second camera, and the first camera and the second camera are located on a same side of the electronic device; and displaying, in response to meeting the first matching condition, a first recommended image including the first subject on the display, where the first recommended image is collected by the second camera.

According to the shooting method provided in the first aspect of embodiments of the present invention, more shot subjects or surrounding image data of the shot subjects can be obtained by using an advantage of a large angle of view of the first camera, and professional shooting image composition recommendation is separately performed for the first shot subject and the second shot subject based on the image data collected by the first camera, so that the user intuitively selects a recommended image, and can obtain a professional image composition effect without learning image composition knowledge. In addition, to facilitate the user to select the first image composition and the second image composition, a guide mark is further displayed on the shooting preview interface, so that the user moves the electronic device as prompted, to select a favorite image composition. This makes operations simpler and clearer for the user.

In a possible implementation, after the displaying a first recommended image including the first subject on the display, the method further includes: automatically shooting the first recommended image including the first subject.

In this way, according to the shooting method provided in embodiments of the present invention, an image can be automatically shot after the user has selected and aligned the first recommended image, without a need to operate a shooting control. This provides a faster and more convenient shooting process for the user, and improves shooting experience of the user.

In a possible implementation, after the displaying a first recommended image including the first subject on the display, the method further includes:

detecting an input operation on a shooting control; and in response to the input operation, shooting the first recommended image.

In this way, according to the shooting method provided in embodiments of the present invention, after the user has selected and aligned the first recommended image, the user operates the shooting control to shoot the image, to avoid a misoperation of shooting, and improve shooting autonomy of the user.

In a possible implementation, after the shooting the first recommended image, the method further includes:

displaying prompt information, where the prompt information is used to prompt the user whether to continue to shoot a second recommended image, and the second recommended image includes the second subject.

In this way, according to the shooting method provided in embodiments of the present invention, the user can be intelligently prompted to continue to shoot the second recommended image, to help the user take more professional photos.

In a possible implementation, the method further includes:

displaying a second guide mark on the shooting preview interface, where the second guide mark is used to guide the user to operate the electronic device, so that a framing range of a third camera of the electronic device and the second image composition meet a second matching condition, wherein the angle of view of the second camera is greater than an angle of view of the third camera, and the first camera, the second camera, and the third camera are located on a same side of the electronic device; and in response to meeting the second matching condition, displaying a second recommended image including the second subject on the display, where the second recommended image is collected by the third camera.

In this way, according to the shooting method provided in embodiments of the present invention, by using possible long-focus performance of the third camera, professional image composition recommendation can be performed on a shot subject that is far away. This is suitable for shooting a portrait, distant details, and the like, and meets richer actual shooting requirements of the user.

In a possible implementation, the first guide mark includes a first mark and a second mark, the first mark indicates a viewfinder center of the first camera, and the second mark indicates a center of the first image composition.

In a possible implementation, the first guide mark includes a third mark, and the third mark indicates the framing range of the second camera.

According to the shooting method provided in embodiments of the present invention, guide marks indicating the first image composition and a camera are provided for the user, to guide the user to correctly move the electronic device to select a favorite recommended image, so as to further improve intuitiveness of a user operation.

In a possible implementation, depth of field information of the first subject and the second subject is displayed on the shooting preview interface, where the depth of field information is collected by a ToF camera of the electronic device.

In this way, according to the shooting method provided in embodiments of the present invention, the ToF camera is added to collect depth of field information of a shot subject, so that professional shooting image composition recommendation can be further performed based on the depth of field information of the first subject and the second subject, and more layered professional image composition recommendation can be provided for the user.

In a possible implementation, the displaying, in response to meeting the first matching condition, a first recommended image including the first subject on the display includes:

in response to meeting the first matching condition, adjusting, by the second camera, a focal length based on the depth of field information of the first subject, and displaying the first recommended image including the first subject on the display;

In this way, according to the shooting method provided in embodiments of the present invention, the depth of field information obtained by the ToF camera can help the camera implement a faster focusing speed, and can also provide a faster speed for automatic shooting of a mobile phone.

In a possible implementation, the electronic device performs progressive blurring on another object around the first subject by using depth of field information that is of the first subject and the another object around the first subject and that is obtained by the ToF camera.

In this way, according to the shooting method provided in embodiments of the present invention, automatic shooting parameter adjustment is performed on a selected recommended image based on the depth of field information provided by the ToF camera, so that the user can obtain a subject highlighted effect closer to real vision.

In a possible implementation, the displaying a first guide mark on the shooting preview interface, where the first guide mark is used to guide a user to operate the electronic device, so that a framing range of a second camera of the electronic device and the first image composition meet a first matching condition includes:

detecting an operation on the first image composition; and in response to the operation, displaying the first guide mark on the shooting preview interface, where the first guide mark is used to guide the user to operate the electronic device, so that the framing range of the second camera of the electronic device and the first image composition meet the first matching condition.

In this way, according to the shooting method provided in embodiments of the present invention, the guide mark is displayed after the user selects the first image composition, so that interaction with the user in a shooting process can be increased, and shooting experience of the user can be improved.

In a possible implementation, the displaying, in response to meeting the first matching condition, a first recommended image including the first subject on the display includes:

in response to meeting the first matching condition, displaying prompt information on the display, where the prompt information is used to prompt whether to switch to the second camera for shooting; and in response to an input operation on the prompt information, displaying the first recommended image including the first subject on the display, where the first recommended image is collected by the second camera.

In this way, according to the shooting method provided in embodiments of the present invention, after the user selects the first recommended image, the user is intelligently prompted that a camera is to be switched for shooting, so that the user can master and control autonomous shooting.

In a possible implementation, a first identifier and a second identifier are displayed on the shooting preview interface, where the first identifier includes a first recommendation index corresponding to the first image composition, and the second identifier includes a second recommendation index corresponding to the second image composition.

In a possible implementation, the first identifier further includes a first scene corresponding to the first subject, and the second identifier further includes a second scene corresponding to the second subject.

In this way, according to the shooting method provided in embodiments of the present invention, not only the recommended first image composition and the recommended second image composition are provided, but also scene identification and recommendation index identification are performed on the provided image compositions. Scenes and aesthetic scores of the recommended image compositions are displayed on recommended images, to provide a basis for the user to select a recommended image.

In a possible implementation, the method further includes:
the first identifier further includes a third recommendation index; and
in response to an input operation on the third recommendation index, displaying a third image composition on the shooting preview interface, where the third image composition corresponds to the first subject.

In a possible implementation, a location of the first subject in the first image composition is different from a location of the first subject in the third image composition, the first recommendation index is a first score, the third recommendation index is a second score, and the first score is greater than the second score.

In this way, according to the shooting method provided in embodiments of the present invention, not only scene identification and recommendation index identification are performed on the provided image compositions, but also a plurality of aesthetic scores in a scene of a recommended image composition are all displayed on the recommended image, so that more options are provided for the user in a specific type of scene, and it is convenient for the user to select recommended images with different scores.

According to a second aspect of embodiments of the present invention, a shooting method is provided, and is applied to an electronic device having a display. The method includes:
displaying a shooting preview interface on the display, where the shooting preview interface is collected by a first camera of the electronic device;
displaying a first image composition and a second image composition on the shooting preview interface, where the first image composition corresponds to a first subject, the second image composition corresponds to a second subject, the first subject is different from the second subject, a framing range of the first image composition is consistent with a framing range of a second camera of the electronic device, an angle of view of the first camera is greater than an angle of view of the second camera, and the first camera and the second camera are located on a same side of the electronic device;
in response to an input operation on a shooting control, shooting an image by using the first camera; and
cropping the shot image to obtain the first image composition and the second image composition.

According to the shooting method provided in the second aspect of embodiments of the present invention, not only professional shooting image composition recommendation is provided for the user, but also the preview image collected by the first camera, the first image composition, and the second image composition are automatically obtained, to help the user automatically perform cropping to obtain a recommended image for selection by the user.

In a possible implementation, the method further includes:
The electronic device saves the shot image, the first image composition, and the second image composition.

In this possible implementation, the electronic device automatically saves the shot image and the images obtained by cropping, so that the user subsequently browses and selects a required image.

In a possible implementation, the method further includes:
The electronic device automatically recommends an optimal image from the preview image, the first image composition, and the second image composition that are saved.

In this way, the electronic device can intelligently recommend an optimal image from a plurality of similar images, to help the user select the optimal image.

According to a third aspect of embodiments of the present invention, a shooting method is provided, and is applied to an electronic device having a display. The method includes:
displaying a shooting preview interface on the display, where the shooting preview interface is collected by a second camera of the electronic device;
displaying a first image composition and a second image composition on the shooting preview interface, where the first image composition corresponds to a first subject, the second image composition corresponds to a second subject, the first subject is different from the second subject, the first image composition and the second image composition are recommended based on an image collected by the first camera of the electronic device, and at least one of the first image composition and the second image composition is partially displayed;
displaying a first guide mark on the shooting preview interface, where the first guide mark is used to guide a user to operate the electronic device, so that a framing range of the second camera of the electronic device and the first image composition meet a first matching condition, where an angle of view of the first camera is greater than an angle of view of the second camera, and the first camera and the second camera are located on a same side of the electronic device; and
in response to meeting the first matching condition, displaying a first recommended image including the first subject on the display, where the first recommended image is collected by the second camera.

According to the shooting method provided in the third aspect of embodiments of the present invention, the second camera may be a primary camera frequently used by a user, and the first camera may be correspondingly a wide-angle camera or even an ultra-wide-angle camera. In this way, not only an image collected by the wide-angle camera with a large angle of view can be fully used to perform professional image composition recommendation, but also a recommended image can be displayed in a primary camera preview familiar to the user. Both an image composition recommendation function and better user experience are considered.

According to a fourth aspect of embodiments of the present invention, a shooting method is provided. When the method is performed by an electronic device, the electronic device is enabled to perform the following steps:
displaying a shooting preview interface on a display of the electronic device, where the shooting preview interface is collected by a first camera of the electronic device;
displaying a first image composition and a second image composition on the shooting preview interface, where the first image composition corresponds to a first subject, the second image composition corresponds to a second subject, and the first subject is different from the second subject;
displaying a first guide mark on the shooting preview interface, where the first guide mark is used to guide a user to operate the electronic device, so that a framing range of a second camera of the electronic device and the first image composition meet a first matching condition, where an angle of view of the first camera is greater than an angle of view of the second camera, and the first camera and the second camera are located on a same side of the electronic device; and displaying, in response to meeting the first matching condition, a first recommended image including the first subject on the display, where the first recommended image is collected by the second camera.

According to the shooting method provided in the fourth aspect of embodiments of the present invention, more shot subjects or surrounding image data of the shot subjects can be obtained by using an advantage of a large angle of view of the first camera, and professional shooting image composition recommendation is separately performed for the first shot subject and the second shot subject based on the image data collected by the first camera, so that the user intuitively selects a recommended image, and can obtain a professional image composition effect without learning image composition knowledge. In addition, to facilitate the user to select the first image composition and the second image composition, a guide mark is further displayed on the shooting preview interface, so that the user moves the electronic device as prompted, to select a favorite image composition. This makes operations simpler and clearer for the user.

In a possible implementation, after the displaying a first recommended image including the first subject on the display, the method further includes: automatically shooting the first recommended image including the first subject.

In this way, according to the shooting method provided in embodiments of the present invention, an image can be automatically shot after the user has selected and aligned the first recommended image, without a need to operate a shooting control. This provides a faster and more convenient shooting process for the user, and improves shooting experience of the user.

In a possible implementation, after the displaying a first recommended image including the first subject on the display, the method further includes:
  detecting an input operation on a shooting control; and
  in response to the input operation, shooting the first recommended image.

In this way, according to the shooting method provided in embodiments of the present invention, after the user has selected and aligned the first recommended image, the user operates the shooting control to shoot the image, to avoid a misoperation of shooting, and improve shooting autonomy of the user.

In a possible implementation, after the shooting the first recommended image, the method further includes:
  displaying prompt information, where the prompt information is used to prompt the user whether to continue to shoot a second recommended image, and the second recommended image includes the second subject.

In this way, according to the shooting method provided in embodiments of the present invention, the user can be intelligently prompted to continue to shoot the second recommended image, to help the user take more professional photos.

In a possible implementation, the method further includes:
  displaying a second guide mark on the shooting preview interface, where the second guide mark is used to guide the user to operate the electronic device, so that a framing range of a third camera of the electronic device and the second image composition meet a second matching condition, wherein the angle of view of the second camera is greater than an angle of view of the third camera, and the first camera, the second camera, and the third camera are located on a same side of the electronic device; and
  in response to meeting the second matching condition, displaying a second recommended image including the second subject on the display, where the second recommended image is collected by the third camera.

In this way, according to the shooting method provided in embodiments of the present invention, by using possible long-focus performance of the third camera, professional image composition recommendation can be performed on a shot subject that is far away. This is suitable for shooting a portrait, distant details, and the like, and meets richer actual shooting requirements of the user.

In a possible implementation, the first guide mark includes a first mark and a second mark, the first mark indicates a viewfinder center of the first camera, and the second mark indicates a center of the first image composition.

In a possible implementation, the first guide mark includes a third mark, and the third mark indicates the framing range of the second camera.

According to the shooting method provided in embodiments of the present invention, guide marks indicating the first image composition and a camera are provided for the user, to guide the user to correctly move the electronic device to select a favorite recommended image, so as to further improve intuitiveness of a user operation.

In a possible implementation, depth of field information of the first subject and the second subject is displayed on the shooting preview interface, where the depth of field information is collected by a ToF camera of the electronic device.

In this way, according to the shooting method provided in embodiments of the present invention, the ToF camera is added to collect depth of field information of a shot subject, so that professional shooting image composition recommendation can be further performed based on the depth of field information of the first subject and the second subject, and more layered professional image composition recommendation can be provided for the user.

In a possible implementation, the displaying, in response to meeting the first matching condition, a first recommended image including the first subject on the display includes:
  in response to meeting the first matching condition, adjusting, by the second camera, a focal length based on the depth of field information of the first subject, and displaying the first recommended image including the first subject on the display.

In this way, according to the shooting method provided in embodiments of the present invention, the depth of field information obtained by the ToF camera can help the camera implement a faster focusing speed, and can also provide a faster speed for automatic shooting of a mobile phone.

In a possible implementation, the electronic device performs progressive blurring on another object around the first subject by using depth of field information that is of the first subject and the another object around the first subject and that is obtained by the ToF camera.

In this way, according to the shooting method provided in embodiments of the present invention, automatic shooting parameter adjustment is performed on a selected recommended image based on the depth of field information provided by the ToF camera, so that the user can obtain a subject highlighted effect closer to real vision.

In a possible implementation, the displaying a first guide mark on the shooting preview interface, where the first guide mark is used to guide a user to operate the electronic device, so that a framing range of a second camera of the electronic device and the first image composition meet a first matching condition includes:

detecting an operation on the first image composition; and
in response to the operation, displaying the first guide mark on the shooting preview interface, where the first guide mark is used to guide the user to operate the electronic device, so that the framing range of the second camera of the electronic device and the first image composition meet the first matching condition.

In this way, according to the shooting method provided in embodiments of the present invention, the guide mark is displayed after the user selects the first image composition, so that interaction with the user in a shooting process can be increased, and shooting experience of the user can be improved.

In a possible implementation, the displaying, in response to meeting the first matching condition, a first recommended image including the first subject on the display includes:

in response to meeting the first matching condition, displaying prompt information on the display, where the prompt information is used to prompt whether to switch to the second camera for shooting; and
in response to an input operation on the prompt information, displaying the first recommended image including the first subject on the display, where the first recommended image is collected by the second camera.

In this way, according to the shooting method provided in embodiments of the present invention, after the user selects the first recommended image, the user is intelligently prompted that a camera is to be switched for shooting, so that the user can master and control autonomous shooting.

In a possible implementation, a first identifier and a second identifier are displayed on the shooting preview interface, where the first identifier includes a first recommendation index corresponding to the first image composition, and the second identifier includes a second recommendation index corresponding to the second image composition.

In a possible implementation, the first identifier further includes a first scene corresponding to the first subject and the second identifier further includes a second scene corresponding to the second subject.

In this way, according to the shooting method provided in embodiments of the present invention, not only the recommended first image composition and the recommended second image composition are provided, but also scene identification and recommendation index identification are performed on the provided image composition. Scenes and aesthetic scores of the recommended image compositions are displayed on recommended images, to provide a basis for the user to select the recommended image.

In a possible implementation, the method further includes:

the first identifier further includes a third recommendation index; and
in response to an input operation on the third recommendation index, displaying a third image composition on the shooting preview interface, where the third image composition corresponds to the first subject.

In a possible implementation, a location of the first subject in the first image composition is different from a location of the first subject in the third image composition, the first recommendation index is a first score, the third recommendation index is a second score, and the first score is greater than the second score.

In this way, according to the shooting method provided in embodiments of the present invention, not only scene identification and recommendation index identification are performed on the provided image compositions, but also a plurality of aesthetic scores in a scene of a recommended image composition are all displayed on the recommended image, so that more options are provided for the user in a specific type of scene, and it is convenient for the user to select recommended images with different scores.

According to another aspect, embodiments of this application provide an electronic device, including one or more processors and a memory. The memory stores code. When the code is executed by the electronic device, the electronic device is enabled to perform the shooting method performed by the electronic device in any possible design of the foregoing aspects.

According to another aspect, embodiments of this application provide a shooting apparatus. The apparatus is included in an electronic device, and the apparatus has a function of implementing actions of the electronic device in any method in the foregoing aspects and the possible designs. The function may be implemented by hardware, or may be implemented by hardware executing corresponding software. The hardware or the software includes at least one module or unit corresponding to the foregoing function, for example, a display module or unit, a recommendation module or unit, a detection module or unit, or a switching module or unit.

According to another aspect, embodiments of the present invention provide a computer-readable storage medium, including computer instructions. When the computer instructions are run on an electronic device, the electronic device is enabled to perform the shooting method according to any possible design of the foregoing aspects.

According to another aspect, embodiments of the present invention provide a computer program product. When the computer program product is run on a computer, the computer is enabled to perform the shooting method in any possible design of the foregoing aspects.

DESCRIPTION OF EMBODIMENTS

The following describes the technical solutions in embodiments of the present invention with reference to the accompanying drawings in embodiments of the present invention. In description in embodiments of the present invention, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of the present invention, "a plurality of" means two or more.

In embodiments of this application, when a mobile phone displays a shooting preview interface on a display, a plurality of shooting image composition candidates may be provided for a user based on multi-camera framing and AI automatic recommendation. The plurality of shooting image composition candidates may be recommended for different shot subjects. The user may select one of the shooting image composition candidates to obtain a professional image composition effect for a corresponding shot subject.

A shooting method provided in embodiments of the present invention may be applied to any electronic device that can take a photo by using a camera, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). This is not limited in embodiments of the present invention.

Figure 1:
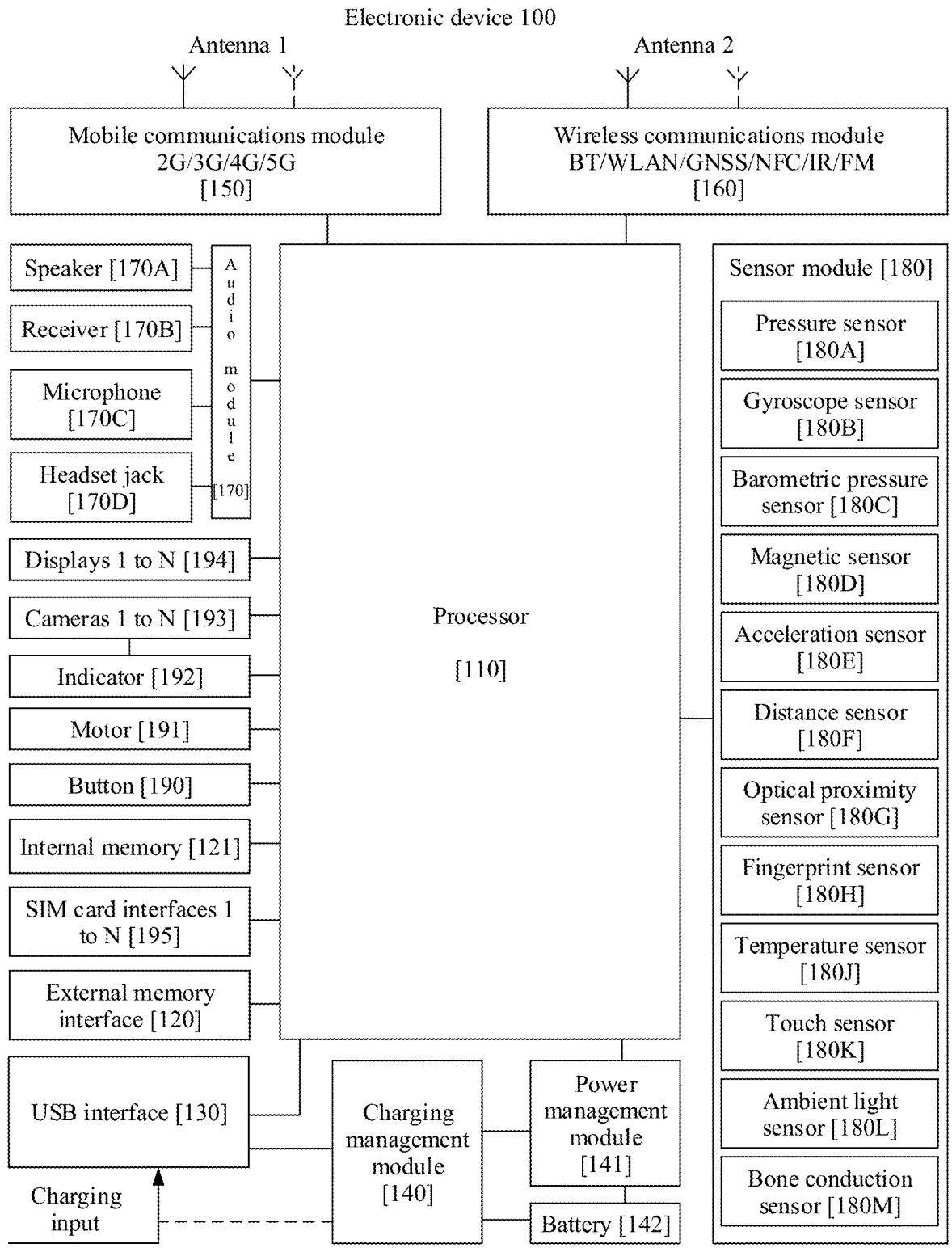
FIG. 1 is a schematic diagram of a hardware structure of an electronic device according to an embodiment of the present invention.

For example, FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of the present invention does not constitute a specific limitation on the electronic device 100. In some other embodiments of the present invention, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to connect the battery 142 and the charging management module 140 to the processor 110. The power management module 141 may receive an input of the battery 142 and/or an input of the charging management module 140, and supply power to the processor 110, the internal memory 121, the display 194, the camera 193, the wireless communications module 160, and the like.

The power management module 141 may be configured to monitor a performance parameter such as a battery capacity, a quantity of battery cycles, a battery charging voltage, a battery discharging voltage, and a battery health status (for example, electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G, and the like. The mobile communications module 150 may include one or more filters, one or more switches, one or more power amplifiers, one or more low noise amplifiers (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The wireless communications module 160 may provide a solution for wireless communications including a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100. The wireless communications module 160 may one or more components integrated with one or more communication processing modules. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

In a shooting scene, the display 194 may display a preview image collected by a camera. In some embodiments, the display 194 may simultaneously display a real-time viewfinder frame and a recommended image composition. In some embodiments, the recommended image composition may be presented in a form of superimposing a recommendation area box on a preview interface. In some embodiments, the display 194 displays a shooting preview interface collected by a wide-angle camera, and may display two or more recommended image compositions on the shooting preview interface. In some other embodiments, the display 194 displays a shooting preview interface collected by a medium-focus camera, and displays two or more recommended image compositions on the shooting preview interface collected by the medium-focus camera. The real-time viewfinder frame is used to display a preview image collected in real time by a camera used in current shooting.

The recommendation area box is used to display a preview image of a recommended shooting area. The preview image of the recommended shooting area is a partial image collected by a camera that shoots a current preview image, or a preview image collected by a camera other than the camera that shoots the current preview image. Optionally, a size of the recommendation area box may be the same as a framing range of the medium-focus camera, or a size of the recommendation area box may be the same as a framing range of a long-focus camera, or a size of the recommendation area box may be the same as a framing range of a long-focus camera at a zoom ratio.

In some other embodiments, the display 194 may further display a guide mark, to guide the user to move the electronic device 100, so that the electronic device 100 can shoot a recommended image composition by using the medium-focus camera or the long-focus camera after moving.

The electronic device 100 may implement a shooting function through the camera 193, the ISP, the video codec, the GPU, the display 194, the application processor AP and the like.

The ISP is configured to process data fed back by the camera 193. For example, during shooting, a shutter is pressed, and a ray of light is transmitted to a photosensitive element of a camera through the camera. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a shooting scene. In some embodiments, the ISP may be disposed in the camera 193.

The camera 193 may be configured to capture a static image or a video. An optical image of an object is generated through the camera, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras, where N is a positive integer greater than 1. The N cameras may include a plurality of types of cameras. For example, the N cameras may include a long-focus camera and one or more of a wide-angle camera, a medium-focus camera, and a time of flight (time of flight, ToF) camera (ToF camera for short below). The wide-angle camera may include an ultra-wide-angle camera with a very large framing range.

The N cameras may include cameras with different focal lengths. The focal lengths may include but are not limited to a first focal length (also referred to as a short focal length) that is less than a preset value 1 (for example, 35 mm), a second focal length (also referred to as a medium focal length) that is greater than or equal to the preset value 1 and less than or equal to a preset value 2 (for example, 85 mm), and a third focal length (also referred to as a long focal length) that is greater than the preset value 2. An angle of view of a camera with the first focal length is greater than an angle of view of a camera with the second focal length, and a shooting range is larger. The camera with the first focal length may be a wide-angle camera, and may shoot an object and an image within a large range. An angle of view of a camera with the third focal length is less than the angle of view of the camera with the second focal length, and a shooting range is smaller. The camera with the third focal length may be a long-focus camera, and is applicable to shooting a distant object, a close-up scene, object details, or specially shooting a small object. A shooting range of the camera with the second focal length is middle. The camera with the second focal length may be a medium-focus camera, that is, a standard camera in a general camera, and a camera that can reproduce a "natural" vision of human eyes in a normal condition.

Figure 2A:
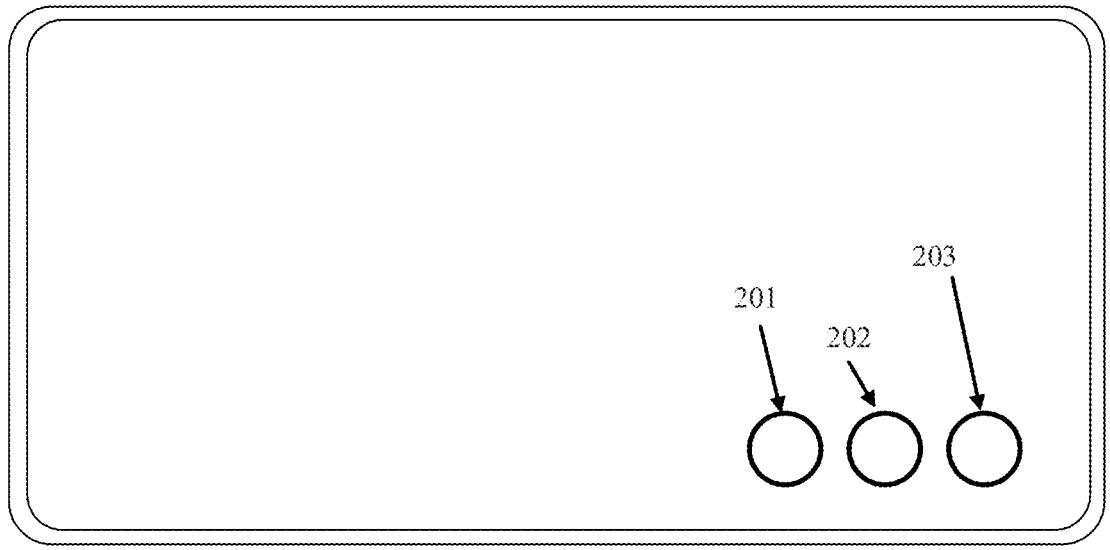
FIG. 2(a) is a schematic diagram of distribution of cameras according to an embodiment of the present invention.
Figure 2B:
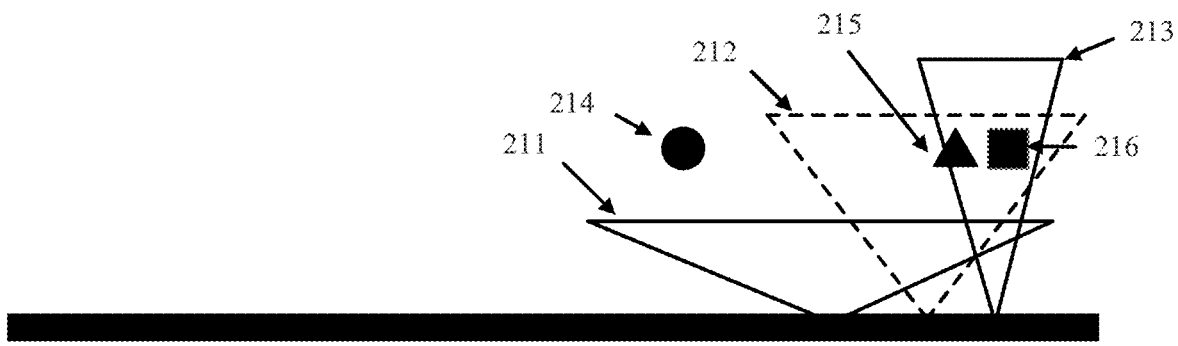
FIG. 2(b) is a schematic diagram of framing ranges of a group of different cameras according to an embodiment of the present invention.

For example, when the electronic device 100 includes a wide-angle camera 201, a medium-focus camera 202, and a long-focus camera 203, reference may be made to FIG. 2(*a*) for a schematic diagram of distribution of the three cameras. For shooting ranges of the three cameras, refer to FIG. 2(*b*). A shooting range 211 of the wide-angle camera 201 is the largest, a shooting range 212 of the medium-focus camera 202 is middle, and a shooting range 213 of the long-focus camera 203 is the smallest. For three to-be-shot target objects 214, 215, and 216, the medium-focus camera 202 can shoot two complete to-be-shot target objects 215 and 216, the long-focus camera 203 can shoot the complete to-be-shot target object 216 and a part of the to-be-shot target object 215, and the wide-angle camera 201 can shoot three complete to-be-shot target objects 214, 215, and 216. If the user finds the to-be-shot target object 214 in an image collected by the wide-angle camera 201, and expects to shoot the target object 214 by using the medium-focus camera 202 instead of the wide-angle camera 201, the user may change a motion posture of the electronic device 100 by moving the electronic device 100, to change content that can be shot by the medium-focus camera, so that the target object 214 is within the framing range of the medium-focus camera.

The image or video shot by the camera 193 may be output on the mobile phone 100 by using the display 194, or the digital image may be stored in the internal memory 121 (or the external memory 120). This is not limited in embodiments of the present invention.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding. An image collected by using the camera 190 and processed by the ISP and the DSP may be input to the NPU, and the NPU recognizes the processed image, including recognition of each individual in the image, scene recognition, and the like.

The external memory interface 120 may be configured to connect to an external memory card, for example, a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store one or more computer programs, and the one or more computer programs include instructions. The processor 110 may run the instructions stored in the internal memory 121, so that the electronic device 100 performs the image composition recommendation method provided in some embodiments of the present invention, various function applications, data processing, and the like. The internal memory 121 may include a program storage area and a data storage area. The program storage area may store an operating system. The program storage area may further store one or more applications (such as Gallery and Contacts), and the like. The data storage area may store data (such as photos and contacts) created during the use of the electronic device 100, and the like. In addition, the internal memory 121 may include a high-speed random access memory, and may further include a non-volatile memory, such as one or more disk storage components, a flash component, or a universal flash storage (universal flash storage, UFS). In some other embodiments, the processor 110 runs the instructions stored in the internal memory 121 and/or the instructions stored in the memory disposed in the processor, so that the electronic device 100 performs the image composition recommendation method provided in embodiments of the present invention, various function applications, and data processing.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal to a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C through the mouth, to enter a sound signal to the microphone 170C. One or more microphones 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects strength of the touch operation by using the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an icon of Messages, an instruction for viewing an SMS message is performed. When a touch operation whose touch operation strength is greater than or equal to a first pressure threshold is performed on an icon of Messages, an instruction for creating a new SMS message is executed.

The gyroscope sensor 180B may be configured to determine a real-time current motion posture of the electronic device 100 (for example, a tilt angle and a location of the electronic device 100). In some embodiments, an angular velocity of the electronic device 100 around three axes (namely, axes x, y; and z) may be determined by using the gyroscope sensor 180B. The gyroscope sensor 180B may be configured to perform image stabilization during shooting. For example, when the shutter is pressed, the gyroscope sensor 180B detects an angle at which the electronic device 100 jitters, obtains, through calculation based on the angle, a distance for which a camera module needs to compensate, and allows the camera to cancel the jitter of the electronic device 100 through reverse motion, to implement image stabilization. The gyroscope sensor 180B may be further used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100, and when the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a shooting scene, the electronic device 100 may measure a distance by using the distance sensor 180F to implement quick focusing.

The optical proximity sensor 180G may include, for example, a light-emitting diode (LED) and an optical detector such as a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust brightness of the display 194 based on the sensed ambient light brightness. The ambient light sensor 180L may also be configured to automatically adjust a white balance during shooting. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch component". The touch sensor 180K may be disposed on the display 194. The touch sensor 180K and the display 194 form a touchscreen, which is also referred to as a "touch screen". The touch sensor 180K is configured to detect a touch operation on or near the touch sensor. The touch sensor may transfer the detected touch operation to the application processor, to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, a shooting application and an audio playing application) may correspond to different vibration feedback effects. The motor 191 may also correspond to different vibration feedback effects for touch operations performed in different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network by using the SIM card, to implement a call function, a data communication function, and the like. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of the present invention, an Android system of a layered architecture is used as an example to illustrate the software structure of the electronic device 100.

Figure 3:
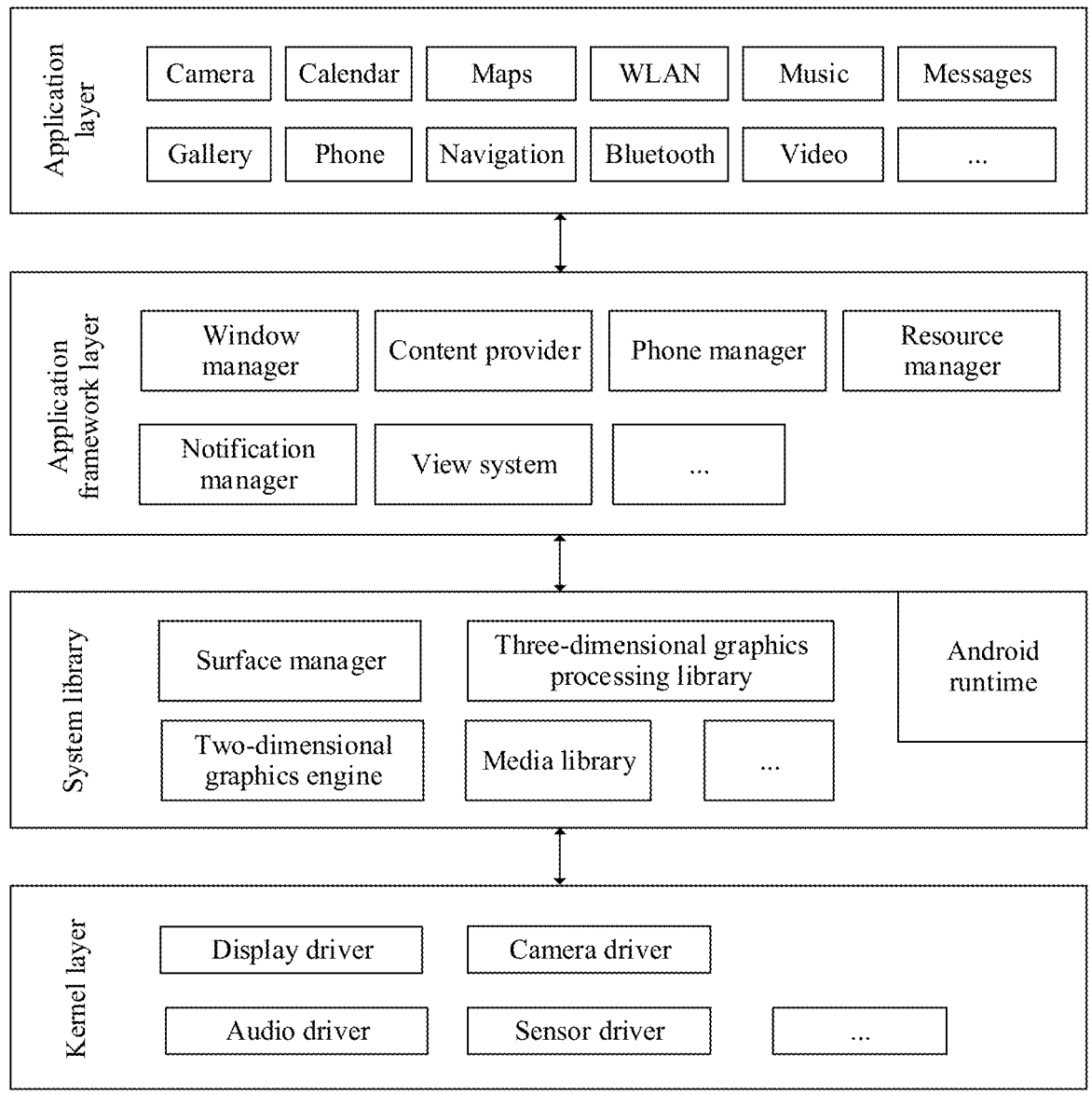
FIG. 3 is a block diagram of a software structure of an electronic device 100 according to an embodiment of the present invention.

FIG. 3 is a block diagram of a software structure of the electronic device 100 according to an embodiment of the present invention.

In the layered architecture, software is divided into several layers, and each layer has a clear role and task. The layers communicate with each other through a software interface. In some embodiments, an Android system is divided into four layers: an application program layer, an application program framework layer, Android runtime (Android runtime) and a system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, audio, calls that are made and received, a browsing history and a bookmark, an address book, and the like.

The view system includes visual controls such as a control for displaying a text and a control for displaying an image. The view system may be configured to construct an application program. A display interface may include one or more views. For example, a display interface including a Messages notification icon may include a text display view and an image display view.

The phone manager is configured to provide a communications function of the electronic device 100, for example, management of a call status (including answering, declining, or the like).

The resource manager provides various resources such as a localized character string, an icon, an image, a layout file, and a video file for an application.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports play back and recording in a plurality of commonly used audio and video formats, and static image files. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a shooting scene.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to start the camera application, then starts a camera driver by invoking the kernel layer, and captures a static image or a video by using the camera 193.

Specifically, the electronic device 100 may focus through the camera, and perform image preview based on information captured by the camera. After receiving that the user indicates a "shooting" operation, the electronic device 100 may generate, based on the information captured by the camera, an image obtained through shooting.

When the electronic device 100 includes two or more cameras, and one of the cameras is a wide-angle camera, a preview image with a large framing range is collected in advance by using a large angle of view of the wide-angle camera. Artificial intelligence (Artificial Intelligence, AI) identification is performed on the preview image collected by the wide-angle camera, to provide a user with a plurality of recommended images for different shot subjects. Compared with the conventional technology in which a single image composition recommendation suggestion is provided only for a single shot subject, in embodiments of this application, more shot subjects are accurately identified in a preview image with a large framing range, professional image composition recommendation may be performed on different shot subjects, and a plurality of recommended image candidates are provided for the user. The user may select one of the candidates to obtain a professional image composition effect of a corresponding shot subject.

The following describes a system architecture to which embodiments of this application are applied. As shown in FIG. 4(*a*), the system architecture mainly includes the following modules: an image collection module, a shooting control module, an image display module, a scene identification module, an image segmentation module, an aesthetics scoring module, an image processing module, an encoding module, and an image storage module. A main process of implementing shooting by using the system architecture is as follows: A user opens a camera, a photo mode and an image composition recommendation plug-in are loaded by using the shooting control module, and the image collection module is indicated to collect an image. The image composition recommendation plug-in is an application programming interface for implementing image composition recommendation at the application framework layer, and is configured to provide a recommended image composition for user shooting. Images collected by the image collection module are divided into two channels. One channel is sent to the image display module for presentation as a preview image, and the other channel is sent to the scene identification module to identify all shot subjects within a current framing range of a wide-angle camera, and determine a scene identification result according to a preset rule. For example, as described in the following specific example, the user has a meal in a restaurant opposite to a landmark building of a city, and a seat is located near a floor-to-ceiling window: A wide-angle preview image includes food on a dining table and the building outside the floor-to-ceiling window: The scene identification module can identify two different scenes: building and food.

After scene identification is completed, the collected image flows through the image segmentation module, edge feature extraction is performed on a shot subject of each scene, and the image is segmented based on a predefined image segmentation rule, to obtain an image composition set of a plurality of professional image compositions of each shot subject. A building and food that are identified are used as an example in the following specific examples. The image segmentation module performs edge feature extraction on the building in the building scene, and performs professional image composition such as centrosymmetric image composition, trichotomy image composition, and golden section image composition by using the building as a shot subject. A plurality of shooting image compositions formed through the professional image composition form an image composition set, which is referred to as a building image composition set. In addition, the image segmentation module performs edge feature extraction on the food in the food scene, and performs professional image composition such as diagonal image composition, triangle image composition, and guide line image composition by using the food as a shot subject. A plurality of shooting image compositions formed through the professional image composition form an image composition set, which is referred to as a food image composition set.

An image segmentation result obtained by using the building image composition set and the food image composition set as examples is input into the aesthetic scoring module. The aesthetic scoring module scores each shooting image composition in the image composition set of each shot subject according to a specified rule, and finally sorts the shooting image compositions according to scores. A shooting image composition with a top score of each shot subject is used as a recommended shooting image composition, and an image composition recommendation area is formed and reported to the image display module. After receiving the reported recommendation area, the image display module displays the recommended shooting image compositions on the preview image in real time in a manner of recommendation area boxes for selection by the user. As shown in FIG. 6(*a*) to FIG. 6(*e*), a shooting image composition with a highest score in the building image composition set and a shooting image composition with a highest score in the food image composition set are separately used as recommended shooting image compositions and displayed in the recommendation area boxes.

The user moves, by using the shooting control module, a viewfinder center to a recommendation area box selected by the user. After the user confirms the selection, the shooting control module indicates, by delivering shooting control parameters, the image collection module to collect an image. In this case, the user may complete shooting by using a camera selected in the delivered shooting control parameters. The image collection module sends data of an image shot by the selected camera to the image processing module. After being processed by a post-processing algorithm, the image data is sent to the encoding module to form an image in a specific image format, and the image is stored in the image storage module.

It may be understood that the image collection module, the shooting control module, the image display module, the scene identification module, the image segmentation module, the aesthetics scoring module, the image processing module, the encoding module, and the image storage module may be implemented by different processing units in the processor 110 in the electronic device 100, or may be implemented by one or more different processors. For example, the image collection module may be implemented by the camera 193, the shooting control module is implemented by the GPU in the processor 110, the image display module may be implemented by the display 194, the scene identification module, the image segmentation module, and the aesthetics scoring module are implemented by the NPU in the processor 110, the image processing module is implemented by the ISP and the DSP in the processor 110, and the image storage module is implemented by the memory in the processor 110.

It should be noted that, the user may indicate, in a plurality of manners, the electronic device to open the camera. For example, the user may tap a camera icon to indicate the electronic device to open the camera, the user may indicate the electronic device to open the camera in a voice mode, or the user may draw a "C"-shaped track on a screen in a screen-off state to indicate the electronic device to open the camera. A manner of triggering the electronic device to open the camera is not limited in embodiments of the present invention.

Embodiment 1: The following specifically describes the technical solutions provided in embodiments by using an example in which a mobile phone in structures shown in FIG. 1 and FIG. 3 is the electronic device 100 and the electronic device 100 includes a wide-angle camera, a medium-focus camera, and a long-focus camera. The mobile phone includes a touchscreen, and the touchscreen may include a display panel and a touch panel. The display panel may display an interface. The touch panel may detect a touch operation of a user, and report the touch operation to a processor of the mobile phone for corresponding processing.

Pixels and resolutions of different cameras may be the same or different. For example, in the three cameras, the medium-focus camera may have a highest pixel and resolution.

In the three cameras, the wide-angle camera has a largest angle of view; and can shoot a largest view range. An angle of view of the medium-focus camera is less than an angle of view of the wide-angle camera and greater than an angle of view of the long-focus camera. To be specific, the angle of view of the medium-focus camera is less than that of the wide-angle camera but greater than that of the long-focus camera, so that the medium-focus camera may be configured to shoot an object in a relatively large view range. In addition, compared with the other two cameras, the medium-focus camera has best image quality (or picture quality). The angle of view of the long-focus camera is less than those of the wide-angle camera and the medium-focus camera, but a focal length of the long-focus camera is greater than those of the wide-angle camera and the medium-focus camera. Therefore, the long-focus camera is suitable for capturing distant view information and shooting a distant object.

The angle of view indicates a largest angle range that can be shot by the camera in a process in which the mobile phone shoots an image, and the object in the angle range may be captured by the camera. If a to-be-shot object is in the angle range, the to-be-shot object may be shot by the mobile phone. If the to-be-shot object is outside the angle range, the to-be-shot object cannot be shot by the mobile phone. Usually, a larger angle of view of the mobile phone indicates a larger shooting range and a smaller focal length. However, a smaller angle of view of the mobile phone indicates a smaller shooting range and a larger focal length. It may be understood that "angle of view" may also be replaced with words such as "vision range", "view range", "field of vision", "imaging range" or "imaging field of view". To be specific, a name of "angle of view" is not limited in this specification, provided that the foregoing concepts are expressed. It may be understood that "angle of view" is merely a term used in this embodiment, a meaning indicated by "angle of view" has been recorded in this embodiment, and the name of "angle of view" does not constitute any limitation on this embodiment. In addition, in some other embodiments, "angle of view" may also be referred to as another term such as "vision range", "view range", "field of vision", "imaging range" or "imaging field of view".

In some embodiments, a resolving power (Resolution) of the medium-focus camera is the highest. The resolving power, also known as resolution, refers to an ability of a shooting system to reproduce details of an object. The resolving power may be understood as a capability for resolving details of a shot original. For example, if the shot original is a piece of paper covered with many lines, an image shot by a mobile phone having a strong resolving power may identify 100 lines, and an image shot by a mobile phone having a weak resolving power can only identify 10 lines. If the resolving power of the mobile phone is stronger, after the mobile phone captures an image of the to-be-shot object, a capability of restoring details of the to-be-shot object is higher. For example, if the user wants to enlarge the captured image, a definition of the enlarged image is higher. Usually, the resolving power is associated with a pixel, a resolution, and the like. A mobile phone with a higher pixel or resolution has a stronger resolving power. The image quality or the picture quality may include many aspects, such as a definition, an acutance, a resolution, a color gamut, a color purity, and a color balance.

In some embodiments, the image quality of the medium-focus camera is higher than that of the other two cameras, and the angle of view of the medium-focus camera is in the middle, so that the first camera may capture a relatively large view range. Because the medium-focus camera has a stronger resolving power, and the like, the medium-focus camera has a higher comprehensive capability. Therefore, the medium-focus camera may be used as a primary camera, and the other two cameras may be used as auxiliary cameras.

In some embodiments, a location of the medium-focus camera in the mobile phone may be between the wide-angle camera and the long-focus camera. In this way, the medium-focus camera used as the primary camera may capture information about the to-be-shot object in a main angle of view.

When the mobile phone includes the wide-angle camera, the medium-focus camera, and the long-focus camera, in different shooting scenes, the mobile phone may perform shooting by using different cameras in the cameras. To be specific, the mobile phone may select, from the wide-angle camera, the medium-focus camera, and the long-focus camera, a camera suitable for a current shooting scene for shooting, so that a relatively good shooting effect may be obtained in the current shooting scene.

Figure 4A:
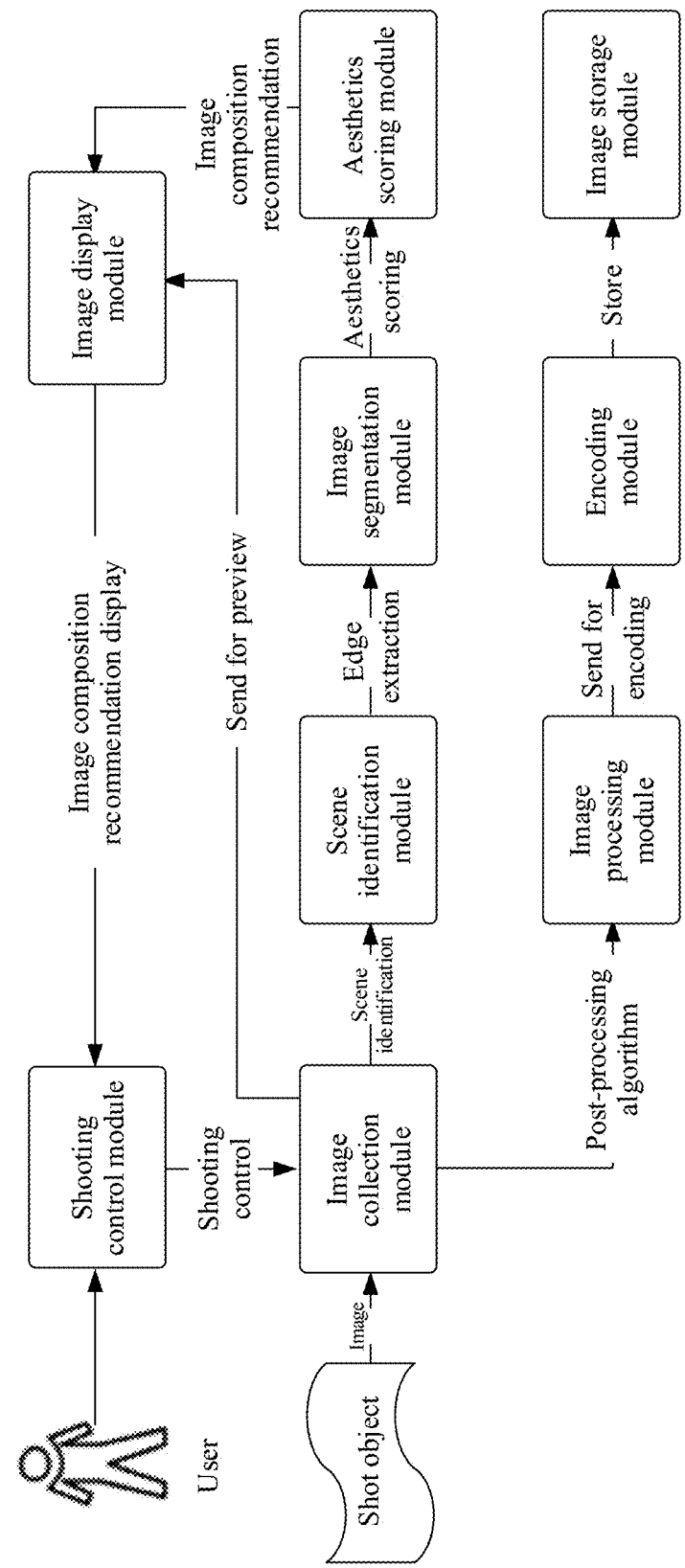
FIG. 4(a) and FIG. 4(b) are schematic diagrams of a system architecture and a specific implementation according to an embodiment of the present invention.
Figure 4B:
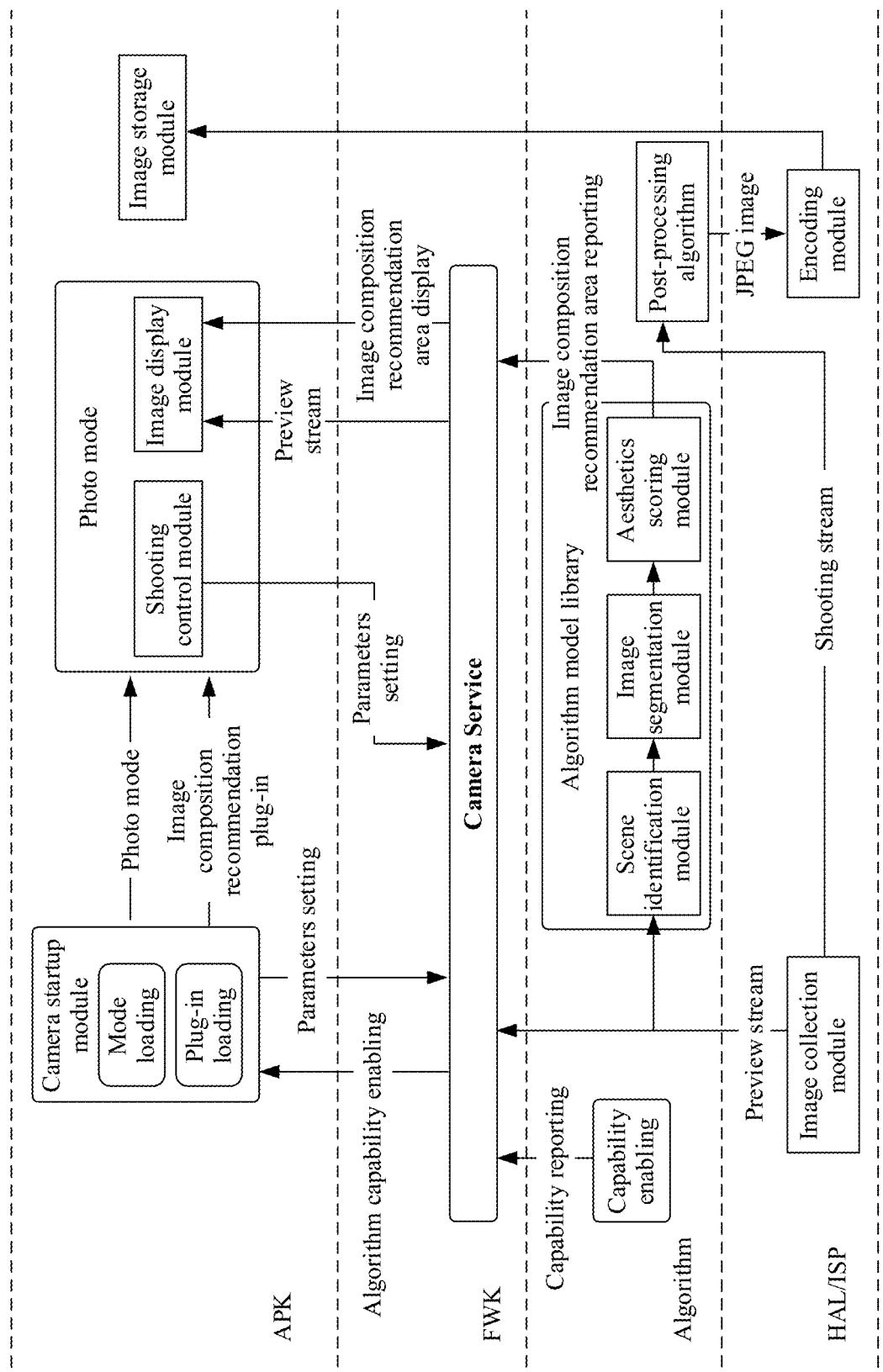

In a specific implementation of Embodiment 1 of the present invention, FIG. 4(b) further shows a specific implementation of each module in FIG. 4(a) in the mobile phone. First, a user opens a camera application on the mobile phone. As shown in FIG. 4(b), an algorithm layer checks, by using a capability enabling module, whether the cameras of the mobile phone include a wide-angle camera, and notifies and reports a check result, that is, a capability of the mobile phone. If the mobile phone has a wide-angle camera, the capability enabling module reports, to a camera service (Camera Service) at a framework layer (framework, FWK), that the mobile phone has a capability of normally running an image composition recommendation plug-in. Otherwise, if the mobile phone does not have a wide-angle camera, the capability enabling module reports, to the camera service (Camera Service), that the mobile phone cannot normally run the image composition recommendation plug-in. A camera startup module may be set in the camera application of the mobile phone. After receiving the capability reported by the capability enabling module, the camera service (Camera Service) indicates the camera startup module to load a photo mode and the image composition recommendation plug-in. Certainly, if the capability enabling module reports that the mobile phone cannot normally run the image composition recommendation plug-in, the camera startup module may not load the image composition recommendation plug-in.

After the loading is completed, the camera startup module configures a preview stream and a shooting stream, and indicates an image collection module of an ISP to collect an image. The image collection module collects the image by using the wide-angle camera. The collected preview stream is reported through an image rotation channel. One channel is sent to an image display module for real-time preview; and one channel passes through an algorithm model library as an input of the algorithm model library. Image data input into the algorithm model library first passes through a scene identification module, all shot subjects in current framing of the wide-angle camera are identified, and different scenes are determined based on types of the shot subjects and a preset rule. The scene identification module provides an identification result of a current shot subject and a current scene, and the identification result is used as an input of an image segmentation module. The image segmentation module performs edge feature extraction on each shot subject, and segments an image based on a predefined image segmentation rule, to obtain an image composition set of a plurality of professional image compositions of each shot subject. The image composition set is used as an input of an aesthetics scoring module. The aesthetics scoring module scores the image composition set of each shot subject. A scoring rule may be constructed based on a plurality of factors such as a subject type, a location of the subject in an image, and a proportion of the subject in the image. Finally, scores of the image composition set of each subject are sorted, an image composition with a top score corresponding to each subject is selected as a recommended image composition, and a corresponding image composition recommendation area is reported.

After receiving the reported image composition recommendation area, the image display module draws a corresponding recommendation area box in a preview image in real time and prompts the user to perform selection. The user moves the electronic device to superimpose a preview viewfinder center with a center of the recommendation area to complete selection, or the user may move the electronic device to superimpose a preview view finder area with the recommendation area to complete selection (that is, a framing range of a second camera of the electronic device and the first image composition meet a matching condition in this application). When the user completes the selection, if a camera that currently collects the preview image is the medium-focus camera, a shooting control module prompts the user to take a photo. If the camera that currently collects the preview image is the wide-angle camera, the camera is automatically switched to the medium-focus camera through parameter delivery, and the user is prompted to take a photo.

When the user taps a shutter button, the shooting control module delivers a shooting stream, indicates the image collection module to collect images to fill in an image transmission channel of the shooting stream, and sends the images to a post-processing algorithm. After an encoding module at a hardware abstract layer (hardware abstract layer, HAL) encodes the images into JPEG images, an image storage module of an Android application package (android application package, APK) stores the JPEG images.

According to embodiments of the present invention, the shot subject is a to-be-shot target object, or may be referred to as a subject for short. The shot subject may be a movable object (such as a person, an animal, or an insect), an immovable object (such as a building, a statue, a picture, or a rock), a plant (such as a tree or a flower), a landscape (such as an ocean, a peak, or a sunset), or a natural phenomenon (such as a lunar eclipse or a solar eclipse). The shot subject in embodiments of the present invention may include one or more target objects. For example, one person may be used as a first shot subject, and one building may be used as a second shot subject: or several persons may be used as the first shot subject, and one animal may be used as the second shot subject: or one person and one animal may be used as the first shot subject, and one plant may be used as the second shot subject.

Different scenes are determined based on types of shot subjects, including architecture, food, stage, scenery, potted plant, sunset, night, portrait, animal, plant, beach, motion, baby, cup, and toy.

The professional image composition in the present invention may include but is not limited to centrosymmetric image composition, golden section image composition, trichotomy image composition, diagonal image composition, triangle image composition, horizontal line image composition, vertical line image composition, guide line image composition, frame image composition, S-shaped image composition, and the like.

Figure 5A:
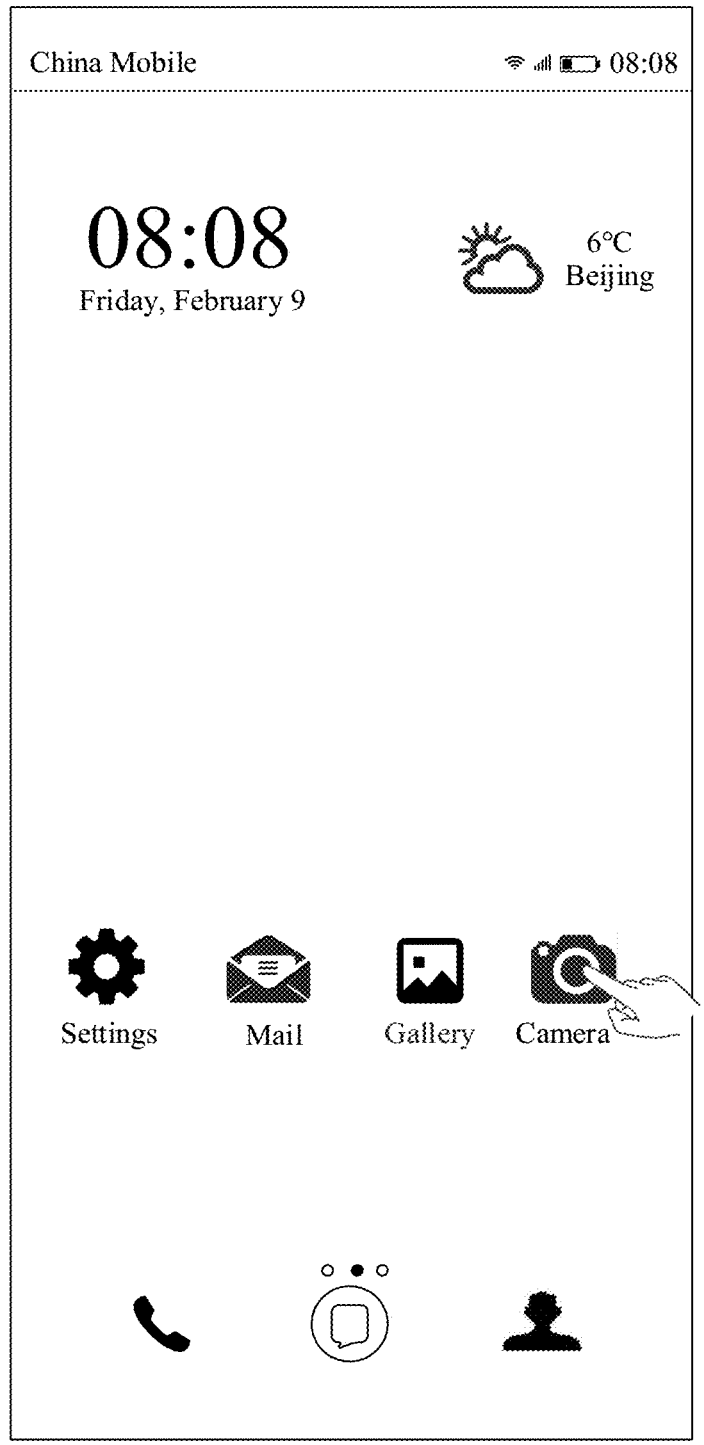
FIG. 5(a) to FIG. 5(c) are schematic diagrams of a group of interfaces for starting a camera according to an embodiment of the present invention.
Figure 5B:
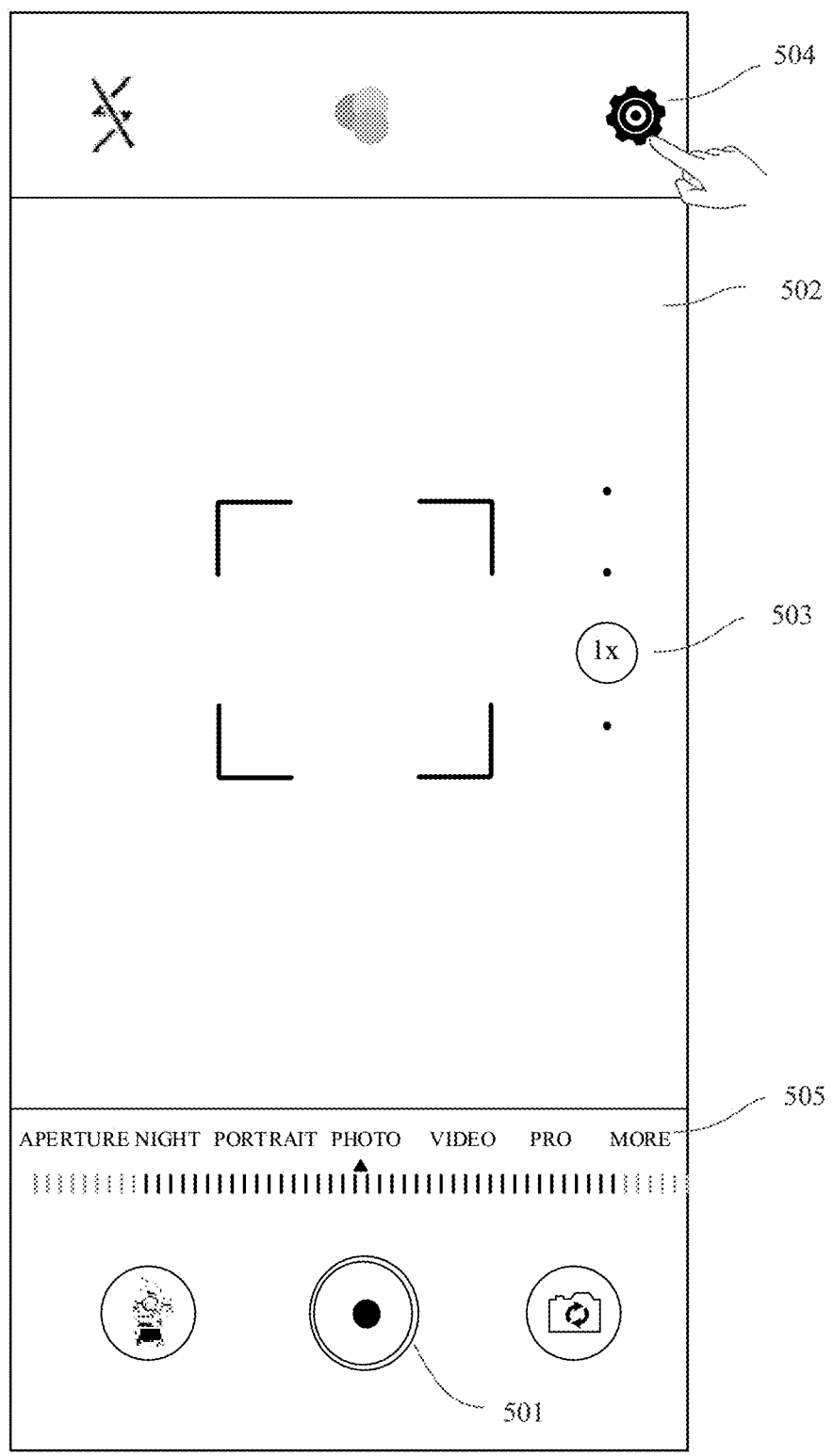

The following describes in detail a process in which the user performs shooting by using the mobile phone. FIG. 5(a) shows a graphical user interface (graphical user interface, GUI) of the mobile phone. The GUI is a home screen of the mobile phone. The home screen of the mobile phone includes common application icons, such as Weather, Date, Phone, Contacts, Settings, Email, Album, and Camera. The user taps a camera application (application, APP) icon on the home screen. After detecting the operation, the mobile phone opens the camera at the application layer on the background, starts the camera application, and enters a shooting interface shown in FIG. 5(b). The shooting interface includes a shutter button 501, a viewfinder frame 502, a control 503 used for camera zoom, a control 504 used to indicate a setting option, a more control 505, and the like. The user taps the setting control 504 to enter a GUI shown in FIG. 5(c). A control 506 used to indicate to turn on or turn off an "image composition recommendation" option is displayed on the GUI. The user turns on the "image composition recommendation" option of the control 506. After the camera startup module loads the image composition recommendation plug-in, the camera may enter a wide-angle preview shown in FIG. 6(a). Optionally, when the "image composition recommendation" option is turned on, the camera may also normally enter a medium-focus preview shown in FIG. 8(a). This is not limited in this application. The "image composition recommendation" option may be played after the setting control 504 is tapped. The "image composition recommendation" option may alternatively be displayed for the user to turn on or turn off after the more control 505 is tapped. Optionally, the user enables an image composition recommendation function for current shooting, and the camera enters a wide-angle preview: If the user does not disable the image composition recommendation function before exiting the camera application after current shooting is completed, the wide-angle preview is directly entered when the camera application is opened next time. When the user opens the camera application next time and does not want to use the image composition recommendation function, the user may quickly disable the image composition recommendation function by switching the control 503 used for camera zoom from a wide angle to 1× shown in FIG. 5(b). Optionally, when the camera enters a wide-angle preview interface, a control used to quickly disable the "image composition recommendation function" may be added to the wide-angle preview interface.

Figure 5C:
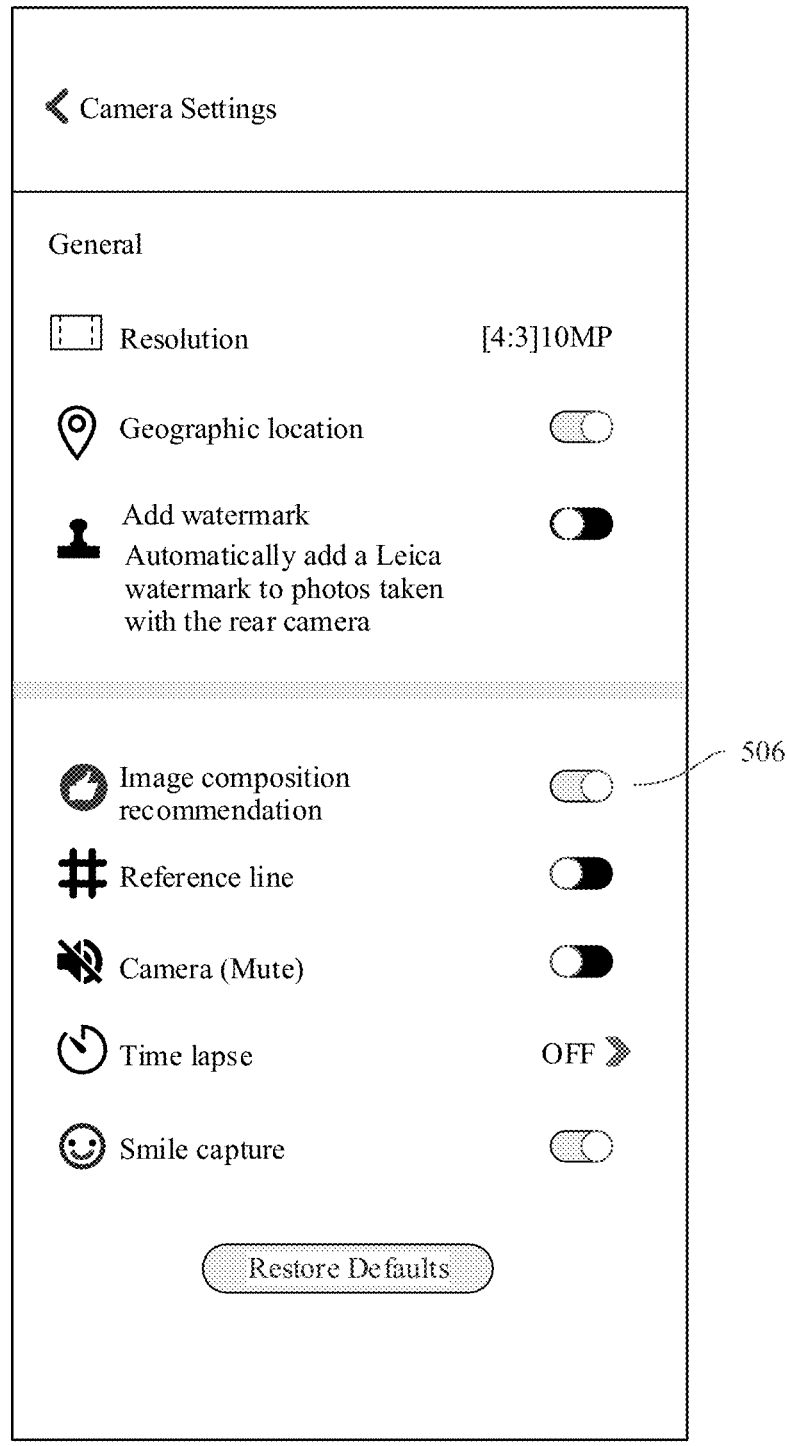
Figure 6A:
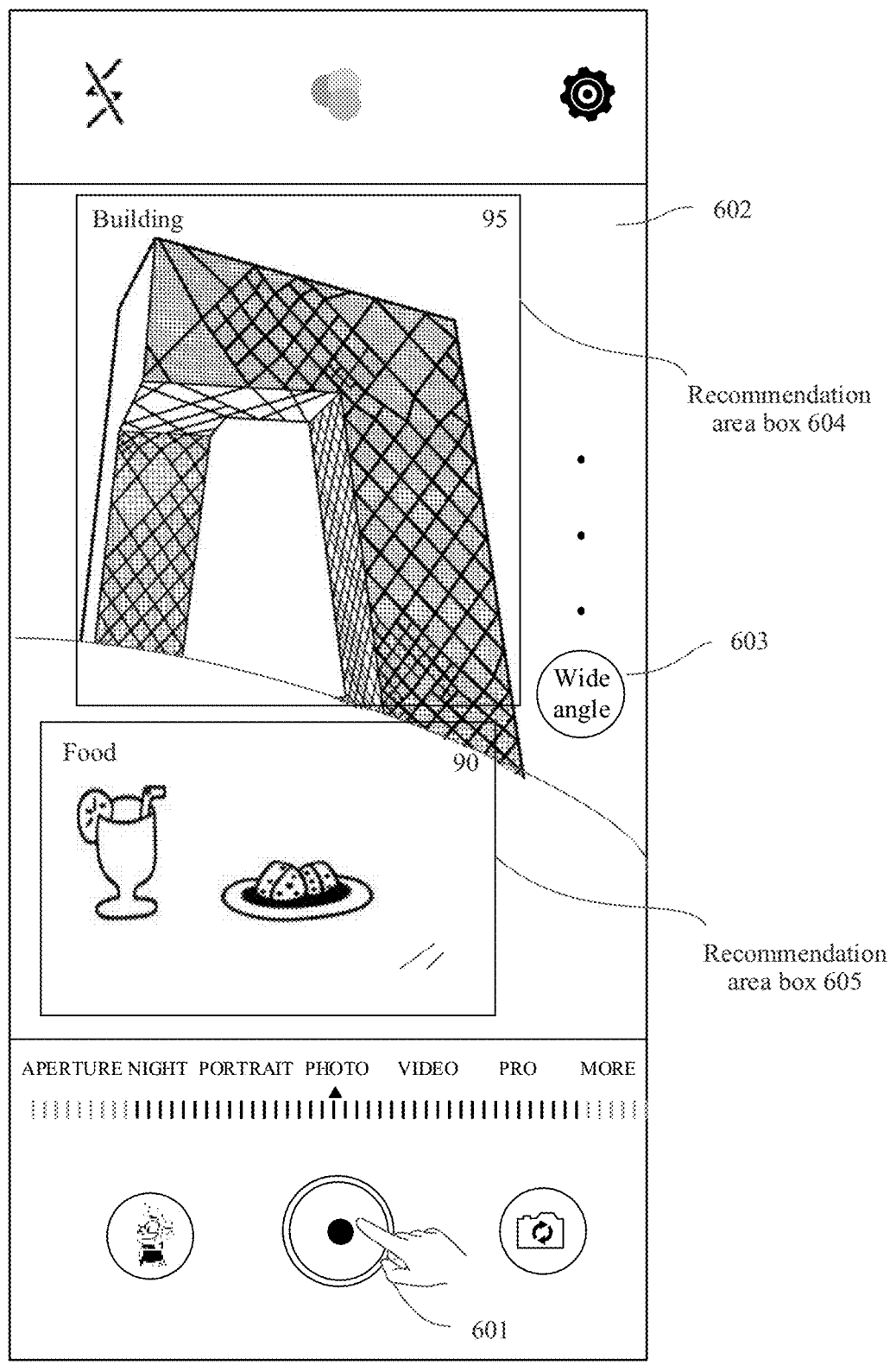
FIG. 6(a) to FIG. 6(e) are schematic diagrams of a group of interfaces according to an embodiment of the present invention.

In a specific implementation, the user turns on the "image composition recommendation" option, and taps a return button on the left of "Camera settings" shown in FIG. 5(c). After returning to a shooting preview interface, the mobile phone automatically switches to the wide-angle preview GUI shown in FIG. 6(a). The GUI may be referred to as a camera preview interface. The preview interface includes a shutter button 601, a viewfinder frame 602, a control 603 used for camera zoom, and the like. The control 603 used for camera zoom prompts that the camera is currently in a wide-angle preview mode. A scene shown in FIG. 6(a) is that the user has a meal in a restaurant opposite to a landmark building of a city, and a seat is located near a floor-to-ceiling window. There are a plurality of shot subject types in a wide-angle preview image, and the scene identification module identifies scenes of two different shot subjects: a building and food.

The image segmentation module separately performs image segmentation in a building scene and a food scene on the wide-angle preview image based on the two identified shot subjects. The building is used as a shot subject, and image composition such as centrosymmetric image composition and golden section image composition is performed, to obtain a highest score of the centrosymmetric image composition, which is 95. A result with the highest score is selected as a recommended image composition and displayed on the GUI, that is, a building shown in a recommendation area box 604. In addition, a scene type of the recommended image composition is marked as "building" in the recommendation area box 604, and the highest score "95" is also marked in the recommendation area box 604.

The image segmentation module further performs a plurality of types of image composition by using the food as a shot subject, to obtain a highest score of trichotomy image composition, which is 90. A result with the highest score is selected as a recommended image composition and displayed on the GUI, that is, food shown in a recommendation area box 605. A scene type "food" is marked in the recommendation area box 605, and the highest score "90" is also marked in the recommendation area box 605.

Figure 6B:
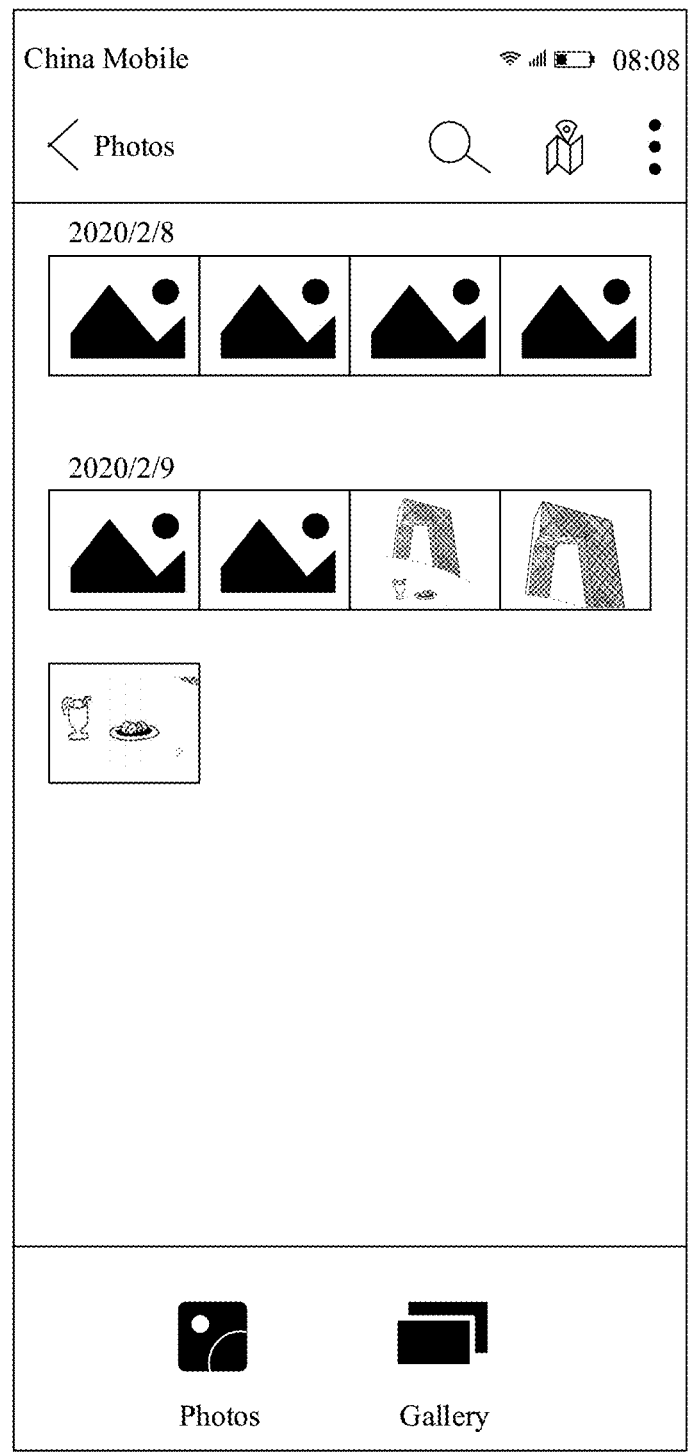

If the user directly taps the shutter button 601 on this interface to take a photo, a preview image in a wide-angle mode is shot by default. Optionally, the preview image is further cropped after being shot, to obtain a recommended image in the building scene and a recommended image in the food scene. As shown in FIG. 6(b), the shot image in the wide-angle mode, the recommended image in the building scene, and the recommended image in the food scene are all saved to the camera for selection by the user.

Figure 6C:
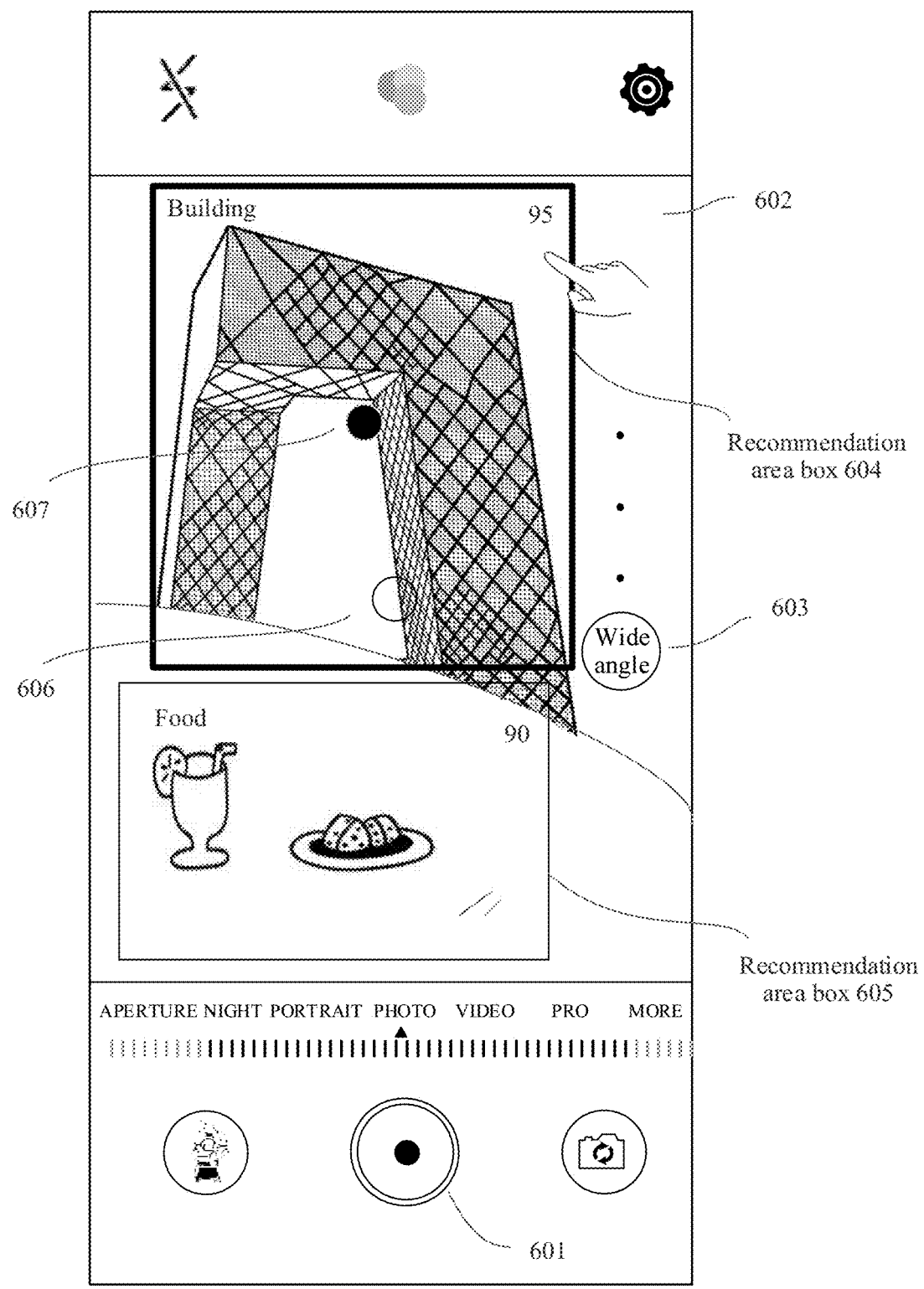

If the user does not tap the shutter button 601, but selects one of the recommended image compositions, as shown in FIG. 6(c), the user selects a recommended image composition of the building. The user taps an edge of the recommendation area box 604 or an internal area of the recommendation area box 604, and an edge of the selected recommendation area box 604 becomes thicker, to prompt the user that a recommended image of the building has been selected. In addition, marks 606 and 607 (that is, guide marks in this application) used to assist the user in moving the camera appear in the viewfinder frame 602. The mark 606 is a circular viewfinder center of the current viewfinder frame 602, or may be a mark such as a cross or a shooting auxiliary box. The mark 607 is a center of an image composition recommendation area of the building in the recommendation area box 604.

Optionally, because the user has selected the recommended image composition of the building, the recommendation area box 605 including the food may automatically disappear, and only the recommendation area box 604 including the building and the marks 606 and 607 used by the user to move the camera are retained. In this way, in a process in which the user moves the camera, the processor does not need to perform a real-time operation on the recommendation area box 605.

Optionally, the user does not select the recommended image composition of the building, and the marks 606 and 607 that guide the user to move the camera are automatically displayed on the preview interface after the lens of the mobile phone stays for a time period, for example, 2 to 3 seconds. In this case, because the user has not performed any operation on the display, a center of an image composition recommendation area of the food in the recommendation area box 605 may also be displayed, to provide the user with a specific guide for operating the mobile phone based on the image composition of the food.

The user moves the mobile phone based on locations of the marks 606 and 607. When the mobile phone moves, a shooting range of each camera of the mobile phone changes as the mobile phone moves. When the mark 606 is moved to coincide with the mark 607 of the selected recommended image composition of the building, a framing range of the medium-focus camera is consistent with a range of the image composition recommendation area of the building. The movement includes user operations that can change a framing range of a camera of the mobile phone, such as panning (for example, panning leftward or panning upward), moving forward and backward (approaching or moving away from the shot subject), turning, and rotation.

In a possible implementation, in the foregoing process in which the user operates the mobile phone, the medium-focus camera keeps in a working state, so that a preview stream collected by the image collection module includes a preview stream of the medium-focus camera. In this way, in an entire process in which the user operates the mobile phone, the processor may start a corresponding algorithm at any time to determine whether the framing range of the medium-focus camera and the recommended image composition of the building meet a specific matching condition. The matching condition may be that a coincidence degree or a similarity between a preview image collected by the medium-focus camera and the recommended image composition of the building is above a preset threshold (for example, 95%). If the matching condition is met, a determining result is that the framing range of the medium-focus camera is consistent with the range of the image composition recommendation area of the building.

In another possible implementation, as shown in FIG. 6(c), there is still a distance between the mark 606 and the mark 607. In this case, the medium-focus camera does not work. When the user operates the mobile phone to enable the mark 606 to move into of the mark 607, the medium-focus camera is started, so that the preview stream collected by the image collecting module includes the preview stream of the medium-focus camera. After the medium-focus camera starts to work, the processor can start a corresponding algorithm to determine whether the framing range of the medium-focus camera and the recommended image composition of the building meet a specific matching condition. The matching condition may be that a coincidence degree or a similarity between a preview image collected by the medium-focus camera and the recommended image composition of the building is above a preset threshold (for example, 97%). If the matching condition is met, a determining result is that the framing range of the medium-focus camera is consistent with the range of the image composition recommendation area of the building.

Figure 6D:
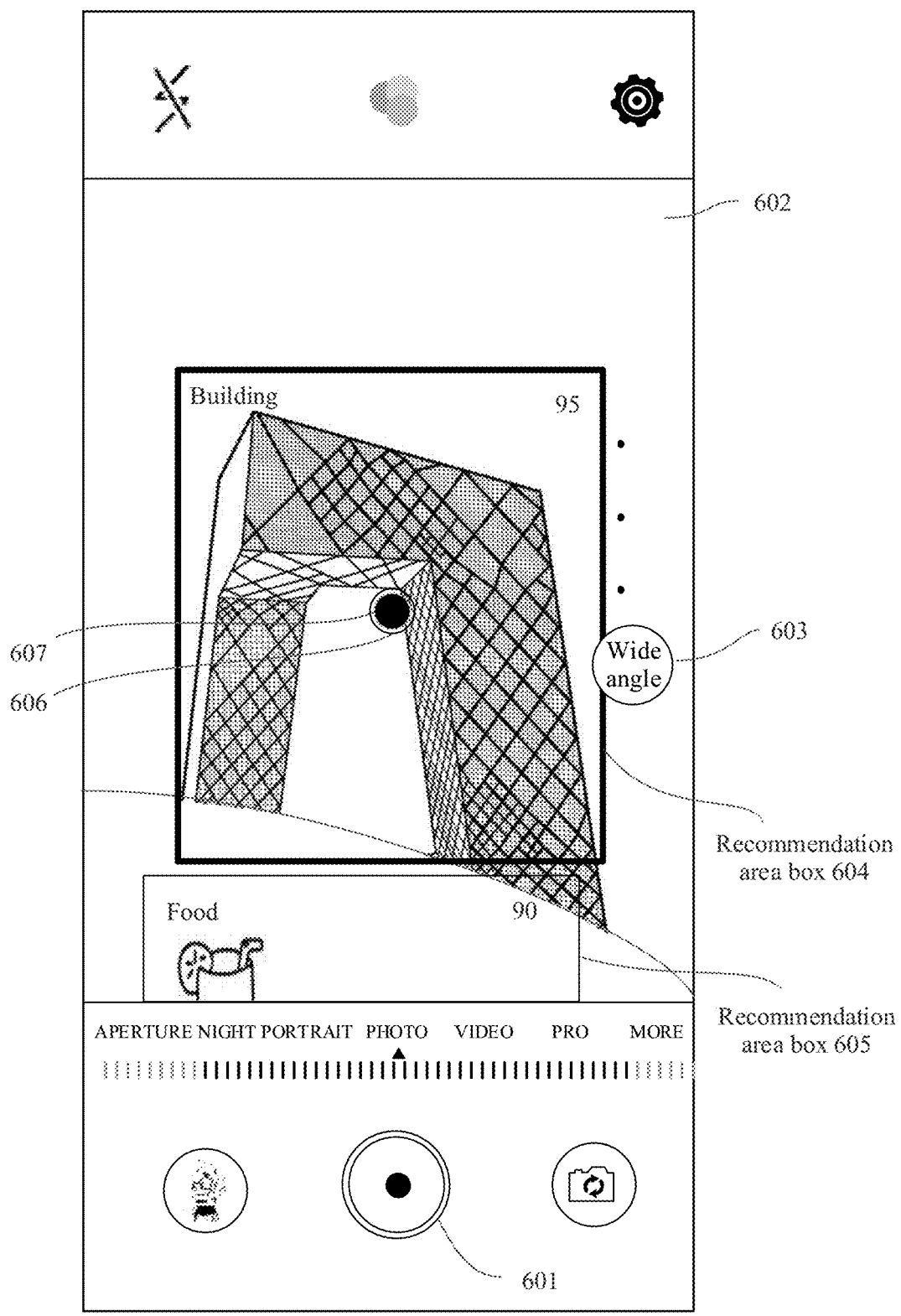

In still another possible implementation, in a process in which the user operates the mobile phone, if a framing range of a camera of the mobile phone changes, preview image data collected by the wide-angle camera also changes. For example, as shown in FIG. 6(d), as the user moves the mobile phone upward, only one corner of the food is left in the image collected by the wide-angle camera, and an area of the blue sky on the upside of the viewfinder frame 602 gradually increases. The scene identification module may re-identify a subject, the blue sky, based on a change of the shot subject. After an identification result is sent to the image segmentation module, the image segmentation module performs professional image composition by using the blue sky as the subject, and then the aesthetics scoring module provides a recommended image composition of the blue sky, and the recommended image composition of the blue sky is displayed on the shooting preview interface in real time (not shown in FIG. 6(d)). At the same time, operations such as image segmentation, image composition, and aesthetics scoring do not need to be repeatedly performed on the recommended image of the building. The original image composition with the highest score is retained, and a change of the recommendation area box is displayed.

As shown in FIG. 6(d), colors of the auxiliary marks 606 and 607 may be changed, to prompt the user that the mobile phone has aligned the current image composition recommendation area. Optionally, the prompt for selection of the recommended image composition is not limited to a thicker edge of the recommendation area box, and may further include that a color of an edge of the selected recommendation area box 604 changes, or the edge becomes thicker and a color changes. The prompt for alignment by the mobile phone is not limited to a thicker auxiliary mark, and further includes that a color or a shape of the auxiliary mark changes. In addition, the recommendation area box 604 also changes on display, provided that the change is different from the change of the prompt for selection of the recommended image composition.

Figure 6E:
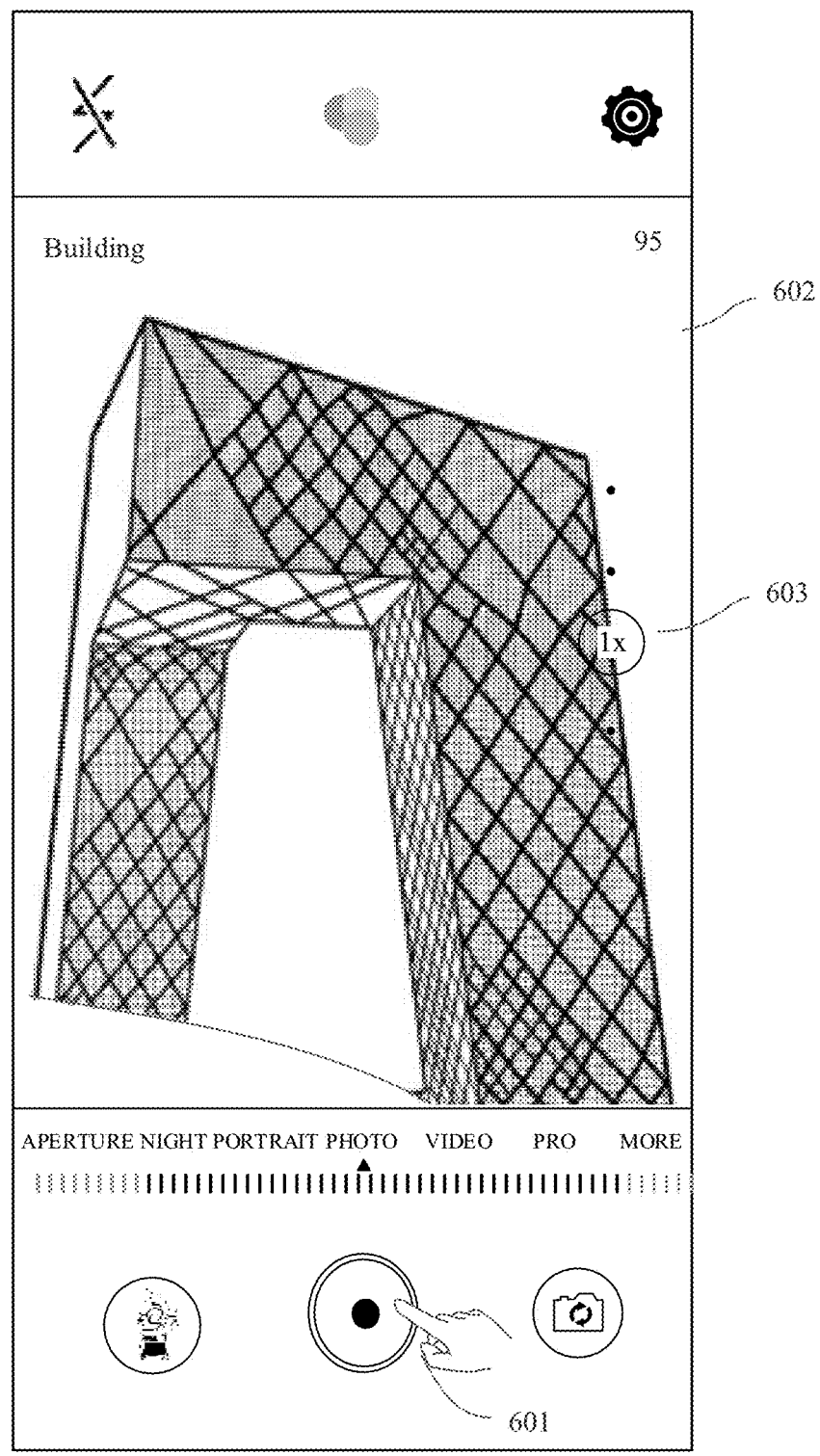

In an optional implementation, when the image composition recommendation area selected by the user has been aligned after the mobile phone moves, and it is detected that the mobile phone stops moving and keeps in a stable state for a specific time period, an image collection camera automatically switches from the wide-angle camera to the medium-focus camera, as shown in FIG. 6(e). In response to automatic switching of the camera, the mobile phone automatically uses the medium-focus camera to take a photo and the user does not need to tap the shutter button 601. Alternatively, the mobile phone takes a photo based on an operation entered by the user. The operation entered by the user may be tapping the shutter button 601 in FIG. 6(e), or may be a voice instruction (not shown in the figure) of the user. The mobile phone takes a photo after receiving the voice instruction of the user. After the camera is switched from the wide-angle camera to the medium-focus camera, that is, a 1x primary camera, the subject identifier "building" and the score "95" of the selected recommended image are still displayed on a shooting interface. Optionally, the foregoing identifiers may not be displayed or only a part of the identifiers is displayed.

In an optional implementation, when the image composition recommendation area selected by the user has been aligned after the mobile phone moves, and it is detected that the mobile phone stops moving and keeps in a stable state for a specific time period, it indicates that the user has confirmed that the recommended image composition in the current recommendation area box is selected, the image collection camera does not automatically switch from the wide-angle camera to the medium-focus camera, but text or voice information on a GUI in FIG. 6(d) is provided. The text or voice information is used to prompt the user to switch the current wide-angle camera to the medium-focus camera. Optionally, the text information is "Switch to the primary camera and take a photo?". After the user taps "Yes" in the prompt information, the camera is switched to the medium-focus camera for shooting. The text or voice information may also prompt the user to switch the current wide-angle camera to another camera, for example, a 1.5×, 3×, or 5× long-focus camera. A scenario in which a long-focus camera is switched to a 1.5× long-focus camera for shooting is described in detail below:

In another specific implementation, in a complex scene with a large quantity of types of shot subjects and a large quantity of shot subjects, the "image composition recommendation" option is not turned on, the user can be prompted to enable the image composition recommendation function. After detecting an operation of tapping the camera application icon on the home screen by the user, the mobile phone may start the camera application. After the camera application is started, an algorithm reports an image composition recommendation plug-in capability, and the camera startup module loads a photo mode and an image composition recommendation plug-in based on a capability that the mobile phone has the wide-angle camera. If the user does not turn on the "image composition recommendation" option, although the camera startup module loads the image composition recommendation plug-in, the mobile phone directly enters a shooting preview interface GUI of the medium-focus camera because a wide-angle preview is not allowed to be enabled by the user. In this case, the image collection module further collects a preview image by using the medium-focus camera.

Figure 7A:
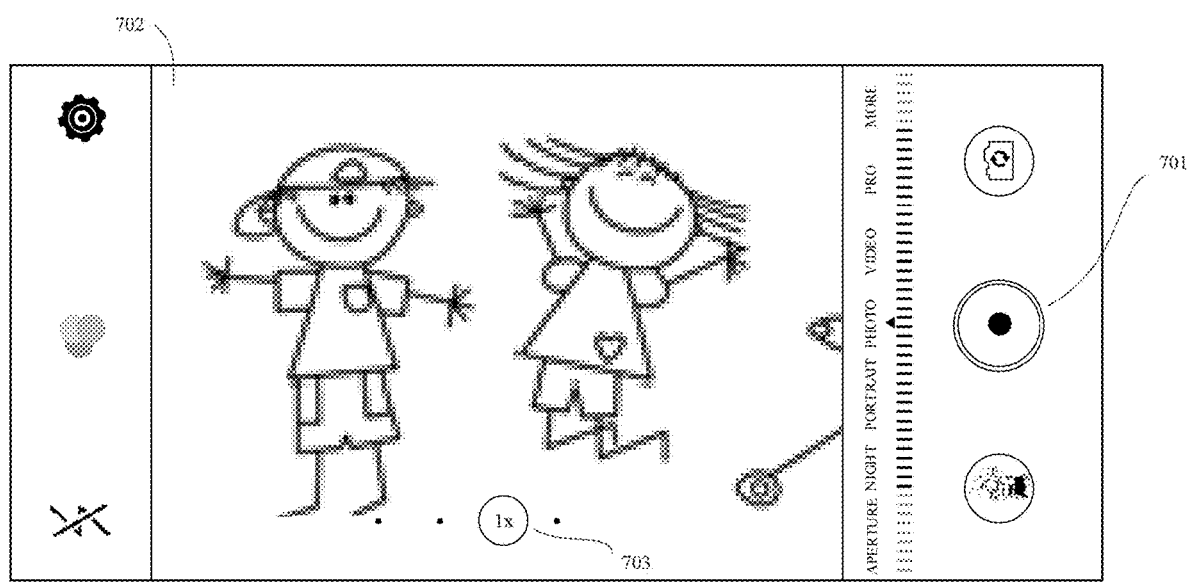
FIG. 7(a) to FIG. 7(h) are schematic diagrams of another group of interfaces according to an embodiment of the present invention.
Figure 7B:
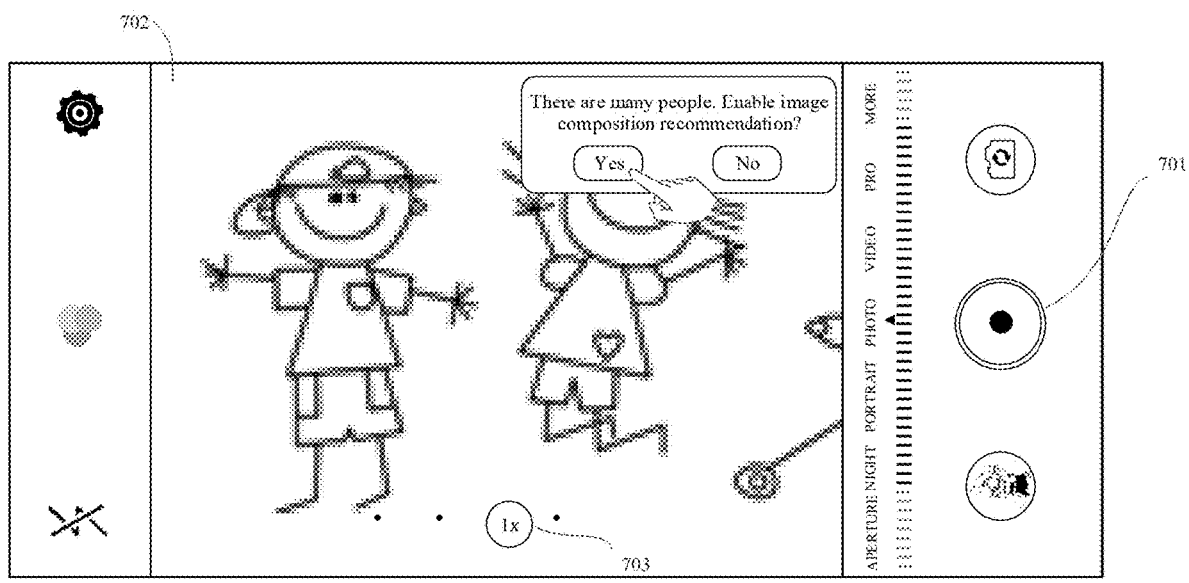

As shown in FIG. 7(a), a medium-focus preview interface includes a shutter button 701, a viewfinder frame 702, and a control 703 used to indicate zoom. In this case, because the camera has loaded the image composition recommendation plug-in, the image collection module simultaneously collects images by using the medium-focus camera and the wide-angle camera on the background. One channel of collected preview images is sent to the image display module and previewed in real time, and one channel is input to the algorithm model library for scene identification. There are a plurality of children and toys in an actual shooting scene, and only two of the children are displayed in a medium-focus preview; as shown in FIG. 7(a). The mobile phone identifies that there are other children and toys in the shooting scene based on an image collected by the wide-angle camera, and displays prompt information "There are many people. Enable image composition recommendation?" on the GUI, as shown in FIG. 7(b). The user selects, based on a personal preference and prompt information, whether to switch to a wide-angle preview mode.

Figure 7C:
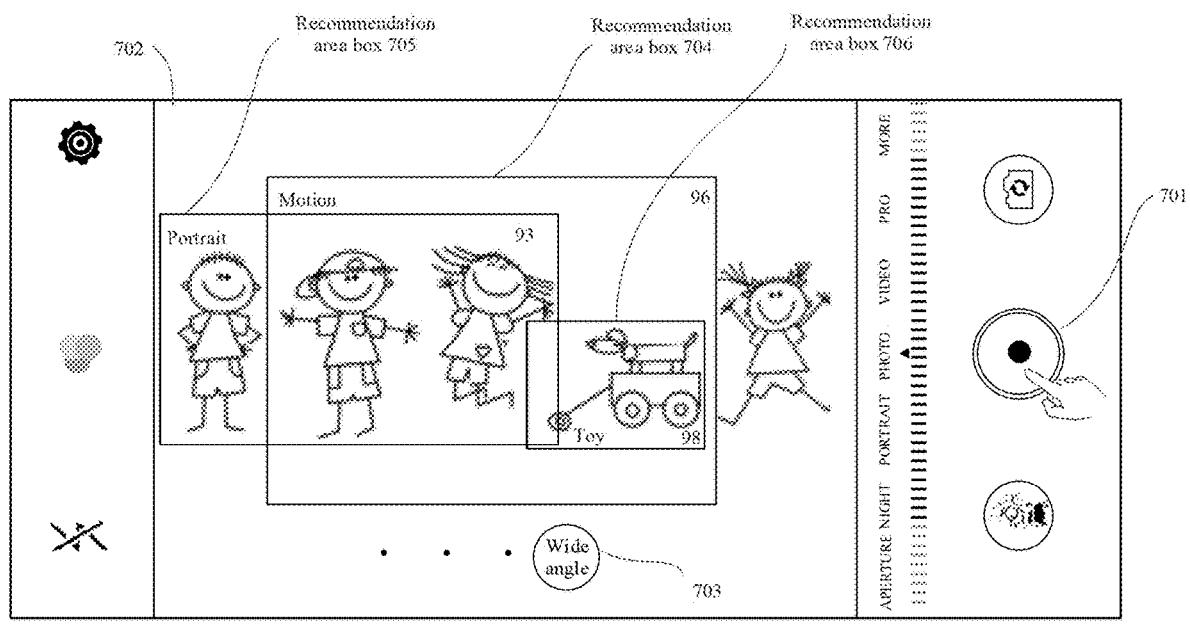
Figure 7D:
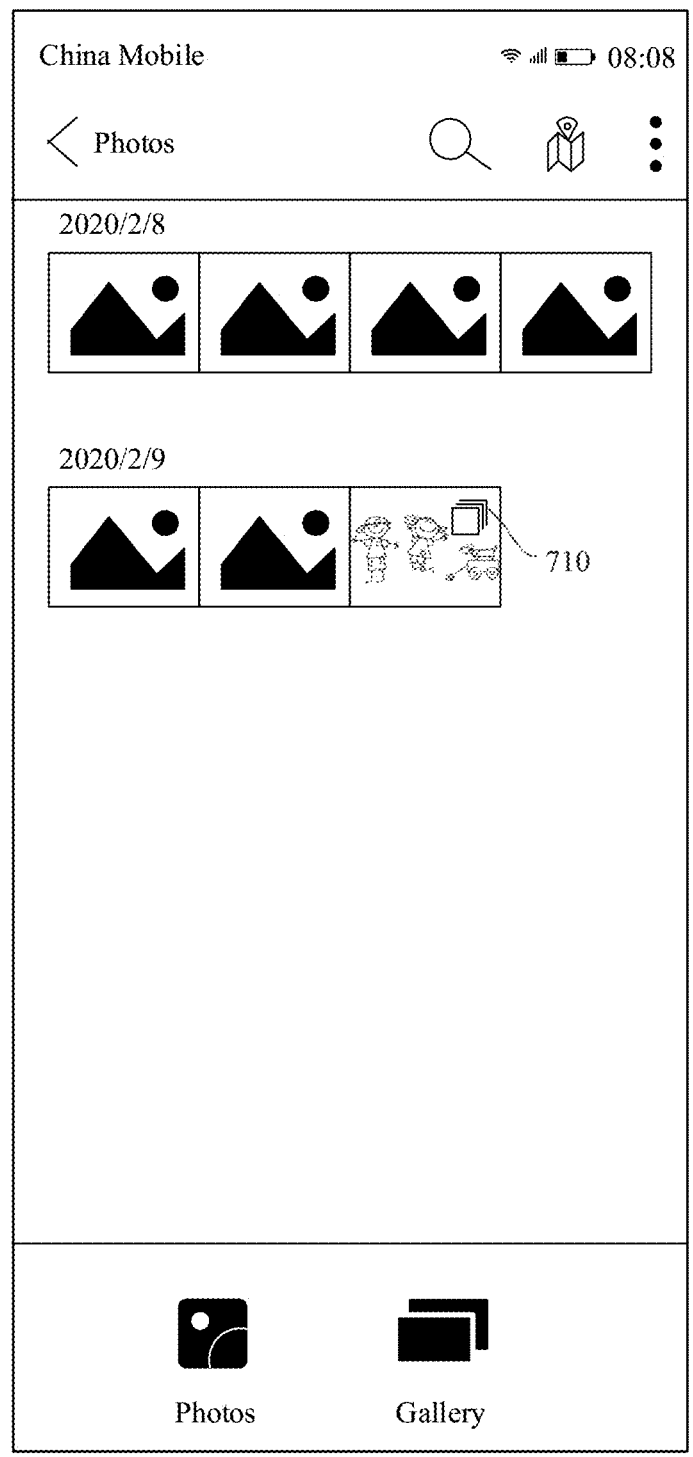
Figure 7E:
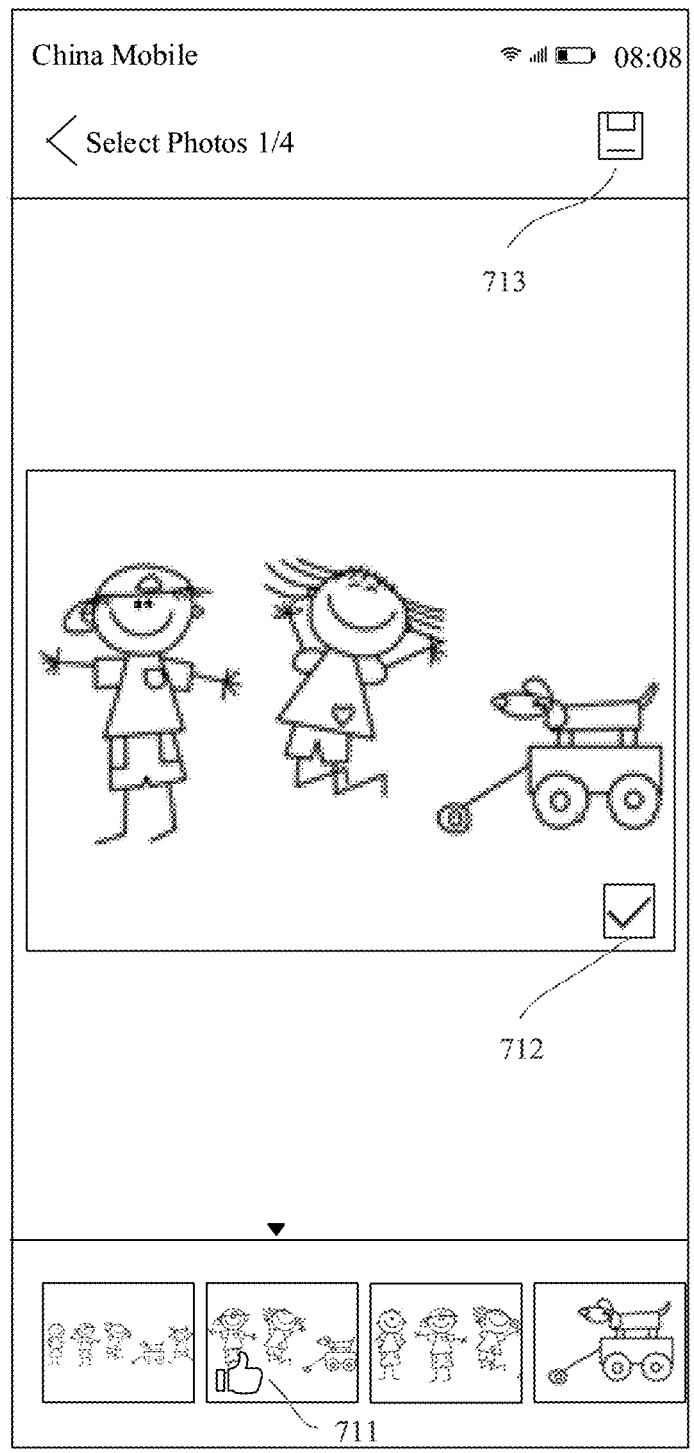
Figure 7F:
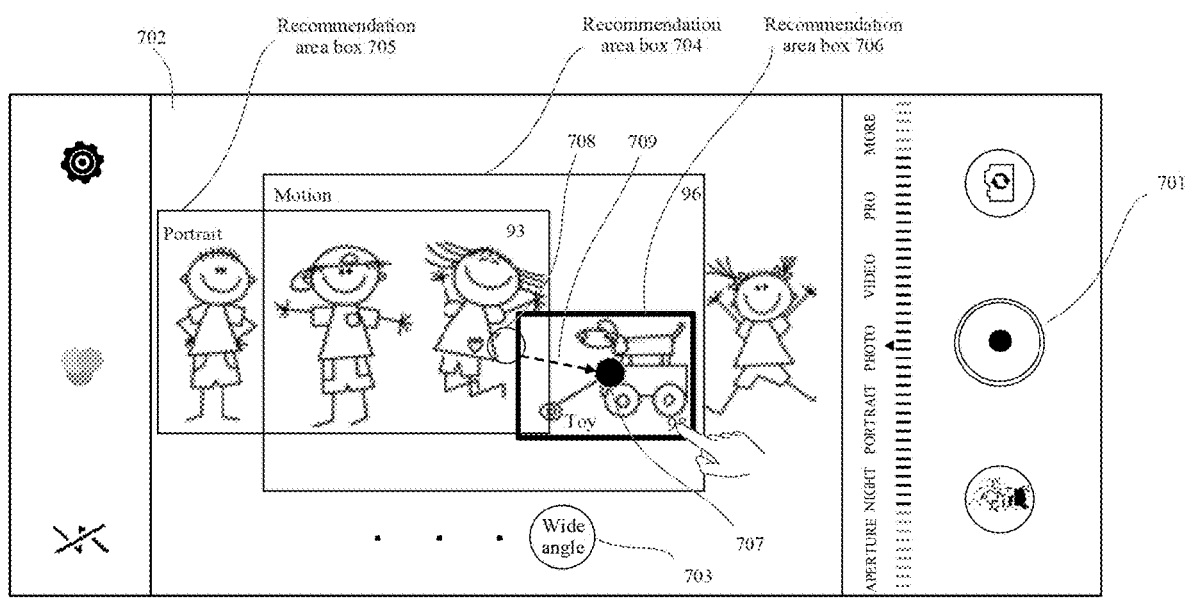

If the user selects "Yes", the image composition recommendation function is enabled, the control 703 used to indicate zoom is automatically switched to a wide angle, and the GUI currently displays a preview image collected by the wide-angle camera shown in FIG. 7(c). There are a plurality of shot subjects in a wide-angle preview image, and the scene identification module identifies three scenes: motion, portrait, and toy. The image segmentation module separately performs image segmentation in the motion scene, the portrait scene, and the toy scene on the image in the wide-angle preview based on the identified shot subjects in the three scenes.

A jumping little girl in the middle is used as a shot subject, and a plurality of types of professional image composition such as centrosymmetric image composition and golden section image composition are performed, to obtain a highest score of trichotomy image composition, which is 96. A result with the highest score is selected as a recommended image composition and displayed on the GUI, that is, a recommended image composition shown in a recommendation area box 704. In addition, a scene type "motion" is marked in the recommendation area box 704, and the highest score "96" is also marked in the recommendation area box 704.

Three children on the left are used as shot subjects, and a plurality of types of professional image composition such as centrosymmetric image composition and golden section image composition are performed, to obtain a highest score of the central image composition, which is 93. A result with the highest score is selected as a recommended image composition and displayed on the GUI, that is, a recommended image composition shown in a recommendation area box 705. In addition, a scene type "portrait" is marked in the recommendation area box 705, and the highest score "93" is also marked in the recommendation area box 705.

In addition, a toy is used as a shot subject, and a plurality of types of professional image composition are performed, to obtain a highest score of trichotomy image composition, which is 98. A result with the highest score is selected as a recommended image composition and displayed on the GUI, that is, a recommended image composition shown in a recommendation area box 706. A scene type "toy" is marked in the recommendation area box 706, and the highest score "98" is also marked in the recommendation area box 706.

If the user taps the shutter button 701 to take a photo, a preview image in the wide-angle mode is shot by default. Optionally, after the preview image is shot, the preview image is further cropped to obtain a recommended motion image, a recommended portrait image, and a recommended toy image. As shown in FIG. 7(*d*), the shot image in the wide-angle mode, the recommended motion image, the recommended portrait image, and the recommended toy image are all saved to the camera, and displayed as a thumbnail in a photo folder. An icon 710 is displayed on the thumbnail, to prompt the user to view and edit a plurality of photos by tapping the icon 710. The user taps the thumbnail, and an interface shown in FIG. 7(*e*) is displayed, and thumbnails of the image in the wide-angle mode, the recommended motion image, the recommended portrait image, and the recommended toy image are displayed at the bottom of the screen. The camera automatically recommends an optimal photo, displays the optimal photo in the middle of the screen, and marks the optimal photo with an icon 711 in a corresponding thumbnail. The user may also swipe left or right, tap a check icon 712 to select another photo, and then tap a save icon 713 to save the photo as prompted.

If the user does not tap the shutter button 701, but selects a recommended image composition of the toy, as shown in FIG. 7(*f*), and taps an edge of the recommendation area box 706 or an internal area of the recommendation area box 706, the edge of the selected recommendation area box 706 becomes thicker, to prompt the user that the recommended image composition of the toy has been selected. At the same time, marks used to assist in guiding the user to move the camera, a center 707 of the selected recommended image composition of the toy, a circular viewfinder center 708 of the current viewfinder frame 702, and a guide direction 709 appear in the viewfinder frame 702. The circular viewfinder center 708 is a viewfinder center of the current wide-angle preview image. It may be understood that the view finder center may also be a mark such as a cross or a shooting auxiliary box. The guide direction 709 is a dashed-line arrow mark that guides the user to move the circular viewfinder center 708 to the center 707 of the selected recommended image composition of the toy. It may be understood that the guide direction may also be a solid line, a curve, a graphic mark without an arrow; or the like. The user moves the mobile phone based on the guide direction 709, so that the circular viewfinder center 708 moves to the center 707 of the recommended image composition of the toy: When the mobile phone moves, a shooting range of each camera of the mobile phone changes as the mobile phone moves. When the circular viewfinder center 708 is moved to coincide with the center 707 of the recommended image composition of the toy, as shown in FIG. 7(*g*), a framing range of a 1.5× long-focus camera is consistent with a range of the recommendation area box 706. Colors of the circular viewfinder center 708 and the center 707 of the recommended image composition of the toy change, to prompt the user that the camera has been aligned with the selected toy. When the mobile phone stops moving and keeps in a stable state for a time period, the image collection camera automatically switches from the wide-angle camera to the long-focus camera with a 1.5× zoom ratio, as shown in FIG. 7(*h*). In response to automatic switching of the camera, the mobile phone automatically takes a photo based on a 1.5× zoom camera required by the selected recommended image composition of the toy and the user does not need to tap the shutter button 701.

In another specific implementation, the user turns on the "image composition recommendation" option of the control 506, and after the camera startup module loads the image composition recommendation plug-in, the camera normally enters a medium-focus preview shown in FIG. 8(*a*). An image continues to be collected by using the wide-angle camera on the background, image segmentation in the motion scene and the toy scene is separately performed on the image collected by the wide-angle camera, and different recommended image compositions are displayed in recommendation area boxes in the medium-focus preview: A part of the recommended image composition of the toy is displayed in a recommendation area box 804, and a part of a recommended image composition of the motion is displayed in a recommendation area box 805. Because the current interface is the medium-focus preview interface, these recommended image compositions are partially displayed in the medium-focus preview image. Correspondingly, the recommendation area boxes 804 and 805 show only a part that can be displayed in the viewfinder frame 802. It is clearly that because some wide-angle images have exceeded an edge of the medium-focus preview image, recommended image compositions in these recommendation area boxes are partially displayed. Therefore, the user can see only a part of these recommended image compositions in the medium-focus preview: The recommended image composition, identification, and scoring herein are the same as those in the foregoing implementation, and details are not described again.

A recommended image composition with a highest score "96" in the motion scene is displayed in the recommendation area box 805. In addition, to provide more choices for the user, a second highest score "95" is shown on the left of "96". The user taps the second highest score "95", a location of the recommendation area box 805 correspondingly changes, and a recommended image composition whose score is "95" in the motion scene is displayed. In the foregoing two recommended image compositions, the little girl on the right of the toy is used as the shot subject. A plurality of types of professional image composition, such as centrosymmetric image composition, golden section image composition, and trichotomy image composition are performed. A score of the trichotomy image composition is 96, and is the highest, and a score of the centrosymmetric image composition is 95, and is the second highest. A result with the highest score is selected as a recommended image composition and displayed in the recommendation area box 805. In addition, the scene type "motion", the highest score "96", and the second highest score "95" are marked in the recommendation area box 805. In this way, if the user does not like an image with the highest score that is recommended by default, the user can further view a recommended image composition with the second highest score, to provide more options for the user in a specific type of scene. If the user taps on the score "95", as shown in FIG. 8(*b*), the recommendation area box 805 moves rightwards to display a centrosymmetric image composition.

If the user taps a shutter button 801 to take a photo, the preview image in the medium-focus mode is shot by default.

If the user selects the recommended image composition of the toy, the user taps an edge of the corresponding recommendation area box 804 or an identifier such as "toy" or "98" inside the recommendation area box 804, as shown in FIG. 8(*c*). In this case, a color of the edge of the recommendation area box 804 changes, to prompt the user that the recommended image composition of the toy has been selected. At the same time, marks used to assist in guiding the user to move the camera, a center 807 of the selected recommended image composition of the toy, and a circular viewfinder center 808 of the current viewfinder frame 802 appear in the viewfinder frame 802. The user moves the mobile phone based on prompt information. When the circular viewfinder center 808 is moved to coincide with the center 807 of the recommended image composition of the toy, as shown in FIG. 8(*d*), colors the circular viewfinder center 808 and/or the center 807 of the recommended image composition of the motion change, to prompt the user that the camera has aligned the selected recommended image composition. When the mobile phone stops moving and keeps in a stable state for a time period, the image collection camera automatically switches from the wide-angle camera to the long-focus camera with a 1.5× zoom ratio, as shown in FIG. 8(*e*). In response to automatic switching of the camera, the mobile phone automatically takes a photo based on a 1.5× zoom camera required by the selected recommended image composition of the toy and the user does not need to tap the shutter button 801.

An improvement of Embodiment 1 of the present invention compared with the conventional technology lies in that, on one hand, a common user can directly use the camera without learning professional image composition knowledge, so that the common user can experience a more professional shooting effect. On the other hand, in a complex scene with a large quantity of shot subjects, image composition recommendation of a plurality of different shot subjects can be provided for selection by the user.

Embodiment 2: In this embodiment, the mobile phone in the structures shown in FIG. 1 and FIG. 3 is still used as the electronic device 100. A difference from Embodiment 1 lies in that the electronic device 100 not only includes the wide-angle camera, the medium-focus camera, and the long-focus camera, but also includes a ToF camera. In this embodiment, the ToF camera is used to provide depth of field information of a shot subject to assist in image composition, and professional blurring image composition recommendation can be provided. The following describes the technical solution of this embodiment in detail, and details similar to those in Embodiment 1 are not described again.

The time of flight (time of flight, ToF) camera is a depth-sensing camera. A working manner of the ToF camera is to record, at each pixel, light intensity information and a time of light from a light source to the pixel, and obtain a distance between a to-be-shot object and the ToF camera based on the time. The ToF camera included in the mobile phone is mainly used to improve photo quality by providing information (that is, depth of field information) about a foreground and a background for camera software.

Figure 9:
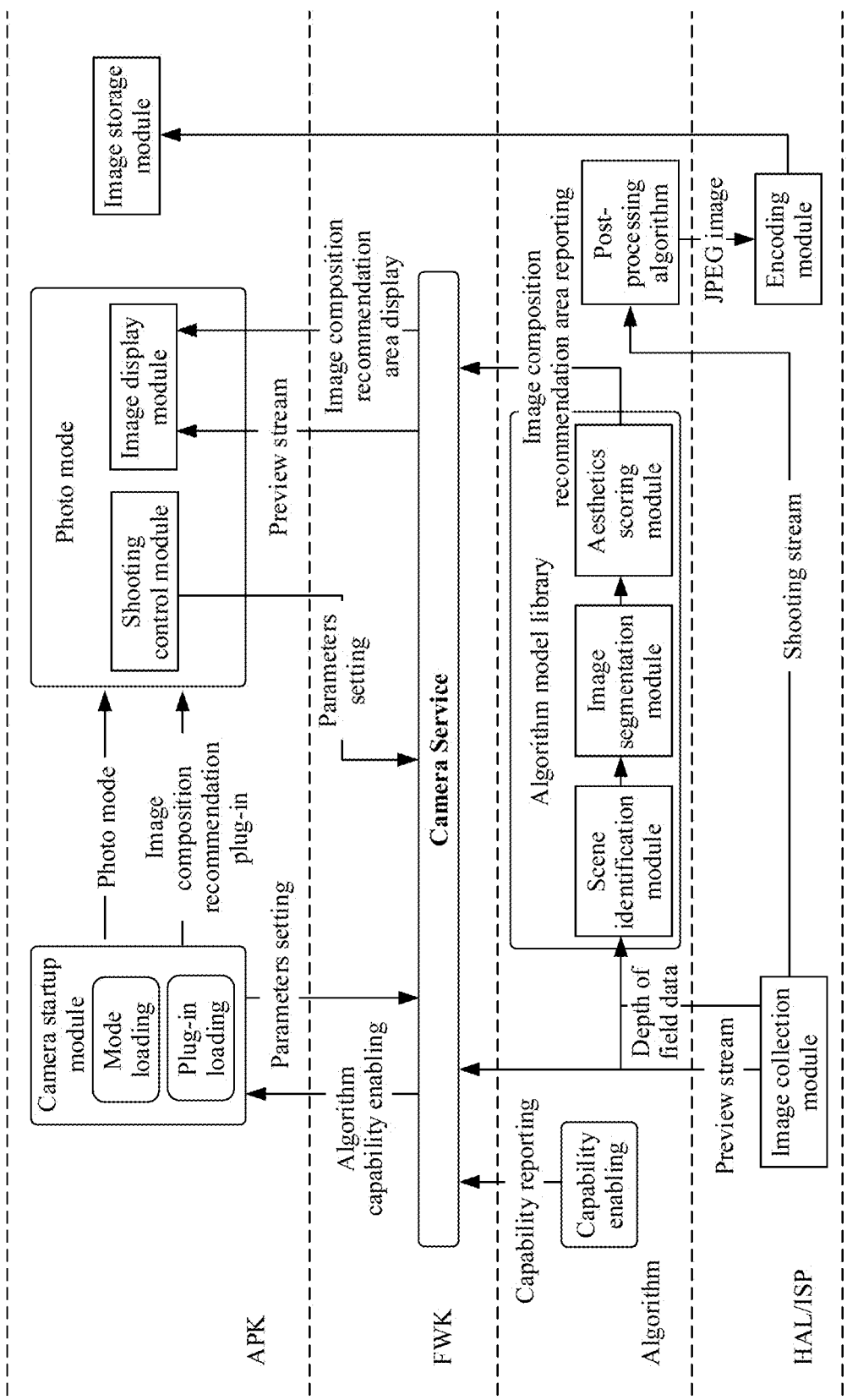
FIG. 9 is schematic diagrams of another system architecture and another specific implementation according to an embodiment of the present invention.

FIG. 9 shows a specific implementation of each module in FIG. 4(*a*) in the mobile phone in this embodiment. First, a user opens a camera. An algorithm layer shown in FIG. 9 checks, by using a capability enabling module, whether the cameras of the mobile phone include a wide-angle camera and a ToF camera, and notifies and reports a check result, that is, a capability of the mobile phone. If the mobile phone has a wide-angle camera and a ToF camera, the capability enabling module reports, to a camera service (Camera Service), that the mobile phone has a capability of normally running an image composition recommendation plug-in. Otherwise, if the mobile phone does not have a wide-angle camera and a ToF camera, the capability enabling module reports, to the camera service (Camera Service), that the mobile phone cannot normally run the image composition recommendation plug-in. A camera startup module may be set in a camera application of the mobile phone. After receiving the capability reported by the capability enabling module, the camera service (Camera Service) indicates the camera startup module to load a photo mode and the image composition recommendation plug-in. Certainly, if the capability enabling module reports that the mobile phone cannot normally run the image composition recommendation plug-in, the camera startup module may not load the image composition recommendation plug-in.

After the loading is completed, the camera startup module configures a preview stream and a shooting stream, and indicates an image collection module of an ISP to collect an image. The image collection module collects the image by using the wide-angle camera, and collects depth of field information of each shot subject in framing by using the ToF camera. The collected preview stream is reported through an image rotation channel. One channel of the preview stream collected at a wide angle is sent to an image display module for real-time preview; and one channel passes through an algorithm model library as an input of the algorithm model library. In addition, the depth of field information of the shot subjects collected by the ToF camera is synchronously sent to the algorithm model library as an input of the algorithm model library.

Image data input into the algorithm model library first passes through a scene identification module, all shot subjects in current framing of the wide-angle camera are identified, and different scenes are determined based on types of the shot subjects and a preset rule. The scene identification module provides an identification result of a current shot subject and a current scene, and the identification result is used as an input of an image segmentation module. The image segmentation module further performs layered segmentation on the image based on the depth of field information of the shot subjects, selects a shot subject within a fixed depth of field range, performs image segmentation on each shot subject, and obtains an image composition set of a plurality of types of professional image composition of each shot subject. The image composition set is used as an input of an aesthetic scoring module. The aesthetics scoring module scores the image composition set of each shot subject. A scoring rule may be constructed based on a plurality of factors such as a subject type, a location of the subject in an image, and a proportion of the subject in the image. Finally, scores of the image composition set of each subject are sorted, an image composition with a top score corresponding to each subject is selected as a recommended image composition, and a corresponding image composition recommendation area is reported.

After receiving the reported image composition recommendation area, the image display module draws a corresponding recommendation area box in a preview image in real time and prompts the user to perform selection. The user moves the mobile phone to superimpose a preview viewfinder center with a center of a recommendation area to complete selection, or the user may move the mobile phone to superimpose a preview viewfinder area with the recommendation area to complete selection. When the user completes the selection, if a camera that currently collects the preview image is the medium-focus camera, a shooting control module prompts the user to take a photo. If the camera that currently collects the preview image is the wide-angle camera, the camera is automatically switched to the medium-focus camera through parameter delivery, and the user is prompted to take a photo.

When the user taps a shutter button, the shooting control module delivers a shooting stream, indicates the image collection module to collect images to fill in an image transmission channel of the shooting stream, and sends the images to a post-processing algorithm. After an encoding module at an HAL encodes the images into JPEG images, an image storage module of an APK stores the JPEG images.

The following describes in detail a process in which the user performs shooting by using the mobile phone. When the mobile phone has the wide-angle camera and the ToF camera, a camera application icon is tapped, the camera startup module loads the photo mode and the image composition recommendation plug-in, and a primary-camera preview GUI shown in FIG. 10(*a*) is displayed. The preview interface includes a shutter button 1001, a viewfinder frame 1002, a control 1003 used for camera zoom, and the like. The control 1003 used for camera zoom is in a primary-camera preview mode. In addition, the camera starts the ToF camera to collect depth of field information, and depth of field information of each shot subject may be presented on the primary-camera preview interface, as shown in FIG. 10(*a*). If a distance between the ToF camera and a point that is closest to the mobile phone and that is in the front of a cup is 15 cm, a depth of field is displayed as 15 cm. If a distance between the ToF camera and a point that is closest to the mobile phone and that is in the front of a plant pot is 60 cm, a depth of field is displayed as 60 cm.

The user turns on an "image composition recommendation" option, and the camera automatically switches to a wide-angle preview: The scene identification module identifies that subjects in a current scene include a cup, a potted plant, and cherries in a preview image collected by the wide-angle camera. The depth of field information of all shot subjects collected by the ToF camera is also input into the algorithm model library. The image segmentation module performs layered segmentation on the image based on the depth of field information of each shot subject, and selects a shot subject within a fixed depth of field range. As shown in FIG. 10(*b*), a depth of field range that is of the front and the rear of the cup to the mobile phone and that are collected by the ToF camera is 15 cm to 25 cm, a depth of field range of the front and the rear of the potted plant to the mobile phone is 60 cm to 75 cm, and a depth of field range of the front and the rear of the cherries to the mobile phone is 18 cm to 20 cm. The depth of field range of the cherries is within the depth of field range of the cup, and the cup is displayed in a larger proportion in a primary camera preview range. Therefore, image segmentation is performed based on the depth of field ranges of the cup and the potted plant. A plurality of types of professional image composition are performed by using the cup and the cherries with the depth of field range from 15 cm to 25 cm as a scene, and a plurality of types of professional image composition are performed by using the potted plant with a depth of field range from 60 cm to 75 cm as a scene. Obtained image composition sets are sent to the aesthetic scoring module for aesthetic scoring. Finally, the aesthetics scoring module reports an image composition recommendation area with a highest score corresponding to each scene, and the image display module displays the area in the wide-angle preview for selection by the user. In this embodiment, the depth of field information of the shot subject is considered during image composition recommendation. A first recommendation area box may include a plurality of first shot subjects with a same or similar depth of field range. For example, a first recommendation area box 1004 in FIG. 10(*b*) includes the cherries and the cup with a same or similar depth of field range. A second recommendation area box 1005 in FIG. 10(*b*) includes the potted plant whose depth of field range differs greatly from those of the cherries and the cup. Refer to FIG. 10(*b*). The cup and the cherries are used as shot subjects, and professional image composition such as centrosymmetric image composition, golden section image composition, and trichotomy image composition is performed, to obtain a highest score of the trichotomy image composition, which is 90. A result with the highest score is selected as a recommended image composition and displayed on the GUI, that is, the cup and the cherries in the recommendation area box 1004. In addition, a scene type "cup" is marked in the recommendation area box 1004, and the highest score "90" is also marked in the recommendation area box 1004. Optionally, the depth of field information of the cup may also be marked in the recommendation area box.

In addition, the potted plant is also captured as a shot subject to perform a plurality of types of professional image composition. A score of centrosymmetric image composition is highest and is 99, and a score of golden section image composition is 85. In a recommended image composition obtained through the golden section image composition, a center of the potted plant is located on a golden section line of the entire recommended image composition. A result with a highest score is selected as the recommended image composition and displayed on the GUI, that is, the potted plant in the recommendation area box 1005. A scene type "potted plant" is marked in the recommendation area box 1005, and the highest score "99" is also marked in the recommendation area box 1005. Optionally, the depth of field information of the potted plant may also be marked in the recommendation area box.

If the user taps the shutter button 1001 to take a photo, a preview image in a wide-angle mode is shot by default. Optionally, the preview image is further cropped to obtain a recommended image composition in a potted plant scene and a recommended image composition in a cup scene, and the shot image in the wide-angle mode, the recommended image of the potted plant, and the recommended image of the cup are all saved to the camera for selection by the user.

If the user selects the recommended image composition of the cup, the user taps an edge of the recommendation area box 1004 or an internal area of the recommendation area box 1004, and a color of the edge of the recommendation area box 1004 changes, to prompt the user that the recommended image composition of the cup has been selected. In addition, a shooting auxiliary box 1006 (that is, another possible implementation of the guide mark in this application) that guides the user to move the camera appears in the viewfinder frame 1002, as shown in FIG. 10(*c*). The shooting auxiliary box 1006 corresponds to an image area in a medium-focus preview; that is, a range of an image that can be shot by the medium-focus camera when the mobile phone is at a current location. It should be noted that, even if the user does not select the cup image composition, the shooting auxiliary box 1006 that guides the user to move the camera can be automatically displayed on the preview interface after the lens of the mobile phone stays for a time period, for example, 2 to 3 seconds.

The user moves the mobile phone, so that a location of the shooting auxiliary box 1006 correspondingly is moved to the selected recommended image composition of the cup. As shown in FIG. 10(*d*), the edge of the recommendation area box 1004 of the recommended image composition of the cup coincides with an edge of the shooting auxiliary box 1006, and the edge of the recommendation area box 1004 becomes thicker, to prompt the user that the mobile phone has aligned a currently selected image composition recommendation area.

Optionally, after the user selects and aligns the recommended image composition of the cup, the user needs to confirm again before a medium-focus preview mode used to shoot the recommended image of the cup is entered. Refer to FIG. 10(*e*). Text or voice prompt information "Switch to the primary camera to take a photo?" is provided on the GUI for the user to confirm again. The user taps "Yes" to confirm shooting, and then a medium-focus camera used to shoot the cup is switched to for shooting. Optionally, when it is detected that the mobile phone stops moving and keeps in a stable state for a specific time period, the mobile phone automatically switches the wide-angle preview to the medium-focus preview mode suitable for shooting the recommended image composition of the cup.

Refer to FIG. 10(*f*). A focal length of the medium-focus camera is automatically adjusted by using the previously obtained depth of field information of the cup, so that the camera is focused to the cup, and the user can focus on and take a photo. Performing automatic focusing on the selected recommended image composition based on the depth of field information provided by the ToF camera can help the camera implement a faster focusing speed, and can also provide a faster speed for automatic shooting of the mobile phone.

During shooting, the camera automatically performs background blurring on another object around the subject based on the focused shot subject. The blurring may further include progressive blurring on the subject and the background based on the depth of field information that is of each shot subject and that is previously obtained by the ToF camera. In this embodiment, general blurring is performed on the cherries that are closer to the cup, and strong blurring is performed on the potted plant that is farther away from the cup. For details, refer to blurring processing on the potted plant in FIG. 10(*f*). An obtained main outline of the cup is clear, and the cup can be effectively highlighted. Shooting parameter automatic adjustment is performed on a selected recommended image composition based on the depth of field information provided by the ToF camera, so that the user can obtain a subject highlighted effect closer to real vision.

Another specific implementation of Embodiment 2 is as follows: For a scene in which there are a plurality of shot subjects and it is not suitable for shooting together, the mobile phone used by the user has the wide-angle camera and the ToF camera, and the "image composition recommendation" option has been turned on. The user taps a camera application icon, and the camera startup module loads a photo mode and an image composition recommendation plug-in, and switches to a wide-angle preview GUI shown in FIG. 11(*a*). The preview interface includes a shutter button 1101, a viewfinder frame 1102, a control 1103 used for camera zoom, and the like. The control 1103 used for camera zoom is in a wide-angle preview mode. The scene identification module identifies that subjects in the current scene include a girl and a baby in a preview image collected at a wide angle, and there are a plurality of shot subjects in the wide-angle preview image, and the subjects cannot be focused at the same time. In addition, the camera starts the ToF camera to collect depth of field information. The ToF camera collects that the little girl is about 1 m to 1.2 m away from the mobile phone. That is, a depth of field range of the little girl is 1 m to 1.2 m, and the baby is farther away from the mobile phone, about 1.8 m to 2 m. That is, a depth of field range of the baby is 1.8 m to 2 m. Image segmentation is performed based on the depth of field ranges of the little girl and the baby, a plurality of types of professional image composition are separately performed on the little girl and the baby, and obtained image composition sets are sent to the aesthetic scoring module for aesthetic scoring. Finally, the aesthetics scoring module reports an image composition recommendation area with a highest score corresponding to each subject, and the image display module displays the area in the wide-angle preview for selection by the user.

The jumping little girl is used as a shot subject, and a plurality of types of professional image composition such as trichotomy image composition and centrosymmetric image composition are performed, to obtain a highest score of the trichotomy image composition, which is 97. A result with the highest score is selected as a recommended image composition and displayed on the GUI, that is, a recommended image composition of the motion shown in a recommendation area box 1104 shown in FIG. 11(*b*). In addition, "motion" is marked in the recommendation area box 1104 as the identified scene. Optionally, the depth of field information 1 m to 1.2 m of the little girl may also be marked in the recommendation area box 1104.

In addition, the baby is used as a shot subject, and a plurality of types of image composition are performed, to obtain a highest score of centrosymmetric image composition, which is 98. A result with the highest score is selected as a recommended image composition and displayed on the GUI, that is, a recommended image composition of the baby shown in a recommendation area box 1105. A scene type "baby" is marked in the recommendation area box 1105. Optionally, the depth of field information 1.8 m to 2 m of the baby may also be marked in the recommendation area box.

If the user taps the shutter button 1101 to take a photo in this case, the preview image in the wide-angle mode is shot by default. Optionally, the preview image is further cropped to obtain a recommended image in the baby scene and a recommended image in the motion scene, and the shot image in the wide-angle mode, the recommended image of the baby, and the recommended image of the motion are all saved to the camera for selection by the user.

If the user selects one of the recommended image compositions, for example, the recommended image composition of the baby, the user taps an edge or an internal area of the recommendation area box 1105 of the recommended image composition of the baby, and a color the edge of the recommendation area box 1105 changes, to prompt the user that the recommended image composition of the baby has been selected. In addition, a shooting auxiliary box 1106 that guides the user to move the camera appears in the viewfinder frame 1102. As shown in FIG. 11(*b*), the shooting auxiliary box 1106 corresponds to an image area in a medium-focus preview; that is, a range of an image that can be shot by the medium-focus camera when the mobile phone is at a current location. The user moves the mobile phone, to enable a location of the shooting auxiliary box 1106 to move to the selected recommended image composition of the baby. A range of the recommendation area box 1105 of the recommended image composition of the baby is consistent with a range of the shooting auxiliary box 1106. The edge of the recommendation area box 1105 becomes thicker or a color changes again, to prompt the user that the mobile phone has aligned the currently selected image composition recommendation area, as shown in FIG. 11(*c*).

When it is detected that the mobile phone stops moving and keeps in a stable state for a specific time period, the mobile phone automatically switches the wide-angle preview to a medium-focus preview mode suitable for shooting the recommended image composition of the baby. Refer to FIG. 11(*d*). In addition, the camera may also be automatically focused to the baby by using the previously obtained depth of field information of the baby, so that the user can focus on the baby to take a photo. Performing automatic focusing on the selected recommended image composition based on the depth of field information provided by the ToF camera can help the camera implement a faster focusing speed.

After the baby is shot, the user is asked whether to continue to shot the "motion" recommended image composition, as shown in FIG. 11(*e*). If the user selects "Yes", the GUI under the wide-angle camera shown in FIG. 11(*f*) is directly switched to. Because the recommended image composition of the baby has been shot, the recommendation area box 1105 and the internal scene type and the score maker are no longer displayed on the GUI, and only the shooting auxiliary box 1106 is displayed. Optionally, a color of an edge of the recommendation area box 1104 of the "motion" recommended image composition changes, to prompt the user that the recommended image composition has been selected.

The user moves the mobile phone, so that a range of the shooting auxiliary box 1106 is consistent with a range of the recommendation area box 1104 of the "motion" recommended image composition, and the edge of the recommendation area box 1104 of the recommended image composition becomes thicker or a color changes, to prompt the user that the currently selected image composition recommendation area has been aligned, as shown in FIG. 11(*g*). When it is detected that the mobile phone stops moving and keeps in a stable state for a specific time period, the mobile phone automatically switches the wide-angle preview to the medium-focus preview mode suitable for shooting the recommended image composition of the little girl, as shown in FIG. 11(*h*). In addition, the camera may also be automatically focused to the little girl by using the previously obtained depth of field information of the little girl, so that the user can focus on the little girl to take a photo.

This implementation is applicable to an actual life scene in which there are a plurality of shot subjects and it is not suitable for shooting together. Professional image composition is performed for each subject in advance, and different blurring image composition is performed for each subject. After the baby subject is shot, the user is prompted again to continue to shoot a motion image with the little girl as the subject, so that the user can quickly complete professional shooting of two subjects, and an image shooting capability of the user in a complex scene is improved.

In Embodiment 2 of the present invention, the ToF camera collects depth of field information of a shot subject to assist in image composition, and professional blurring image composition recommendation can be provided. Layered image segmentation based on depth of field information makes a segmentation result more accurate. During shooting, a focal length and brightness information of the camera are automatically adjusted based on the depth of field information, and the user does not need to manually adjust the focal length and the brightness information, to provide a more professional shooting effect for a common user.

The following describes a process of the shooting method provided in embodiments of the present invention.

Figure 12:
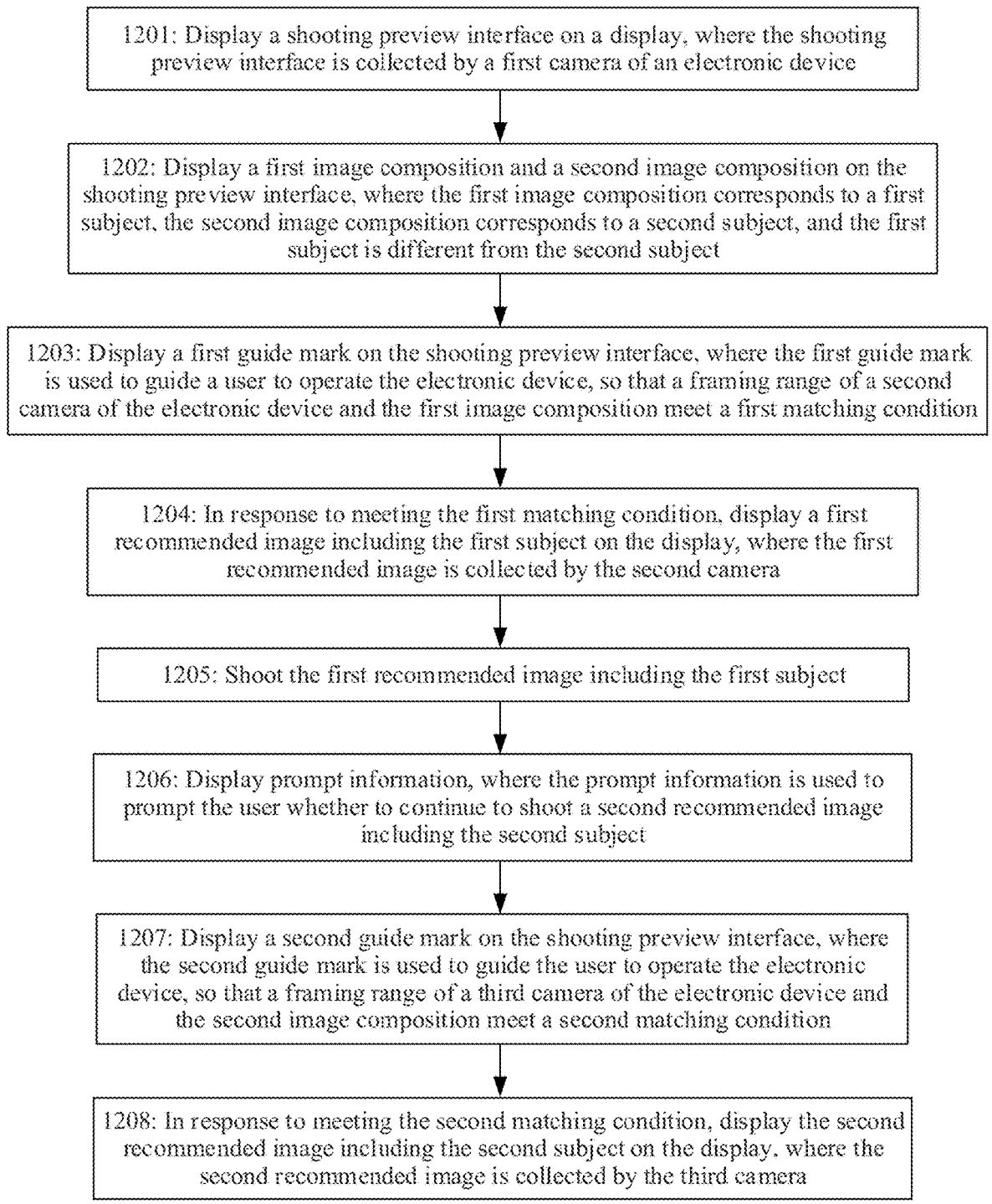
FIG. 12 is a flowchart of a shooting method according to an embodiment of the present invention.

FIG. 12 is a flowchart of a shooting method. The method is applied to an electronic device 100 having a display. The electronic device may include one or more of a first camera, a second camera, a third camera, and a ToF camera. An angle of view of the first camera is greater than an angle of view of the second camera, the angle of view of the second camera is greater than an angle of view of the third camera, and the ToF camera is configured to collect depth of field information of a shot subject. For example, the first camera may be a wide-angle camera or an ultra-wide-angle camera, the second camera may be a primary camera, and the third camera may be a long-focus camera.

As shown in FIG. 12, the method includes the following steps.

1201: Display a shooting preview interface on the display, where the shooting preview interface is collected by the first camera of the electronic device.

For example, the electronic device detects a first operation on a camera application icon. The first operation on the camera application icon may be that a user taps the camera application icon shown in FIG. 5(*a*), to start an interface of the camera.

It should be noted that, the user may indicate, in a plurality of manners, the electronic device to open the camera. For example, the user may tap a camera icon to indicate the electronic device to open the camera, the user may indicate the electronic device to open the camera in a voice mode, or the user may draw a "C"-shaped track on a screen in a screen-off state to indicate the electronic device to open the camera. A manner of triggering the electronic device to open the camera is not limited in embodiments of the present invention. It may be understood that the interface of the camera may be further started by using a screen-off shortcut button or shooting controls of some applications of a mobile phone.

For example, in a previous operation, the user has enabled an image composition recommendation function by turning on the "image composition recommendation" option shown in FIG. 5(*c*). In response to the first operation on the camera application icon, the electronic device collects an image by using the first camera. The shooting preview interface displayed on the display may be the wide-angle preview shown in FIG. 6(*a*), or may be the medium-focus preview shown in FIG. 8(*a*). This is not limited in this application.

In a possible implementation, after the camera is started, the electronic device displays, by default, a preview image collected by the second camera on the shooting preview interface, and collects the image on the background by using the first camera. That is, the electronic device further collects an image by using the second camera, displays, on the shooting preview interface, the preview image collected by the second camera, and displays a first image composition and a second image composition on the shooting preview interface. The first image composition corresponds to a first subject, the second image composition corresponds to a second subject, and the first subject is different from the second subject. The first image composition and the second image composition are recommended based on an image collected by the first camera of the electronic device, and at least one of the first image composition and the second image composition is partially displayed. For example, refer to the recommended image composition of the motion and the recommended image composition of the toy in FIG. 8(a). The foregoing recommended image compositions cannot be completely displayed in a primary camera preview.

1202: Display the first image composition and the second image composition on the shooting preview interface, where the first image composition corresponds to the first subject, the second image composition corresponds to the second subject, and the first subject is different from the second subject.

In a possible implementation, the recommendation area box 604 and the recommendation area box 605 are displayed on the wide-angle preview interface shown in FIG. 6(a). The recommendation area box 604 corresponds to the building, and the recommendation area box 605 corresponds to the food.

In a possible implementation, the recommendation area boxes 704 to 706 are displayed on the wide-angle preview interface shown in FIG. 7(c). The recommendation area boxes 704 and 705 correspond to people, and the recommendation area box 706 corresponds to the toy.

1203: Display a first guide mark on the shooting preview interface, where the first guide mark is used to guide the user to operate the electronic device, so that a framing range of the second camera of the electronic device and the first image composition meet a first matching condition, wherein the angle of view of the first camera is greater than the angle of view of the second camera, and the first camera and the second camera are located on a same side of the electronic device.

The first guide mark may be displayed on the shooting preview interface in response to a selection operation of the user on the first image composition or the second image composition, or may be automatically displayed on the preview interface after the electronic device stops moving for a time period. It may be understood that there is another manner of displaying the first guide mark. For example, the user touches the display or presses a side button. This is not limited in this application. For example, the user may tap the building image composition shown in FIG. 6(c), and the marks 606 and 607 are displayed on the shooting preview interface in response to the tapping operation of the user. Certainly, even if the user does not select the building image composition, the marks 606 and 607 that guide the user to move the camera can also be automatically displayed on the preview interface after the lens of the mobile phone stays for a time period, for example, 2 to 3 seconds.

In a possible implementation, the displaying a first guide mark on the shooting preview interface, where the first guide mark is used to guide the user to operate the electronic device, so that a framing range of the second camera of the electronic device and the first image composition meet a first matching condition includes: detecting an operation on the first image composition; and in response to the operation, displaying the first guide mark on the shooting preview interface, where the first guide mark is used to guide the user to operate the electronic device, so that the framing range of the second camera of the electronic device and the first image composition meet the first matching condition.

Figure 11A:
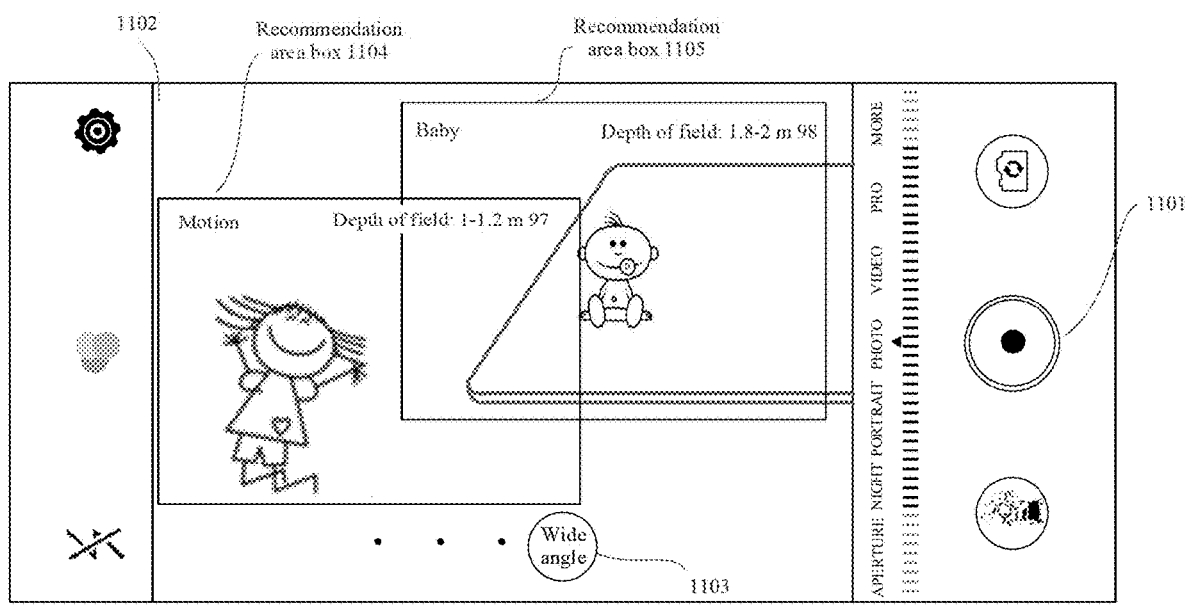
FIG. 11(a) to FIG. 11(h) are schematic diagrams of another group of interfaces according to an embodiment of the present invention.
Figure 11B:
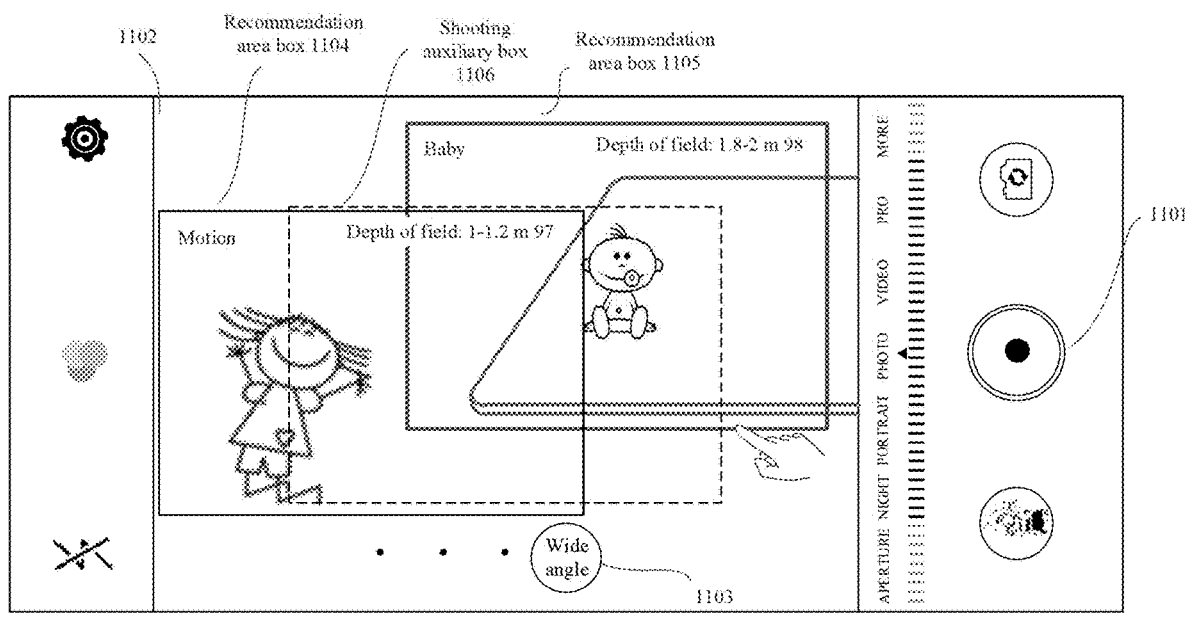
Figure 11C:
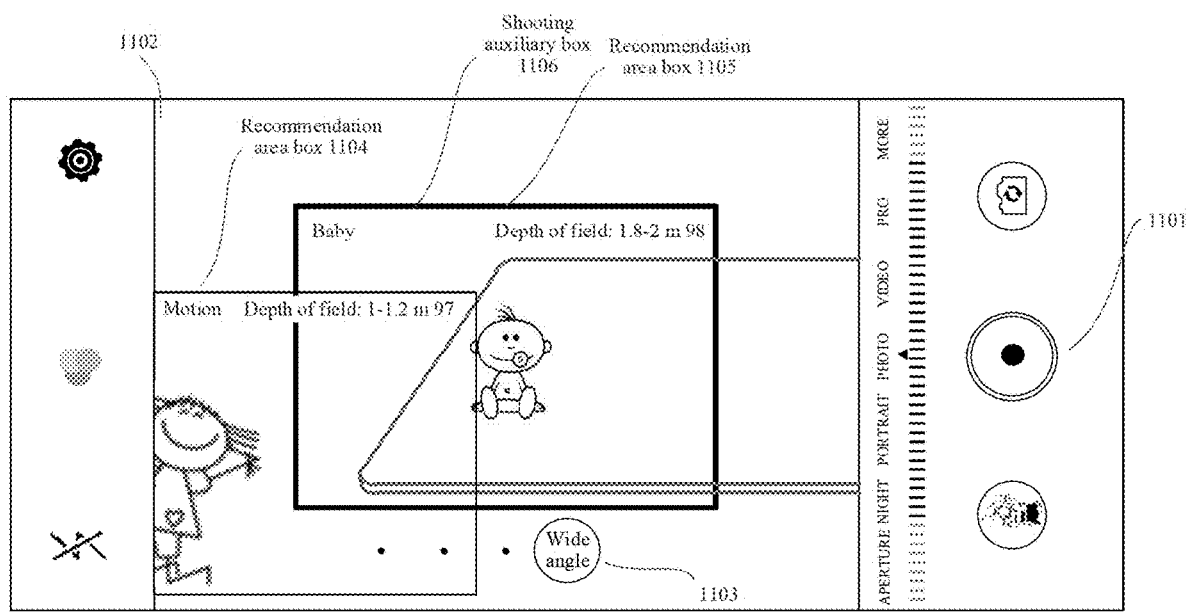
Figure 11D:
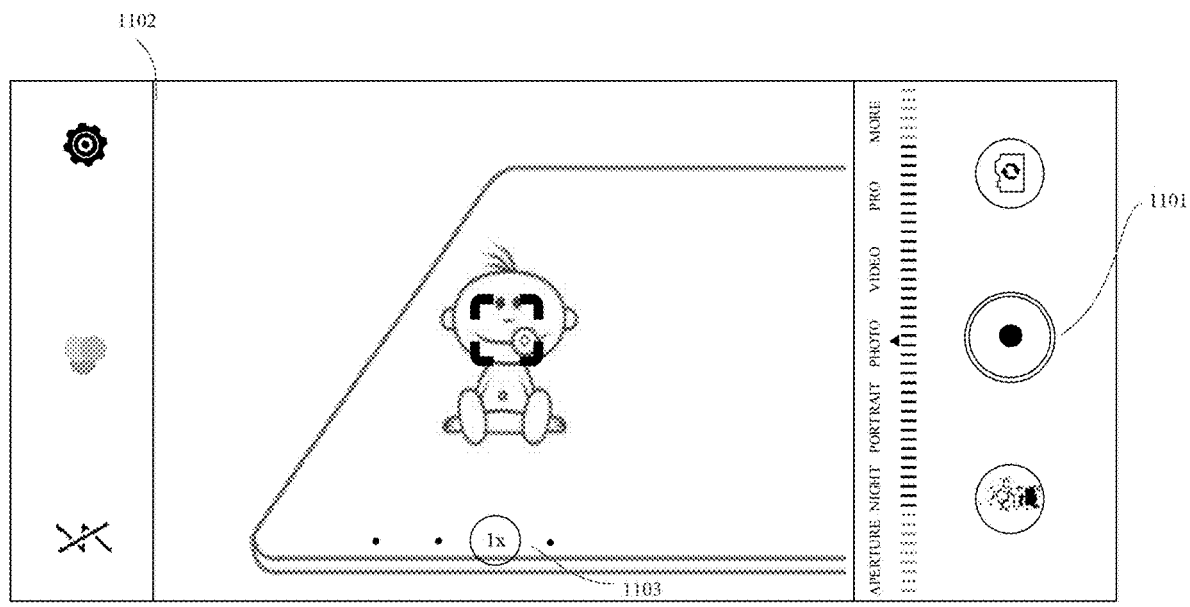

For example, the operation may be that the user taps the building image composition shown in FIG. 6(c), or may be that the user taps the recommendation area box 1105 shown in FIG. 11(b). Certainly, the operation is not limited to tapping or double tapping, and may alternatively be an operation such as touching and holding, rotating, or swiping. This is not limited in this application.

In a possible implementation, the first guide mark includes a first mark and a second mark, the first mark indicates a viewfinder center of the first camera, and the second mark indicates a center of the first image composition.

For example, the first mark may be the mark 606 shown in FIG. 6(c), and the second mark may be the mark 607 shown in FIG. 6(c). The first mark and the second mark may also be in a shape such as a cross shape or a shooting auxiliary box, provided that the first mark and the second mark can assist in guiding the user to move the electronic device to align the camera with the selected recommended image composition. This is not limited in this application.

In a possible implementation, a guide mark is further displayed on the shooting preview interface, to guide the user to move the electronic device, so that the first mark coincides with the second mark. For example, refer to the guide direction 709 in FIG. 7(f). The guide mark may alternatively be a text or voice prompt. This is not limited in this application.

In a possible implementation, the first guide mark includes a third mark, and the third mark indicates the framing range of the second camera. For example, the third mark is a shooting auxiliary box, and the preview image collected by the second camera is displayed in the shooting auxiliary box. Refer to the dashed-line box 1006 shown in FIG. 10(c).

In a possible implementation, depth of field information of the first subject and the second subject is displayed on the shooting preview interface, where the depth of field information is collected by a ToF camera of the electronic device. For example, the depth of field information may be the depth of field information shown in FIG. 8(a) to FIG. 8(e).

In a possible implementation, a first identifier and a second identifier are displayed on the shooting preview interface, where the first identifier includes a first recommendation index corresponding to the first image composition, and the second identifier includes a second recommendation index corresponding to the second image composition. The first identifier further includes a first scene corresponding to the first subject and the second identifier further includes a second scene corresponding to the second subject.

Figure 8A:
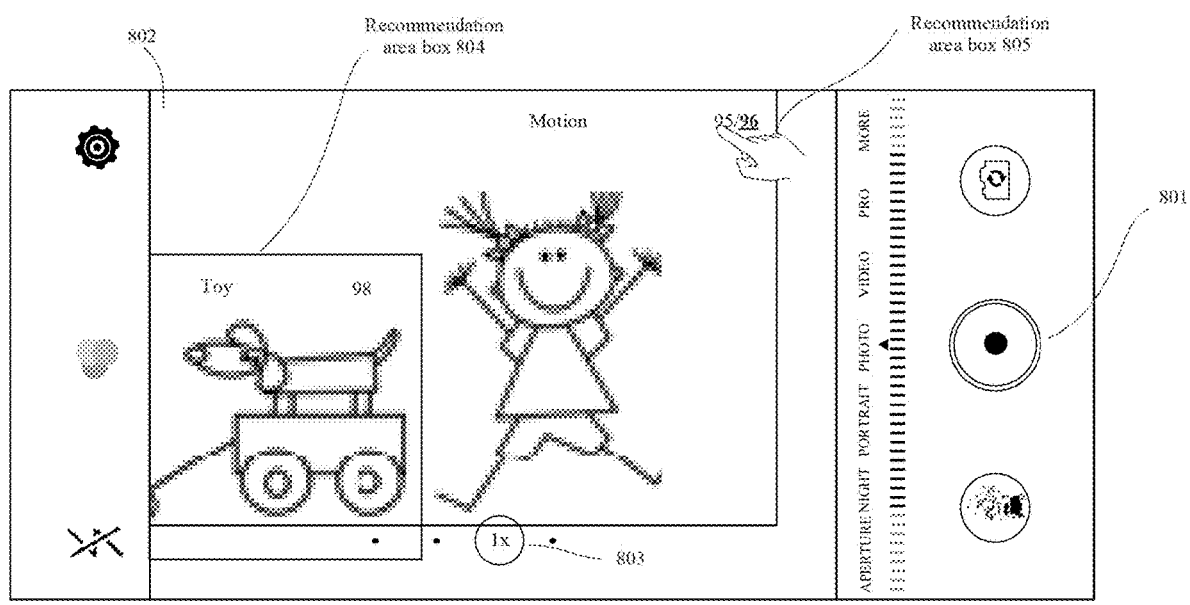
FIG. 8(a) to FIG. 8(e) are schematic diagrams of another group of interfaces according to an embodiment of the present invention.
Figure 8B:
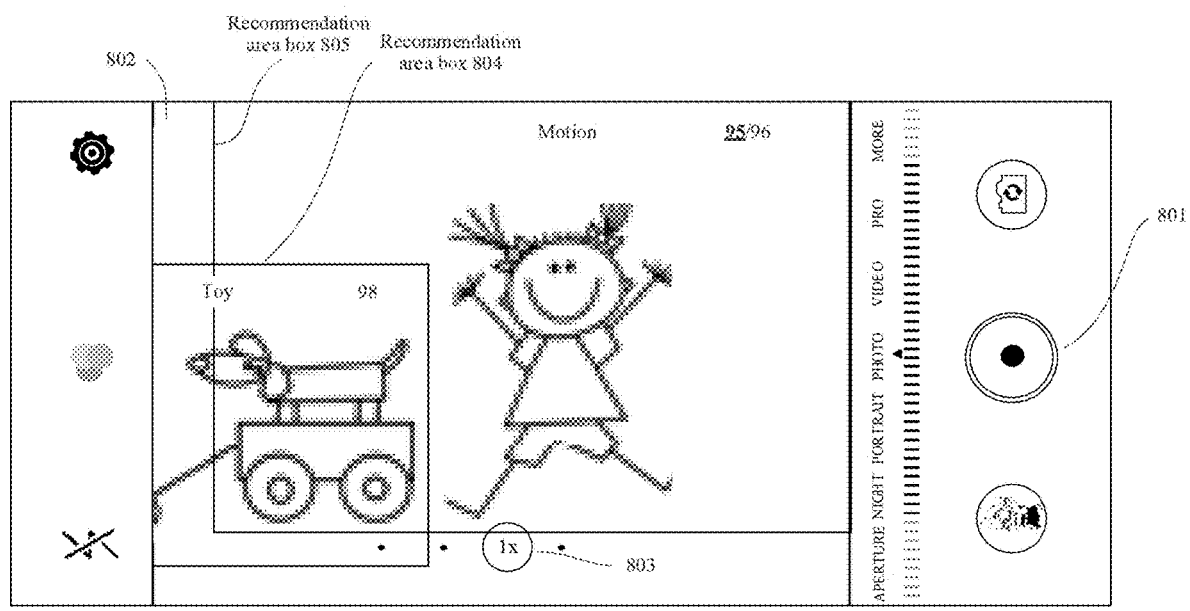
Figure 8C:
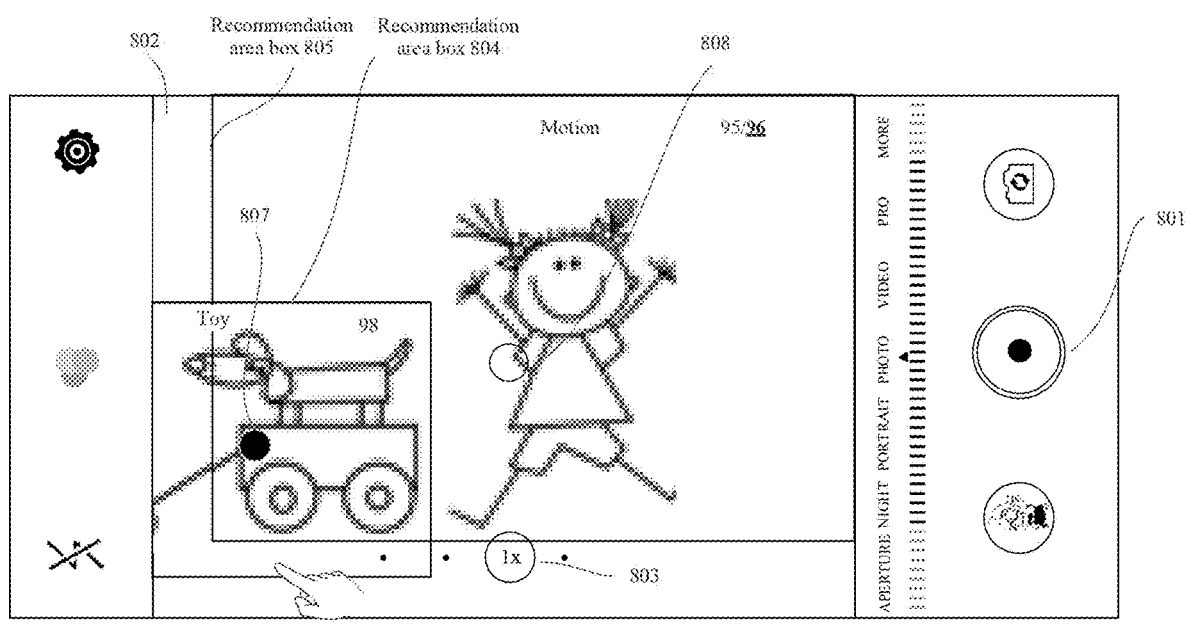
Figure 8D:
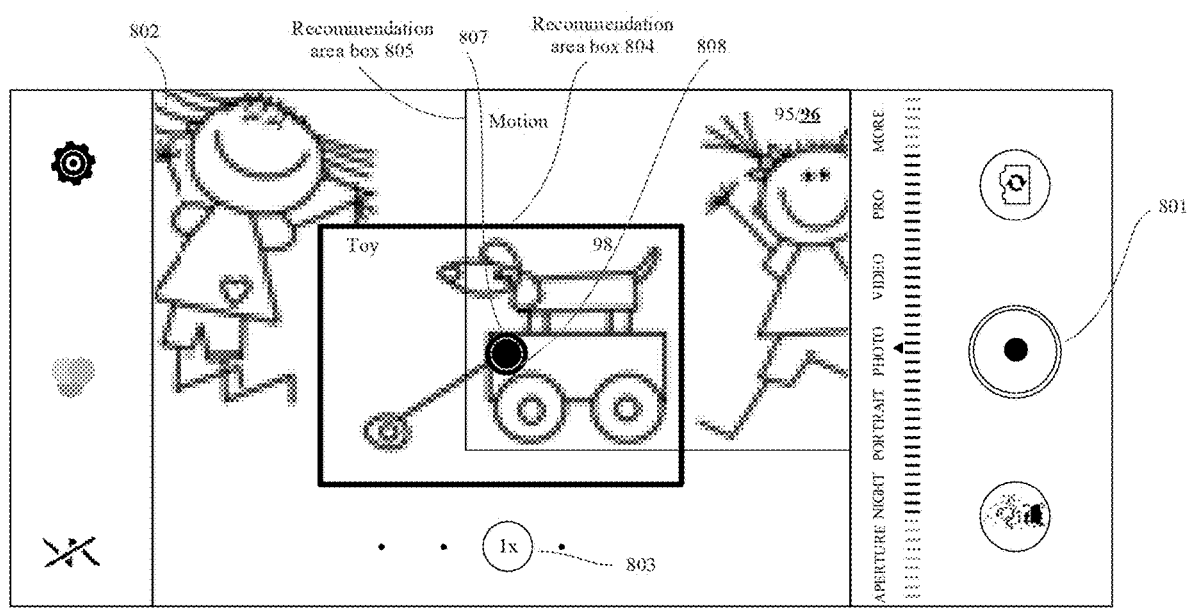
Figure 8E:
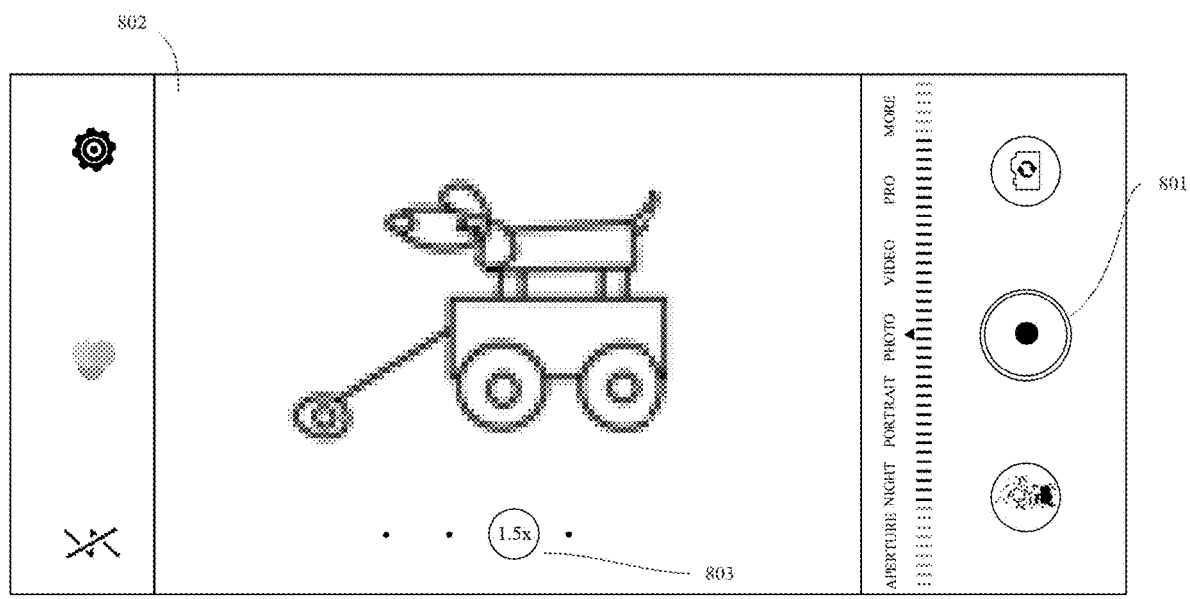

For example, the first identifier and the first recommendation index may be 96 shown in FIG. 8(a), the first image composition may be an image composition in the motion scene in the recommendation area box 805 shown in FIG. 8(a), and the first subject is the little girl on the right of the toy. The second identifier and the second recommendation index may be 98 shown in FIG. 8(a), and the second image composition may be an image composition in the toy scene in the recommendation area box 804, and the second subject is the toy.

In a possible implementation, the first identifier further includes a third recommendation index. A third image composition is displayed on the shooting preview interface in response to an input operation on the third recommendation index, where the third image composition corresponds to the first subject. A location of the first subject in the first image composition is different from a location of the first subject in the third image composition, the first recommendation index is a first score, the third recommendation index is a second score, and the first score is greater than the second score.

For example, the third recommendation index may be 95 shown in FIG. 8(a). The third image composition may be an image composition in the motion scene presented in the recommendation area box 805 shown in FIG. 8(b), and the first subject is the little girl on the right of the toy.

1204: In response to meeting the first matching condition, display a first recommended image including the first subject on the display, where the first recommended image is collected by the second camera.

In a possible implementation, when a degree of overlapping between a preview viewfinder area and a recommendation area meets a specific condition, as shown in FIG. 6(e), a first recommended image including the building is displayed on the display. The first recommended image is collected by a medium-focus camera.

In a possible implementation, in response to meeting the first matching condition, prompt information is displayed on the display, where the prompt information is used to prompt whether to switch to the second camera for shooting; and in response to an input operation on the prompt information, the first recommended image including the first subject is displayed on the display, where the first recommended image is collected by the second camera.

Figure 10A:
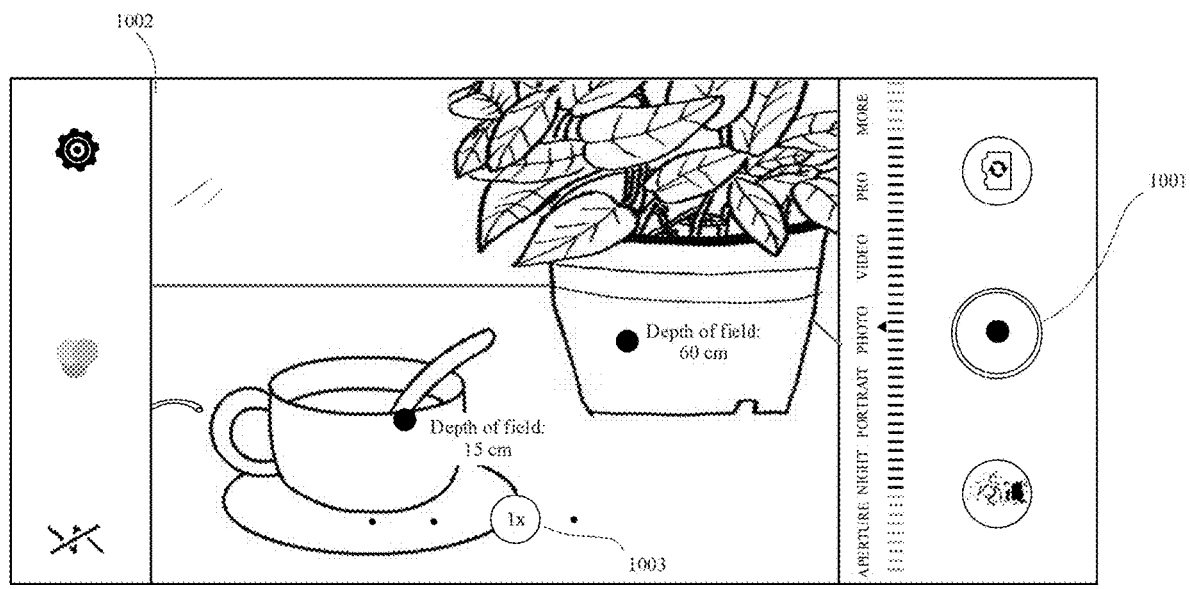
FIG. 10(a) to FIG. 10(f) are schematic diagrams of another group of interfaces according to an embodiment of the present invention.
Figure 10B:
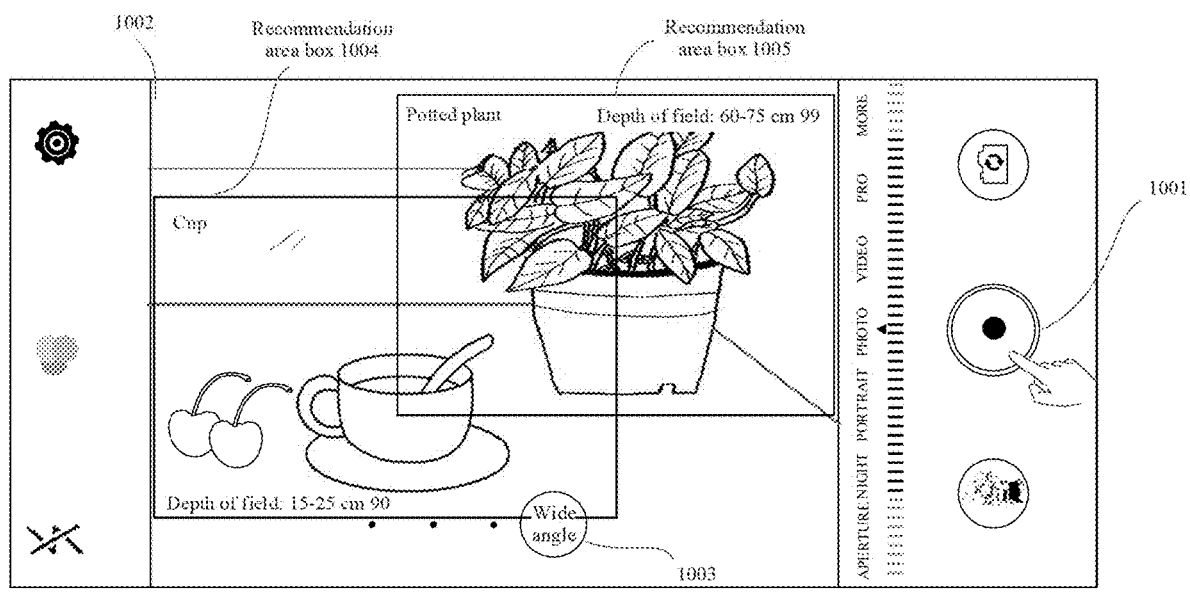
Figure 10C:
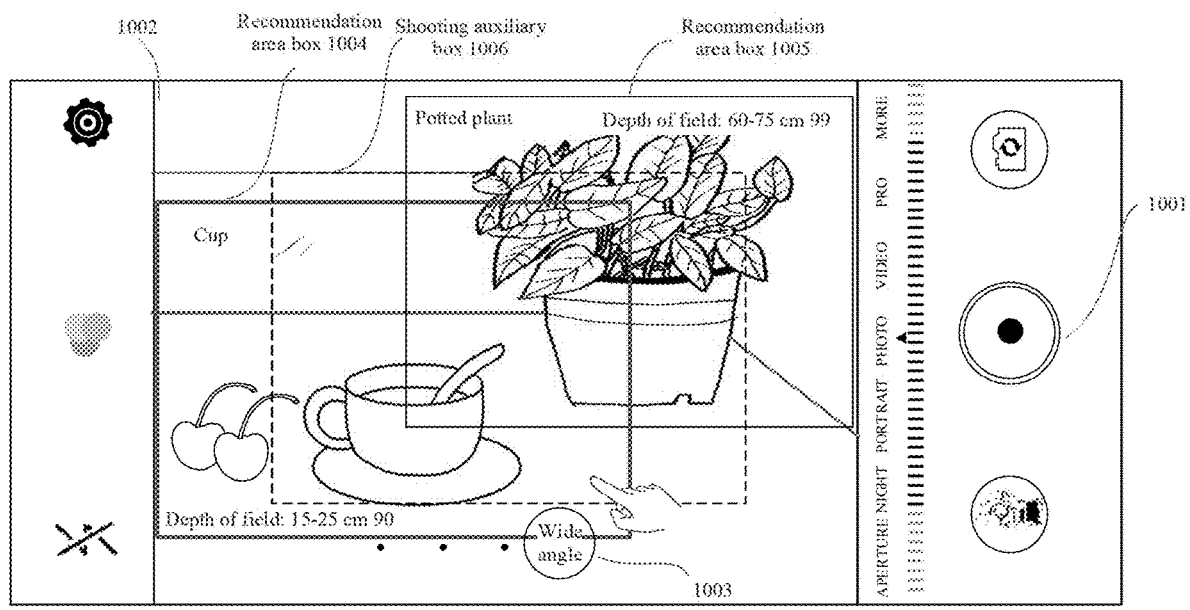
Figure 10D:
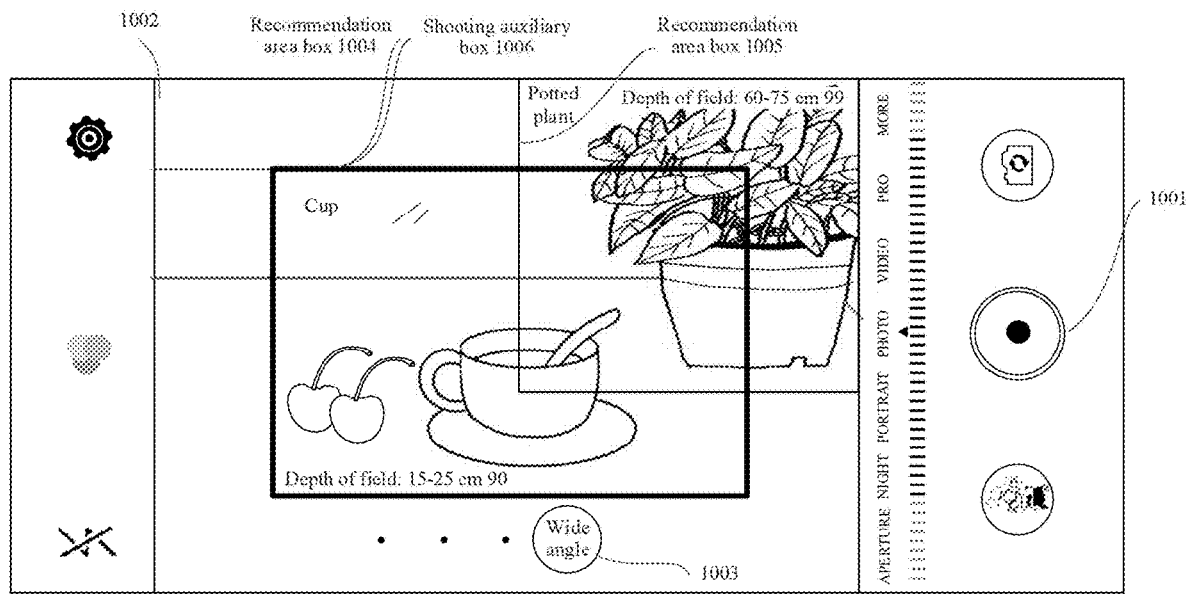
Figure 10E:
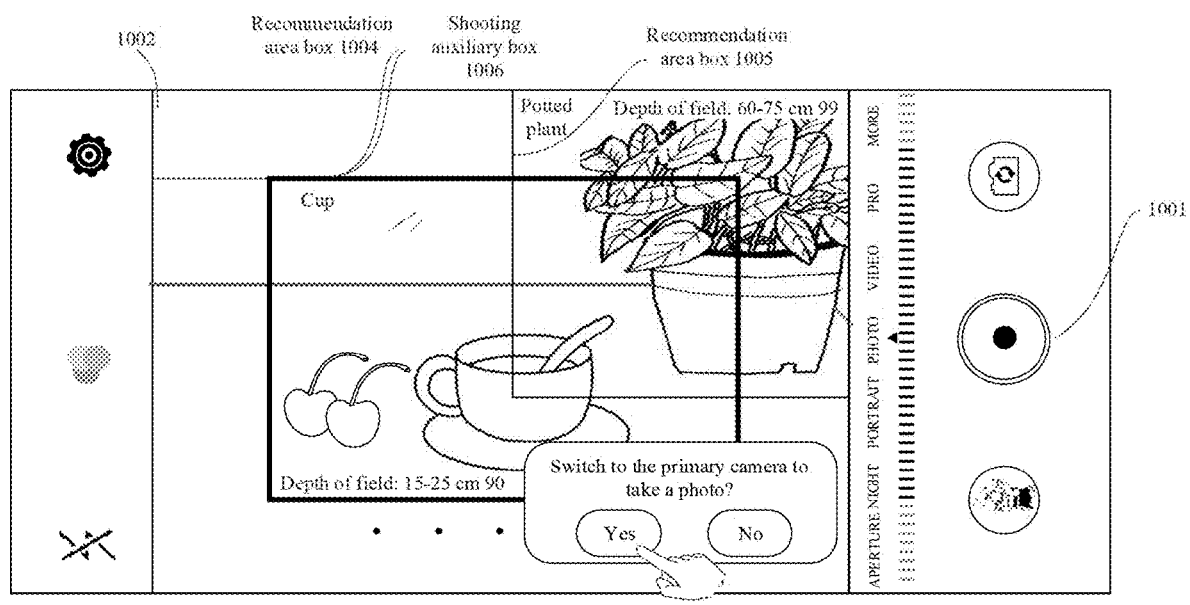
Figure 10F:
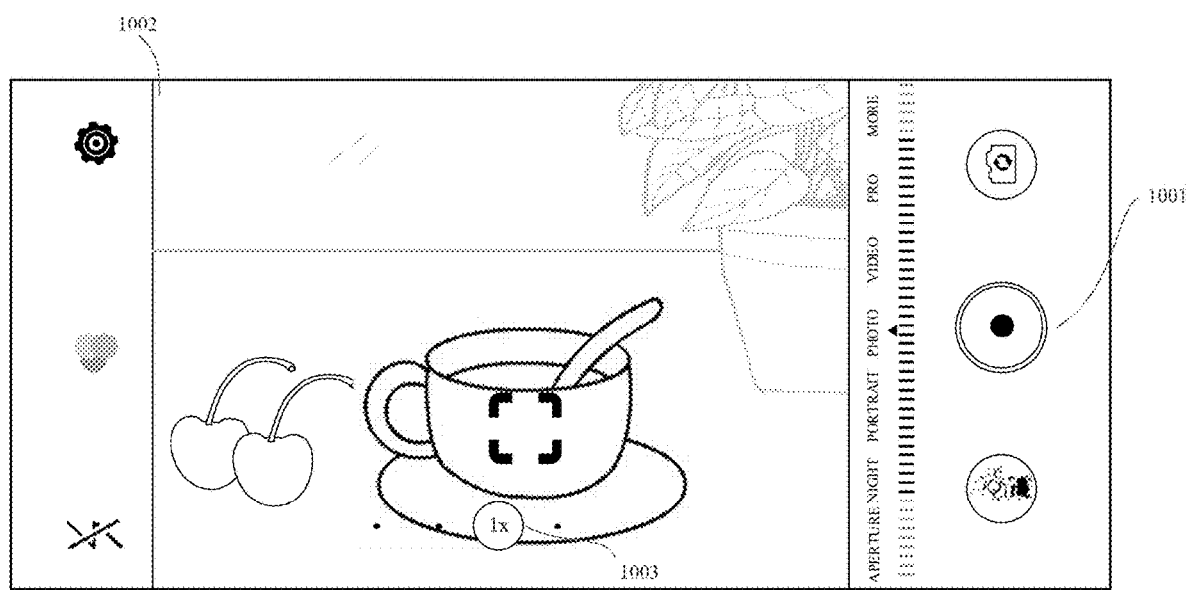

For example, the prompt information is a card that is shown in FIG. 10(e) and that includes "Switch to the primary camera to take a photo?". The user selects "Yes", and a recommended image of the cup under a medium-focus preview is displayed, as shown in FIG. 10(f).

1205: Shoot the first recommended image including the first subject.

In a possible implementation, the medium-focus camera automatically shoots the first recommended image including the first subject.

In a possible implementation, an input operation on a shooting control is detected, and in response to the input operation, the medium-focus camera shoots the first recommended image.

1206: Display prompt information, where the prompt information is used to prompt the user whether to continue to shoot the second recommended image, and the second recommended image includes the second subject.

Figure 11E:
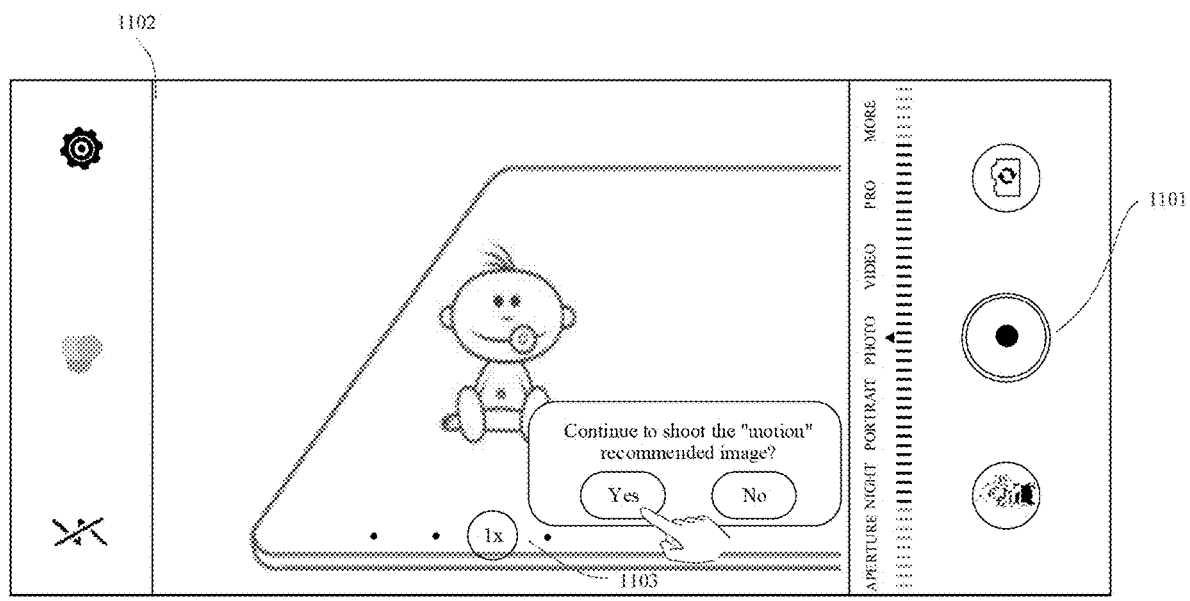
Figure 11F:
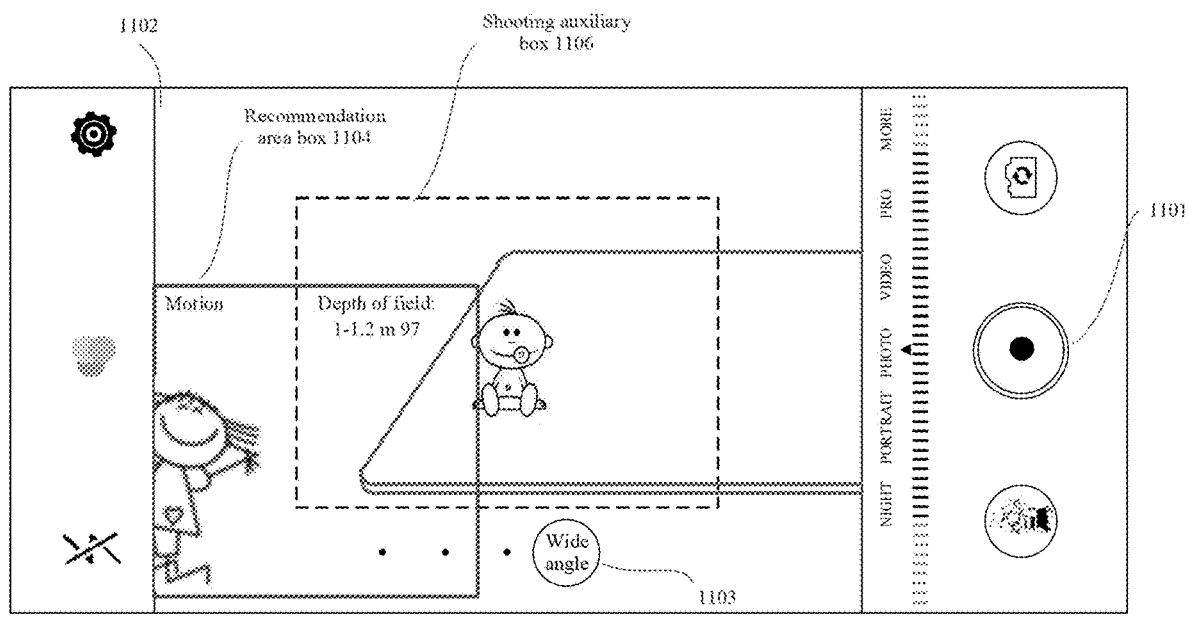
Figure 11G:
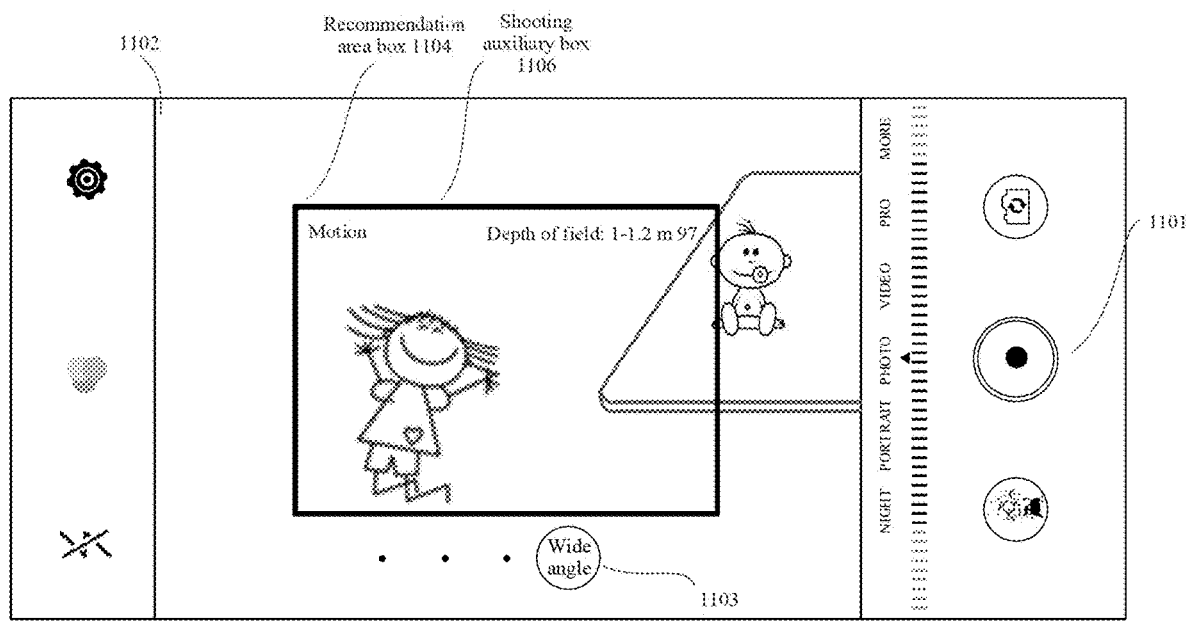
Figure 11H:
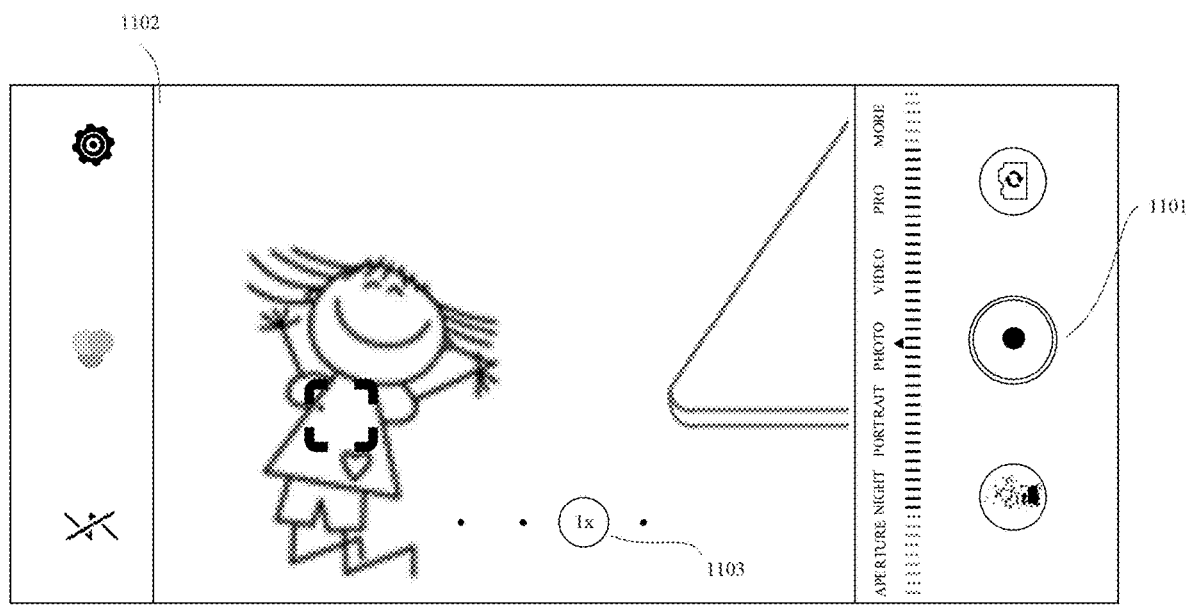

For example, the prompt information may be "Continue to shoot the "motion" recommended image?" shown in FIG. 11(e).

1207: Display a second guide mark on the shooting preview interface, where the second guide mark is used to guide the user to operate the electronic device, so that a framing range of the third camera of the electronic device and the second image composition meet a second matching condition.

The angle of view of the second camera is greater than the angle of view of the third camera, and the first camera, the second camera, and the third camera are located on a same side of the electronic device.

A function of the second guide mark is similar to that of the first guide mark. Refer to the description of the first guide mark.

1208: In response to meeting the second matching condition, display the second recommended image including the second subject on the display, where the second recommended image is collected by the third camera.

Figure 7G:
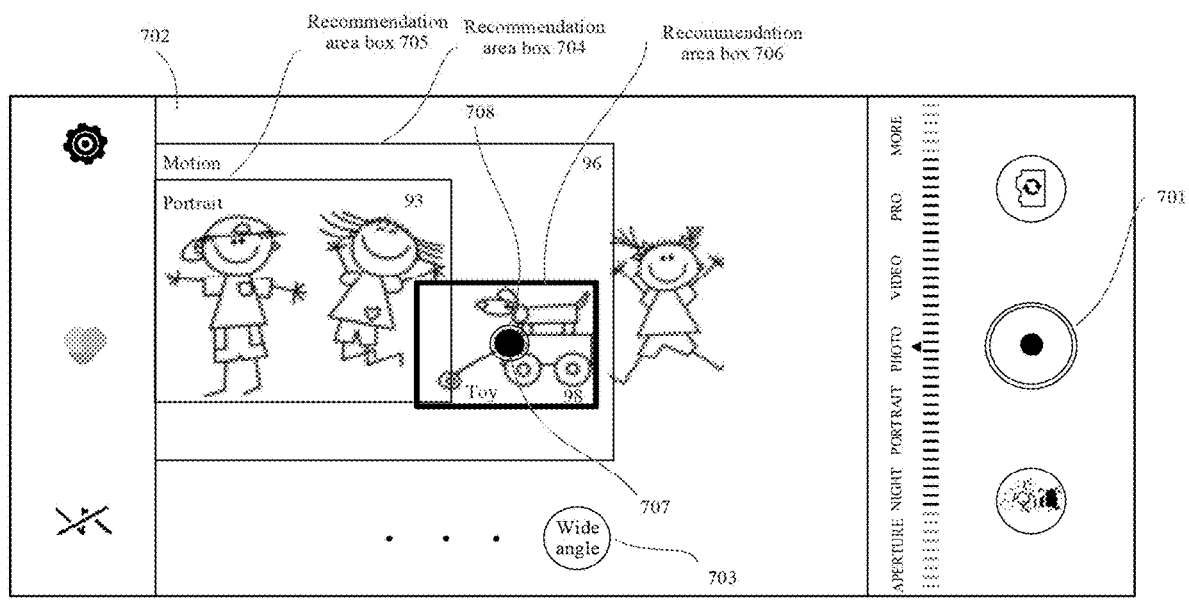
Figure 7H:
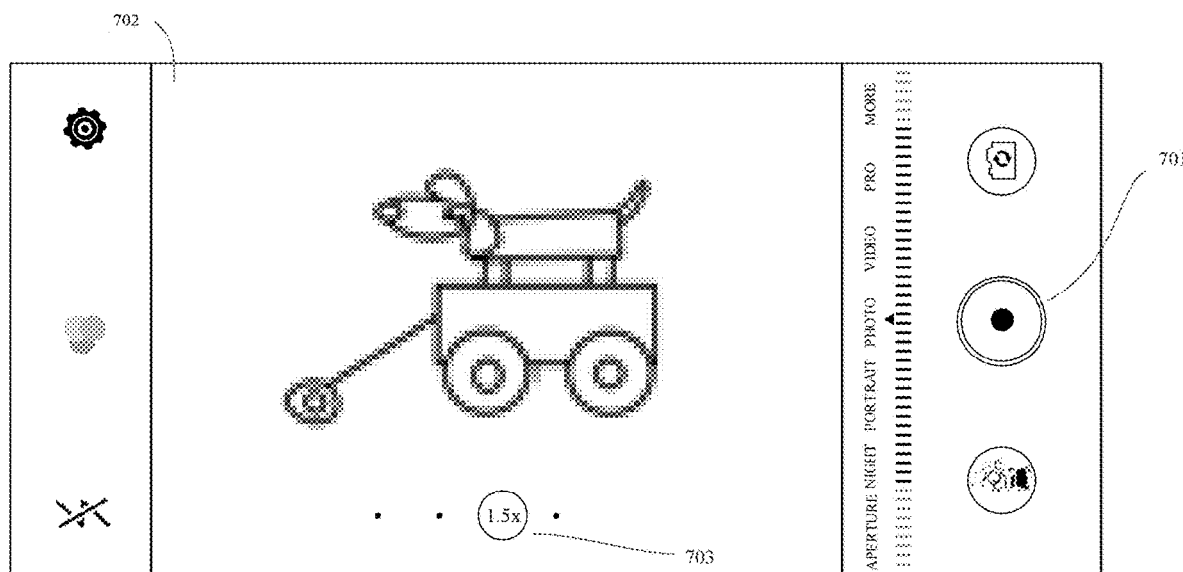
Figure 7H:
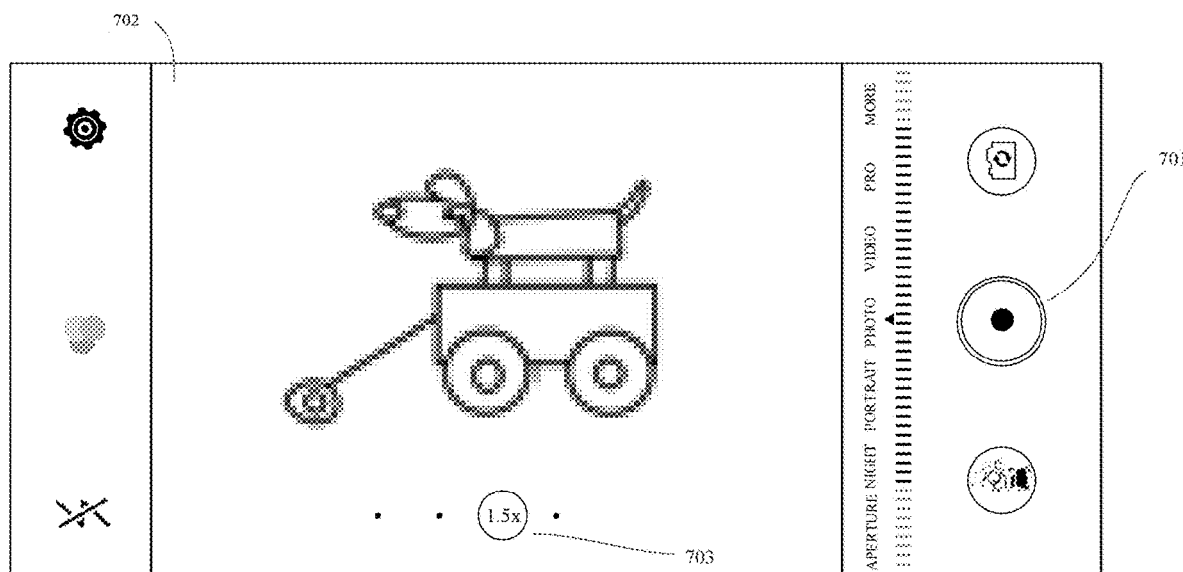

For example, as shown in FIG. 7(g), a viewfinder center of the wide-angle camera is aligned with the recommended image of the toy, viewfinder center of the wide-angle camera is consistent with a viewfinder center of the long-focus camera, and a viewfinder range of the 1.5× long-focus camera is consistent with a range of the recommendation area box 706. The electronic device switches the wide-angle camera to the 1.5× long-focus camera, to shoot the recommended image composition of the toy.

In this way, after the electronic device identifies a plurality of shot subjects by using the first camera such as the wide-angle camera, the electronic device may determine a recommended shooting image composition based on an image set of each shot subject. For a scene in which there are a plurality of shot subjects, the user can intuitively obtain a shooting image composition recommended for each shot subject, so that the user can select and determine a shot subject and shoot a professional image composition. In some embodiments, in the method, the basis for image segmentation further includes depth of field information collected by the ToF camera. In this way, based on the depth of field information that is of the shot subject and that is collected by the ToF camera, a result of layered image segmentation is more accurate. During shooting, a focal length and brightness information of the camera are automatically adjusted based on the depth of field information, and the user does not need to manually adjust the focal length and the brightness information, to provide a more professional shooting effect for a common user.

It can be understood that, to implement the foregoing functions, the electronic device includes a corresponding hardware structure and/or software module for performing each function. A person skilled in the art should easily be aware that, in combination with the examples described in the embodiments disclosed in this specification, algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In embodiments of the present invention, the electronic device may be divided into function modules based on the example in the foregoing method. For example, each function module corresponding to each function may be obtained through division, or two or more functions may be integrated into one processing module. The integrated module may be implemented in a form of hardware, or may be implemented in a form of a software functional module. It should be noted that, in embodiments of the present invention, module division is an example, and is merely a logical function division. During actual implementation, another division manner may be used.

Embodiments of the present invention disclose an electronic device, including a processor, and a memory, an input device, and an output device that are connected to the processor. The input device and the output device may be integrated into one device. For example, a touch sensor may be used as an input device, a display may be used as an output device, and the touch sensor and the display may be integrated into a touchscreen.

Figure 13:
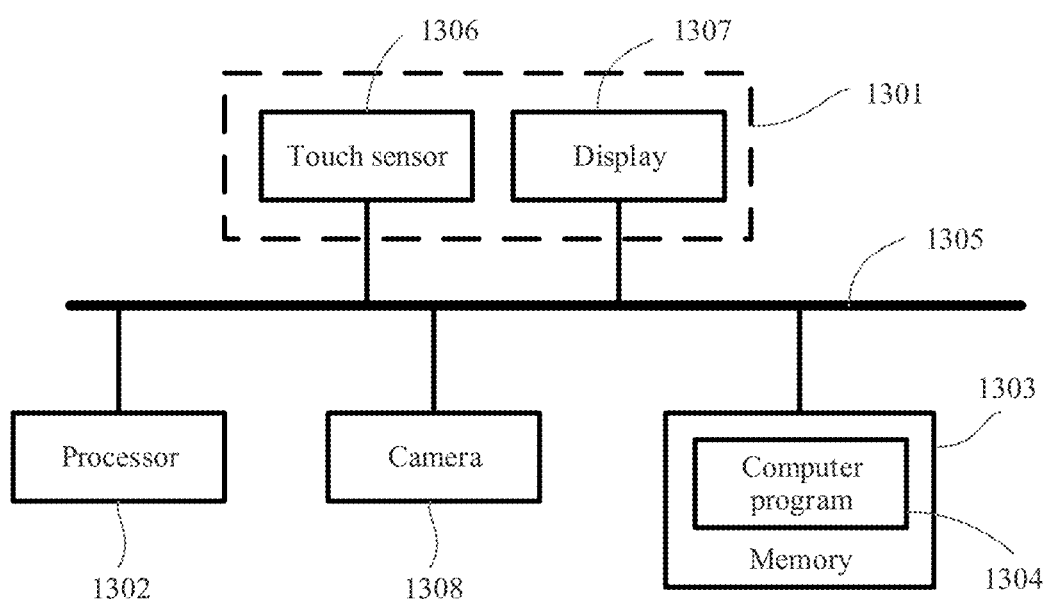
FIG. 13 is a schematic diagram of another structure of an electronic device according to an embodiment of the present invention.

In this case, as shown in FIG. 13, the electronic device may include a touchscreen 1301, one or more processors 1302, one or more cameras 1308, a memory 1303, one or more applications (not shown), and one or more computer programs 1304. The touchscreen 1301 includes a touch sensor 1306 and a display 1307. The foregoing components may be connected through one or more communications buses 1305. The one or more computer programs 1304 are stored in the memory 1303 and are used to be executed by the one or more processors 1302. The one or more computer programs 1304 include instructions, and the instructions may be used to perform the steps in the corresponding embodiments. All related content of the steps in the foregoing method embodiments may be cited in function descriptions of corresponding physical components. Details are not described herein again.

For example, the processor 1302 may be specifically the processor 110 shown in FIG. 1, the memory 1303 may be specifically the internal memory 116 and/or the external memory 120 shown in FIG. 1, the camera 1308 may be specifically the camera 193 shown in FIG. 1, the display 1307 may be specifically the display 194 shown in FIG. 1, and the touch sensor 1306 may be specifically the touch sensor 180K in the sensor module 180 shown in FIG. 1. This is not limited in embodiments of the present invention.

Embodiments of the present invention further provide a computer storage medium. The computer storage medium stores computer instructions. When the computer instructions are run on an electronic device, the electronic device is enabled to perform the related method steps, to implement the shooting method in the foregoing embodiments.

Embodiments of the present invention further provide a computer program product. When the computer program product is run on a computer, the computer is enabled to perform the foregoing related method steps, to implement the shooting method in the foregoing embodiments.

In addition, embodiments of the present invention further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the shooting method in the foregoing method embodiments.

The electronic device, the computer storage medium, the computer program product, or the chip provided in embodiments of the present invention is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented according to a requirement, in other words, an inner structure of an apparatus is divided into different function modules to implement all or some of the functions described above.

In the several embodiments provided in the present invention, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of the present invention essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of the present invention. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A shooting method, wherein the method comprises:
    displaying a shooting preview interface on a display of an electronic device, wherein the shooting preview interface is collected by a first camera of the electronic device;
    displaying a first image composition and a second image composition on the shooting preview interface, wherein the first image composition corresponds to a first subject, the second image composition corresponds to a second subject, and the first subject is different from the second subject;
    displaying a first guide mark on the shooting preview interface, wherein the first guide mark guides an operation in which a framing range of a second camera of the electronic device and the first image composition meet a first matching condition, wherein an angle of view of the first camera is greater than an angle of view of the second camera, and the first camera and the second camera are located on a same side of the electronic device, wherein the first guide mark comprises a first mark, a second mark, and a third mark, the first mark represents a viewfinder center of the first camera, and the second mark represents a center of the first image composition, and the third mark represents the framing range of the second camera; and displaying, in response to meeting the first matching condition, a first recommended image comprising the first subject on the display, wherein the first recommended image is collected by the second camera.

2. The method according to claim 1, wherein after the displaying a first recommended image comprising the first subject on the display, the method further comprises:
automatically shooting the first recommended image comprising the first subject.

3. The method according to claim 1, wherein after the displaying a first recommended image comprising the first subject on the display, the method further comprises:
detecting an input operation on a shooting control; and
in response to the input operation, shooting the first recommended image.

4. The method according to claim 3, wherein after the shooting the first recommended image, the method further comprises:
displaying prompt information, wherein the prompt information prompts an input of whether to continue to shoot a second recommended image, and the second recommended image comprises the second subject.

5. The method according to claim 1, wherein the method further comprises:
displaying a second guide mark on the shooting preview interface, wherein the second guide mark guides an operation in which a framing range of a third camera of the electronic device and the second image composition meet a second matching condition, wherein the angle of view of the second camera is greater than an angle of view of the third camera, and the first camera, the second camera, and the third camera are located on a same side of the electronic device; and
in response to meeting the second matching condition, displaying a second recommended image comprising the second subject on the display, wherein the second recommended image is collected by the third camera.

6. The method according to claim 1, wherein the method further comprises:
displaying depth of field information of the first subject and the second subject on the shooting preview interface, wherein the depth of field information is collected by a time of flight (ToF) camera of the electronic device.

7. The method according to claim 6, wherein the displaying, in response to meeting the first matching condition, a first recommended image comprising the first subject on the display comprises:
in response to meeting the first matching condition, adjusting, by the second camera, a focal length based on the depth of field information of the first subject, and displaying the first recommended image comprising the first subject on the display.

8. The method according to claim 7, wherein the electronic device performs progressive blurring on another object around the first subject by using depth of field information that is of the first subject and the another object around the first subject and that is obtained by the ToF camera.

9. The method according to claim 1, wherein the displaying a first guide mark on the shooting preview interface, wherein the first guide mark guides an operation in which a framing range of a second camera of the electronic device and the first image composition meet a first matching condition comprises:
detecting an operation on the first image composition; and
in response to the operation, displaying the first guide mark on the shooting preview interface, wherein the first guide mark guides an operation in which the framing range of the second camera of the electronic device and the first image composition meet the first matching condition.

10. The method according to claim 1, wherein the displaying, in response to meeting the first matching condition, a first recommended image comprising the first subject on the display comprises:
in response to meeting the first matching condition, displaying prompt information on the display, wherein the prompt information is used to prompt whether to switch to the second camera for shooting; and
in response to an input operation on the prompt information, displaying the first recommended image comprising the first subject on the display.

11. The method according to claim 1, wherein the method further comprises:
displaying a first identifier and a second identifier on the shooting preview interface, wherein the first identifier comprises a first recommendation index corresponding to the first image composition, and the second identifier comprises a second recommendation index corresponding to the second image composition.

12. The method according to claim 11, wherein the first identifier further comprises a first scene corresponding to the first subject, and the second identifier further comprises a second scene corresponding to the second subject.

13. The method according to claim 11, wherein the first identifier further comprises a third recommendation index, and the method further comprises:
in response to an input operation on the third recommendation index, displaying a third image composition on the shooting preview interface, wherein the third image composition corresponds to the first subject.

14. The method according to claim 13, wherein a location of the first subject in the first image composition is different from a location of the first subject in the third image composition, the first recommendation index is a first score, the third recommendation index is a second score, and the first score is greater than the second score.

15. A shooting method, wherein the method comprises:
displaying a shooting preview interface on a display of an electronic device, wherein the shooting preview interface is collected by a second camera of the electronic device;
displaying a first image composition and a second image composition on the shooting preview interface, wherein the first image composition corresponds to a first subject, the second image composition corresponds to a second subject, the first subject is different from the second subject, the first image composition and the second image composition are recommended based on an image collected by a first camera of the electronic device, and at least one of the first image composition and the second image composition is partially displayed;

displaying a first guide mark on the shooting preview interface, wherein the first guide mark guides an operation in which a framing range of the second camera of the electronic device and the first image composition meet a first matching condition, wherein an angle of view of the first camera is greater than an angle of view of the second camera, and the first camera and the second camera are located on a same side of the electronic device, wherein the first guide mark comprises a first mark, a second mark, and a third mark, the first mark represents a viewfinder center of the first camera, and the second mark represents a center of the first image composition, and the third mark represents the framing range of the second camera; and in response to meeting the first matching condition, displaying a first recommended image comprising the first subject on the display, wherein the first recommended image is collected by the second camera.

16. An electronic device, comprising:
a display;
a first camera;
a second camera;
at least one processor; and
one or more memories coupled to the at least one processor and storing programming instructions for execution by the at least one processor to cause the electronic device to:
display a shooting preview interface on the display, wherein the shooting preview interface is collected by the first camera of the electronic device;
display a first image composition and a second image composition on the shooting preview interface, wherein the first image composition corresponds to a first subject, the second image composition corresponds to a second subject, and the first subject is different from the second subject;
display a first guide mark on the shooting preview interface, wherein the first guide mark is used to guide an operation in which a framing range of the second camera of the electronic device and the first image composition meet a first matching condition, wherein an angle of view of the first camera is greater than an angle of view of the second camera, and the first camera and the second camera are located on a same side of the electronic device, wherein the first guide mark comprises a first mark, a second mark, and a third mark, the first mark represents a viewfinder center of the first camera, and the second mark represents a center of the first image composition, and the third mark represents the framing range of the second camera; and
display, in response to meeting the first matching condition, a first recommended image comprising the first subject on the display, wherein the first recommended image is collected by the second camera.

17. The electronic device according to claim 16, wherein the programming instructions, when executed by the at least one processor, cause the electronic device to:
after the displaying a first recommended image comprising the first subject on the display:
automatically shoot the first recommended image comprising the first subject.

18. The electronic device according to claim 16, wherein the programming instructions, when executed by the at least one processor, cause the electronic device to:
after the displaying a first recommended image comprising the first subject on the display:
detect an input operation on a shooting control; and
in response to the input operation, shoot the first recommended image.

19. The electronic device according to claim 18, wherein the programming instructions, when executed by the at least one processor, cause the electronic device to:
after the shooting the first recommended image:
display prompt information, wherein the prompt information prompts an input of whether to continue to shoot a second recommended image, and the second recommended image comprises the second subject.

* * * * *